US011169756B2

(12) United States Patent
Chang et al.

(10) Patent No.: US 11,169,756 B2
(45) Date of Patent: Nov. 9, 2021

(54) METHOD FOR CAPTURING, STORING, ACCESSING, AND OUTPUTTING DIGITAL CONTENT

(71) Applicant: FlexiJet Technologies, Inc., Plano, TX (US)

(72) Inventors: William Ho Chang, Vancouver, WA (US); Christina Ying Liu, San Francisco, CA (US)

(73) Assignee: FlexiJet Technologies, Inc., Plano, TX (US)

( * ) Notice: Subject to any disclaimer, the term of this patent is extended or adjusted under 35 U.S.C. 154(b) by 0 days.

(21) Appl. No.: 16/403,113

(22) Filed: May 3, 2019

(65) Prior Publication Data

US 2019/0258430 A1    Aug. 22, 2019

Related U.S. Application Data

(63) Continuation of application No. 15/924,077, filed on Mar. 16, 2018, now Pat. No. 10,303,411, which is a (Continued)

(51) Int. Cl.
*G06F 3/12* (2006.01)
*G06Q 20/10* (2012.01)
(Continued)

(52) U.S. Cl.
CPC ............ *G06F 3/126* (2013.01); *G06F 3/1204* (2013.01); *G06F 3/1247* (2013.01);
(Continued)

(58) Field of Classification Search
CPC ..... H04L 67/04; H04L 2209/60; H04N 21/00; H04N 21/20
See application file for complete search history.

(56) References Cited

U.S. PATENT DOCUMENTS 3,629,493 A    12/1971  Morgenfruh
3,833,297 A     9/1974  Swartz
(Continued)

FOREIGN PATENT DOCUMENTS

CA    2844665 A1    2/2013
CN    1217503 A     5/1999
(Continued)

OTHER PUBLICATIONS

United States Patent and Trademark Office, Notice of Allowance for U.S. Appl. No. 11/933,031, dated Dec. 27, 2017, 11 pages.
(Continued)

*Primary Examiner* — Esther B. Henderson
(74) *Attorney, Agent, or Firm* — Chernoff Vilhauer LLP

(57) ABSTRACT

A method for capturing and outputting digital content is herein disclosed and enabled, the output system includes an information apparatus, a server, and a client device. The information apparatus includes at least a digital camera and a wireless communication module (e.g., IEEE 802.11 or Bluetooth). The server is accessible by the client device over a network. The information apparatus, using the digital camera, captures digital content and transmits, over the Internet and using the wireless communication module, the digital content to the server for storage. The server generates output data from at least part of the digital content stored at the server, and provides the generated output data from the server to the client device that has security or authentication information for accessing the server. The client device outputs or plays at least part of the digital content at an output device associated with the client device.

29 Claims, 10 Drawing Sheets

Related U.S. Application Data continuation of application No. 09/992,413, filed on Nov. 18, 2001, now Pat. No. 9,965,233.

(60) Provisional application No. 60/252,682, filed on Nov. 20, 2000.

(51) Int. Cl.

| | | |
|---|---|---|
| *G06Q 40/00* | (2012.01) | |
| *H04L 12/28* | (2006.01) | |
| *H04L 29/08* | (2006.01) | |
| *G06Q 20/32* | (2012.01) | |
| *H04L 29/06* | (2006.01) | |
| *G06F 3/0482* | (2013.01) | |

(52) U.S. Cl.
CPC .......... *G06F 3/1288* (2013.01); *G06F 3/1292* (2013.01); *G06Q 20/102* (2013.01); *G06Q 20/327* (2013.01); *G06Q 20/3224* (2013.01); *G06Q 40/00* (2013.01); *H04L 12/2805* (2013.01); *H04L 12/2812* (2013.01); *H04L 63/0428* (2013.01); *H04L 63/0492* (2013.01); *H04L 67/04* (2013.01); *H04L 67/28* (2013.01); *H04L 67/2823* (2013.01); *H04L 67/2828* (2013.01); *H04L 67/303* (2013.01); *G06F 3/0482* (2013.01); *H04L 12/2809* (2013.01); *H04L 12/2834* (2013.01); *H04L 12/2838* (2013.01); *H04L 67/16* (2013.01); *H04L 2012/285* (2013.01); *H04L 2012/2841* (2013.01); *H04L 2012/2849* (2013.01); *H05K 999/99* (2013.01)

(56) References Cited

U.S. PATENT DOCUMENTS

| | | |
|---|---|---|
| 3,848,856 A | 11/1974 | Reeber et al. |
| 4,262,301 A | 4/1981 | Erlichman |
| 4,266,863 A | 5/1981 | Hollingsworth et al. |
| 4,291,956 A | 9/1981 | Vogelgesang |
| 4,291,957 A | 9/1981 | Hollingsworth |
| 4,301,599 A | 11/1981 | Leay |
| 4,335,955 A | 6/1982 | Lopata |
| 4,340,905 A | 7/1982 | Balding |
| 4,360,264 A | 11/1982 | Baker et al. |
| 4,417,792 A | 11/1983 | Martin geb Böser |
| 4,428,001 A | 1/1984 | Yamamura et al. |
| 4,431,282 A | 2/1984 | Martin geb Böser |
| 4,435,059 A | 3/1984 | Gerber |
| 4,495,490 A | 1/1985 | Hopper et al. |
| 4,539,585 A | 9/1985 | Spackova et al. |
| 4,541,010 A | 9/1985 | Alston |
| 4,553,835 A | 11/1985 | Morgan, Jr. |
| 4,580,880 A | 4/1986 | Watson |
| 4,602,280 A | 7/1986 | Maloomian |
| 4,603,330 A | 7/1986 | Horne et al. |
| 4,758,881 A | 7/1988 | Laspada |
| 4,956,665 A | 9/1990 | Niles |
| 4,958,220 A | 9/1990 | Alessi et al. |
| 4,979,032 A | 12/1990 | Alessi et al. |
| 5,048,057 A | 9/1991 | Saleh et al. |
| 5,129,639 A | 7/1992 | DeHority |
| 5,166,809 A | 11/1992 | Surbrook |
| 5,220,674 A | 6/1993 | Morgan et al. |
| 5,228,118 A | 7/1993 | Sasaki |
| 5,257,097 A | 10/1993 | Pineau et al. |
| 5,270,773 A | 12/1993 | Sklut et al. |
| 5,287,194 A | 2/1994 | Lobiondo |
| 5,303,342 A | 4/1994 | Edge |
| 5,319,711 A | 6/1994 | Servi |
| 5,337,258 A | 8/1994 | Dennis |
| 5,353,388 A | 10/1994 | Motoyama |
| 5,404,433 A | 4/1995 | Hosogai |
| 5,412,798 A | 5/1995 | Garney |
| 5,463,623 A | 10/1995 | Grimes et al. |
| 5,467,434 A | 11/1995 | Hower, Jr. et al. |
| 5,475,507 A | 12/1995 | Suzuki et al. |
| 5,479,206 A | 12/1995 | Ueno et al. |
| 5,485,634 A | 1/1996 | Weiser et al. |
| 5,487,069 A | 1/1996 | O'Sullivan et al. |
| 5,490,287 A | 2/1996 | Itoh et al. |
| 5,506,661 A | 4/1996 | Hanzawa |
| 5,515,480 A | 5/1996 | Frazier |
| 5,519,641 A | 5/1996 | Beers et al. |
| 5,524,185 A | 6/1996 | Na |
| 5,537,107 A | 7/1996 | Funado |
| 5,537,517 A | 7/1996 | Wakabayashi et al. |
| 5,546,079 A | 8/1996 | Wagner |
| 5,564,109 A | 10/1996 | Snyder et al. |
| 5,566,278 A | 10/1996 | Patel et al. |
| 5,568,595 A | 10/1996 | Yosefi et al. |
| 5,572,632 A | 11/1996 | Laumeyer et al. |
| 5,574,979 A | 11/1996 | West |
| 5,579,087 A | 11/1996 | Salgado |
| 5,580,177 A | 12/1996 | Gase et al. |
| 5,589,889 A | 12/1996 | Kawaoka |
| 5,596,697 A | 1/1997 | Foster et al. |
| 5,604,843 A | 2/1997 | Shaw et al. |
| 5,613,123 A | 3/1997 | Tsang et al. |
| 5,613,124 A | 3/1997 | Atkinson et al. |
| 5,613,191 A | 3/1997 | Hylton et al. |
| 5,619,250 A | 4/1997 | McClellan et al. |
| 5,619,257 A | 4/1997 | Reele et al. |
| 5,619,649 A | 4/1997 | Kovnat et al. |
| 5,625,757 A | 4/1997 | Kageyama et al. |
| 5,629,981 A | 5/1997 | Nerlikar |
| 5,636,211 A | 6/1997 | Newlin et al. |
| 5,644,662 A | 7/1997 | Vuylsteke |
| 5,664,243 A | 9/1997 | Okada et al. |
| 5,675,717 A | 10/1997 | Yamamoto |
| 5,687,332 A | 11/1997 | Kurahashi et al. |
| 5,699,495 A | 12/1997 | Snipp |
| 5,708,780 A | 1/1998 | Levergood et al. |
| 5,710,557 A | 1/1998 | Schuette |
| 5,717,688 A | 2/1998 | Belanger et al. |
| 5,717,742 A | 2/1998 | Hyde-Thomson |
| 5,724,106 A | 3/1998 | Autry et al. |
| 5,727,135 A | 3/1998 | Webb et al. |
| 5,737,501 A | 4/1998 | Tsunekawa |
| 5,739,928 A | 4/1998 | Scott |
| 5,748,859 A | 5/1998 | Takayanagi et al. |
| 5,754,655 A | 5/1998 | Hughes et al. |
| 5,757,952 A | 5/1998 | Buytaert et al. |
| 5,761,480 A | 6/1998 | Fukada et al. |
| 5,771,353 A | 6/1998 | Eggleston et al. |
| 5,793,966 A | 8/1998 | Amstein et al. |
| 5,796,394 A | 8/1998 | Wicks et al. |
| 5,796,442 A | 8/1998 | Gove et al. |
| 5,796,727 A | 8/1998 | Harrison et al. |
| 5,799,067 A | 8/1998 | Kikinis et al. |
| 5,799,068 A | 8/1998 | Kikinis et al. |
| 5,802,314 A | 9/1998 | Tullis et al. |
| 5,815,194 A | 9/1998 | Ueda |
| 5,822,230 A | 10/1998 | Kikinis et al. |
| 5,826,244 A | 10/1998 | Huberman |
| 5,831,664 A | 11/1998 | Wharton et al. |
| 5,832,191 A | 11/1998 | Thorne |
| 5,838,320 A | 11/1998 | Matthews, III et al. |
| 5,838,926 A | 11/1998 | Yamagishi |
| 5,845,078 A | 12/1998 | Tezuka et al. |
| 5,850,449 A | 12/1998 | McManis |
| 5,852,721 A | 12/1998 | Dillon et al. |
| 5,859,970 A | 1/1999 | Pleso |
| 5,862,321 A | 1/1999 | Lamming et al. |
| 5,862,404 A | 1/1999 | Onaga |
| 5,867,633 A | 2/1999 | Taylor, III et al. |
| 5,870,723 A | 2/1999 | Pare, Jr. et al. |
| 5,880,858 A | 3/1999 | Jin |
| 5,881,213 A | 3/1999 | Shaw et al. |
| 5,884,140 A | 3/1999 | Ishizaki et al. |
| 5,897,260 A | 4/1999 | Zingher |
| 5,903,832 A | 5/1999 | Seppanen et al. |

(56) References Cited

U.S. PATENT DOCUMENTS

| | | | |
|---|---|---|---|
| 5,907,831 A | 5/1999 | Lotvin et al. |
| 5,911,044 A | 6/1999 | Lo et al. |
| 5,916,309 A | 6/1999 | Brown et al. |
| 5,917,542 A | 6/1999 | Moghadam et al. |
| 5,926,104 A | 7/1999 | Robinson |
| 5,926,624 A | 7/1999 | Katz et al. |
| 5,930,466 A | 7/1999 | Rademacher |
| 5,931,919 A | 8/1999 | Thomas et al. |
| 5,933,498 A | 8/1999 | Schneck et al. |
| 5,937,112 A | 8/1999 | Herregods et al. |
| 5,940,843 A | 8/1999 | Zucknovich et al. |
| 5,946,031 A | 8/1999 | Douglas |
| 5,946,110 A | 8/1999 | Hu et al. |
| 5,946,458 A | 8/1999 | Austin et al. |
| 5,949,966 A | 9/1999 | Hayashi |
| 5,949,978 A | 9/1999 | Kondo et al. |
| 5,953,546 A | 9/1999 | Okada et al. |
| 5,960,162 A | 9/1999 | Yamamoto |
| 5,968,176 A | 10/1999 | Nessett et al. |
| 5,970,473 A | 10/1999 | Gerszberg et al. |
| 5,974,234 A | 10/1999 | Levine et al. |
| 5,974,312 A | 10/1999 | Hayes, Jr. et al. |
| 5,974,401 A | 10/1999 | Enomoto et al. |
| 5,978,560 A | 11/1999 | Tan et al. |
| 5,983,200 A | 11/1999 | Slotznick |
| 5,987,454 A | 11/1999 | Hobbs |
| 5,993,047 A | 11/1999 | Novogrod et al. |
| 6,003,065 A | 12/1999 | Yan et al. |
| 6,006,265 A | 12/1999 | Rangan et al. |
| 6,008,777 A | 12/1999 | Yiu |
| 6,009,464 A | 12/1999 | Hamilton et al. |
| 6,020,973 A | 2/2000 | Levine et al. |
| 6,023,715 A | 2/2000 | Burkes et al. |
| 6,034,621 A | 3/2000 | Kaufman |
| 6,035,214 A | 3/2000 | Henderson |
| 6,037,981 A | 3/2000 | Wilson et al. |
| 6,039,426 A | 3/2000 | Dobbs |
| 6,041,346 A | 3/2000 | Chen et al. |
| 6,043,898 A | 3/2000 | Jacobs |
| 6,046,820 A | 4/2000 | Konishi |
| 6,061,142 A | 5/2000 | Shim |
| 6,061,452 A | 5/2000 | Suzuki |
| 6,069,707 A | 5/2000 | Pekelman |
| 6,070,185 A | 5/2000 | Anupam et al. |
| 6,072,595 A | 6/2000 | Yoshiura et al. |
| 6,076,076 A | 6/2000 | Gottfreid |
| 6,076,109 A | 6/2000 | Kikinis |
| 6,078,906 A | 6/2000 | Huberman |
| 6,084,968 A | 7/2000 | Kennedy et al. |
| 6,087,060 A | 7/2000 | Chase et al. |
| 6,088,337 A | 7/2000 | Eastmond et al. |
| 6,088,450 A | 7/2000 | Davis et al. |
| 6,088,702 A | 7/2000 | Plantz et al. |
| 6,091,956 A | 7/2000 | Hollenberg |
| 6,101,291 A | 8/2000 | Amey et al. |
| 6,115,137 A | 9/2000 | Ozawa et al. |
| 6,122,526 A | 9/2000 | Parulski et al. |
| 6,138,178 A | 10/2000 | Watanabe |
| 6,141,659 A | 10/2000 | Barker et al. |
| 6,144,950 A | 11/2000 | Davies et al. |
| 6,144,997 A | 11/2000 | Lamming et al. |
| 6,145,031 A | 11/2000 | Mastie et al. |
| 6,148,081 A | 11/2000 | Szymanski et al. |
| 6,148,346 A | 11/2000 | Hanson |
| 6,157,809 A | 12/2000 | Kambayashi |
| 6,167,514 A | 12/2000 | Matsui et al. |
| 6,169,789 B1 | 1/2001 | Rao et al. |
| 6,173,407 B1 | 1/2001 | Yoon et al. |
| 6,175,922 B1 | 1/2001 | Wang |
| 6,177,926 B1 | 1/2001 | Kunert |
| 6,184,996 B1 | 2/2001 | Gase |
| 6,189,148 B1 | 2/2001 | Clark et al. |
| 6,189,993 B1 | 2/2001 | Mantell |
| 6,192,407 B1 | 2/2001 | Smith et al. |
| 6,195,564 B1 | 2/2001 | Rydbeck et al. |
| 6,199,099 B1 | 3/2001 | Gershman et al. |
| 6,199,106 B1 | 3/2001 | Shaw et al. |
| 6,201,611 B1 | 3/2001 | Carter et al. |
| 6,205,429 B1 | 3/2001 | Peng |
| 6,205,495 B1 | 3/2001 | Gilbert et al. |
| 6,211,858 B1 | 4/2001 | Moon et al. |
| 6,215,483 B1 | 4/2001 | Zigmond |
| 6,215,494 B1 | 4/2001 | Teo |
| 6,223,029 B1 | 4/2001 | Stenman et al. |
| 6,223,059 B1 | 4/2001 | Haestrup |
| 6,225,993 B1 | 5/2001 | Lindblad et al. |
| 6,226,098 B1 | 5/2001 | Kulakowski |
| 6,233,611 B1 | 5/2001 | Ludtke et al. |
| 6,236,971 B1 | 5/2001 | Stefik et al. |
| 6,246,486 B1 | 6/2001 | Takahashi |
| 6,252,964 B1 | 6/2001 | Wasilewski et al. |
| 6,255,961 B1 | 7/2001 | Van Ryzin et al. |
| 6,256,666 B1 | 7/2001 | Singhal |
| 6,263,503 B1 | 7/2001 | Margulis |
| 6,285,357 B1 | 9/2001 | Kushiro et al. |
| 6,285,889 B1 | 9/2001 | Nykänen et al. |
| 6,288,790 B1 | 9/2001 | Yellepeddy et al. |
| 6,292,283 B1 | 9/2001 | Grandbois |
| 6,312,106 B1 | 11/2001 | Walker |
| 6,324,521 B1 | 11/2001 | Shiota et al. |
| 6,330,611 B1 | 12/2001 | Itoh et al. |
| 6,332,193 B1 | 12/2001 | Glass et al. |
| 6,339,706 B1 | 1/2002 | Tillgren et al. |
| 6,360,252 B1 | 3/2002 | Rudy et al. |
| 6,363,149 B1 | 3/2002 | Candelore |
| 6,363,452 B1 | 3/2002 | Lach |
| 6,366,682 B1 | 4/2002 | Hoffman et al. |
| 6,366,912 B1 | 4/2002 | Wallent et al. |
| 6,366,965 B1 | 4/2002 | Binford et al. |
| 6,369,909 B1 | 4/2002 | Shima |
| 6,379,058 B1 | 4/2002 | Petteruti et al. |
| 6,385,305 B1 | 5/2002 | Gerzberg et al. |
| 6,389,010 B1 | 5/2002 | Kubler et al. |
| 6,393,271 B1 | 5/2002 | Dougherty |
| 6,396,531 B1 | 5/2002 | Gerszberg et al. |
| 6,396,598 B1 | 5/2002 | Kashiwagi et al. |
| 6,418,439 B1 | 7/2002 | Papiemiak et al. |
| 6,421,716 B1 | 7/2002 | Eldridge et al. |
| 6,421,748 B1 | 7/2002 | Lin et al. |
| 6,426,798 B1 | 7/2002 | Yeung |
| 6,430,599 B1 | 8/2002 | Baker et al. |
| 6,430,601 B1 | 8/2002 | Eldridge et al. |
| 6,434,535 B1 | 8/2002 | Kupka et al. |
| 6,437,786 B1 | 8/2002 | Yasukawa |
| 6,442,375 B1 | 8/2002 | Parmentier |
| 6,449,052 B1 | 9/2002 | Sherer et al. |
| 6,452,692 B1 | 9/2002 | Yacoub |
| 6,453,127 B2 | 9/2002 | Wood et al. |
| 6,467,688 B1 | 10/2002 | Goldman et al. |
| 6,470,189 B1 | 10/2002 | Hill et al. |
| 6,473,070 B2 | 10/2002 | Mishra et al. |
| 6,473,800 B1 | 10/2002 | Jerger et al. |
| 6,477,575 B1 | 11/2002 | Koeppel et al. |
| 6,480,292 B1 | 11/2002 | Sugiyama |
| 6,483,906 B1 | 11/2002 | Iggulden et al. |
| 6,487,587 B1 | 11/2002 | Dubey |
| 6,487,599 B1 | 11/2002 | Smith et al. |
| 6,489,934 B1 | 12/2002 | Klausner |
| 6,493,104 B1 | 12/2002 | Cromer et al. |
| 6,493,550 B1 | 12/2002 | Raith |
| 6,496,802 B1 | 12/2002 | Zoest et al. |
| 6,496,855 B1 | 12/2002 | Hunt et al. |
| 6,510,235 B1 | 1/2003 | Shin et al. |
| 6,510,515 B1 | 1/2003 | Raith |
| 6,515,988 B1 * | 2/2003 | Eldridge ............ G06F 15/0225 |
| | | 370/389 |
| 6,519,049 B1 | 2/2003 | Nagasaka |
| 6,526,129 B1 | 2/2003 | Beaton et al. |
| 6,529,522 B1 | 3/2003 | Ito et al. |
| 6,532,368 B1 | 3/2003 | Hild et al. |
| 6,535,855 B1 | 3/2003 | Cahill et al. |
| 6,540,722 B1 | 4/2003 | Boyle et al. |
| 6,542,173 B1 | 4/2003 | Buckley |
| 6,542,491 B1 | 4/2003 | Tari et al. |

(56) References Cited

U.S. PATENT DOCUMENTS

| | | | |
|---|---|---|---|
| 6,545,612 B1 | 4/2003 | Lindgren et al. | |
| 6,545,669 B1 | 4/2003 | Kinawi et al. | |
| 6,545,722 B1 | 4/2003 | Schultheiss et al. | |
| 6,546,387 B1 | 4/2003 | Triggs | |
| 6,546,419 B1 | 4/2003 | Humpleman et al. | |
| 6,550,672 B1 | 4/2003 | Tracy et al. | |
| 6,553,240 B1 | 4/2003 | Dervarics | |
| 6,553,431 B1 | 4/2003 | Yamamoto et al. | |
| 6,556,313 B1 | 4/2003 | Chang et al. | |
| 6,560,651 B2 | 5/2003 | Katz et al. | |
| 6,574,672 B1 | 6/2003 | Mitchell et al. | |
| 6,577,861 B2 | 6/2003 | Ogasawara | |
| 6,578,072 B2 | 6/2003 | Watanabe et al. | |
| 6,581,094 B1 | 6/2003 | Gao | |
| 6,584,903 B2 | 7/2003 | Jacobs | |
| 6,587,835 B1 | 7/2003 | Treyz et al. | |
| 6,598,031 B1 | 7/2003 | Ice | |
| 6,600,569 B1 | 7/2003 | Osada et al. | |
| 6,601,093 B1 | 7/2003 | Peters | |
| 6,601,108 B1 | 7/2003 | Marmor | |
| 6,604,135 B1 | 8/2003 | Rogers et al. | |
| 6,604,140 B1 | 8/2003 | Beck et al. | |
| 6,604,148 B1 | 8/2003 | Dennison | |
| 6,607,314 B1 | 8/2003 | McCannon et al. | |
| 6,608,928 B1 | 8/2003 | Queiroz | |
| 6,615,404 B1 | 9/2003 | Garfunkel et al. | |
| 6,618,039 B1 | 9/2003 | Grant et al. | |
| 6,618,592 B1 | 9/2003 | Vilander et al. | |
| 6,621,589 B1 | 9/2003 | Al-Kazily et al. | |
| 6,622,015 B1 | 9/2003 | Himmel et al. | |
| 6,622,018 B1 | 9/2003 | Erekson | |
| 6,623,527 B1 | 9/2003 | Hamzy | |
| 6,628,302 B2 | 9/2003 | White et al. | |
| 6,628,417 B1 | 9/2003 | Naito et al. | |
| 6,633,346 B1 | 10/2003 | Yamamoto | |
| 6,633,395 B1 | 10/2003 | Tuchitoi et al. | |
| 6,633,757 B1 | 10/2003 | Hermann et al. | |
| 6,636,202 B2 | 10/2003 | Ishmael, Jr. et al. | |
| 6,636,259 B1 | 10/2003 | Anderson et al. | |
| 6,643,650 B1 | 11/2003 | Slaughter et al. | |
| 6,654,135 B2 | 11/2003 | Mitani | |
| 6,658,625 B1 | 12/2003 | Allen | |
| 6,662,224 B1 | 12/2003 | Angwin et al. | |
| 6,670,982 B2 | 12/2003 | Clough et al. | |
| 6,671,068 B1 | 12/2003 | Chang et al. | |
| 6,678,004 B1 | 1/2004 | Schultheiss et al. | |
| 6,678,751 B1 | 1/2004 | Hays et al. | |
| 6,690,918 B2 | 2/2004 | Evans et al. | |
| 6,694,371 B1 | 2/2004 | Sanai | |
| 6,697,848 B2 | 2/2004 | Hamilton et al. | |
| 6,701,009 B1 | 3/2004 | Makoto et al. | |
| 6,702,181 B2 | 3/2004 | Ramachandran | |
| 6,705,781 B2 | 3/2004 | Iwazaki | |
| 6,707,581 B1 | 3/2004 | Browning | |
| 6,711,677 B1 | 3/2004 | Wiegley | |
| 6,725,281 B1 | 4/2004 | Zintel et al. | |
| 6,732,179 B1 | 5/2004 | Brown et al. | |
| 6,735,616 B1 | 5/2004 | Thompson et al. | |
| 6,737,591 B1 * | 5/2004 | Lapstun | G06F 3/03545 |
| | | | 178/18.03 |
| 6,738,841 B1 * | 5/2004 | Wolff | H04L 29/06 |
| | | | 709/202 |
| 6,741,871 B1 | 5/2004 | Silverbrook et al. | |
| 6,745,229 B1 | 6/2004 | Gobin et al. | |
| 6,745,937 B2 | 6/2004 | Walsh et al. | |
| 6,748,056 B1 | 6/2004 | Capriotti et al. | |
| 6,748,195 B1 | 6/2004 | Phillips | |
| 6,750,978 B1 | 6/2004 | Marggraff et al. | |
| 6,751,732 B2 | 6/2004 | Strobel et al. | |
| 6,753,978 B1 | 6/2004 | Chang | |
| 6,757,070 B1 | 6/2004 | Lin et al. | |
| 6,760,745 B1 | 7/2004 | Tan et al. | |
| 6,769,012 B1 | 7/2004 | Liu et al. | |
| 6,771,749 B1 | 8/2004 | Bansal et al. | |
| 6,775,407 B1 | 8/2004 | Gindele et al. | |
| 6,778,289 B1 | 8/2004 | Iwata | |
| 6,784,855 B2 | 8/2004 | Matthews et al. | |
| 6,785,727 B1 | 8/2004 | Yamazaki | |
| 6,788,332 B1 | 9/2004 | Cook | |
| 6,788,428 B1 | 9/2004 | Shimokawa | |
| 6,789,107 B1 | 9/2004 | Bates et al. | |
| 6,789,228 B1 | 9/2004 | Merril et al. | |
| 6,792,148 B1 | 9/2004 | Wergeland et al. | |
| 6,798,530 B1 | 9/2004 | Buckley et al. | |
| 6,801,692 B2 | 10/2004 | Nishimura et al. | |
| 6,801,962 B2 | 10/2004 | Taniguchi et al. | |
| 6,813,039 B1 | 11/2004 | Silverbrook et al. | |
| 6,816,274 B1 | 11/2004 | Silverbrook et al. | |
| 6,816,724 B1 | 11/2004 | Asikainen | |
| 6,819,919 B1 | 11/2004 | Tanaka | |
| 6,826,632 B1 | 11/2004 | Wugofski | |
| 6,830,340 B2 | 12/2004 | Olson et al. | |
| 6,839,623 B1 | 1/2005 | Tillgren et al. | |
| 6,839,775 B1 | 1/2005 | Kao et al. | |
| 6,840,441 B2 | 1/2005 | Monaghan et al. | |
| 6,845,398 B1 | 1/2005 | Galensky et al. | |
| 6,850,252 B1 | 2/2005 | Hoffberg | |
| 6,850,767 B1 | 2/2005 | Maxymych | |
| 6,856,430 B1 | 2/2005 | Gase | |
| 6,857,021 B1 | 2/2005 | Schuster et al. | |
| 6,857,132 B1 | 2/2005 | Rakib et al. | |
| 6,857,716 B1 | 2/2005 | Nagahashi | |
| 6,859,197 B2 | 2/2005 | Klein et al. | |
| 6,859,228 B1 | 2/2005 | Chang et al. | |
| 6,859,937 B1 | 2/2005 | Narayan et al. | |
| 6,873,836 B1 | 3/2005 | Sorrells et al. | |
| 6,882,859 B1 | 4/2005 | Rao et al. | |
| 6,885,878 B1 | 4/2005 | Borgstrom et al. | |
| 6,888,643 B1 | 5/2005 | Grimes | |
| 6,889,385 B1 | 5/2005 | Rakib et al. | |
| 6,892,230 B1 | 5/2005 | Gu et al. | |
| 6,892,251 B2 | 5/2005 | Anderson et al. | |
| 6,895,444 B1 | 5/2005 | Weisshaar et al. | |
| 6,898,640 B1 | 5/2005 | Kurita et al. | |
| 6,901,429 B2 | 5/2005 | Dowling | |
| 6,904,527 B1 | 6/2005 | Parlour et al. | |
| 6,909,424 B2 | 6/2005 | Liebenow et al. | |
| 6,910,068 B2 | 6/2005 | Zintel et al. | |
| 6,914,694 B1 | 7/2005 | Ichikawa et al. | |
| 6,915,124 B1 | 7/2005 | Kiessling et al. | |
| 6,915,422 B1 | 7/2005 | Nakamura | |
| 6,922,258 B2 * | 7/2005 | Pineau | G06F 3/1292 |
| | | | 358/1.15 |
| 6,922,725 B2 | 7/2005 | Lamming et al. | |
| 6,928,614 B1 | 8/2005 | Everhart | |
| 6,930,709 B1 | 8/2005 | Creamer et al. | |
| 6,932,523 B1 | 8/2005 | Yamada et al. | |
| 6,941,014 B2 | 9/2005 | Lin et al. | |
| 6,947,067 B2 | 9/2005 | Halttunen | |
| 6,947,995 B2 | 9/2005 | Chang et al. | |
| 6,950,645 B1 | 9/2005 | Kammer et al. | |
| 6,952,414 B1 | 10/2005 | Willig | |
| 6,952,831 B1 | 10/2005 | Moore | |
| 6,957,194 B2 | 10/2005 | Stefik et al. | |
| 6,958,821 B1 | 10/2005 | McIntyre | |
| 6,959,339 B1 | 10/2005 | Wu et al. | |
| 6,963,582 B1 | 11/2005 | Xu | |
| 6,980,319 B2 | 12/2005 | Ohta | |
| 6,983,310 B2 | 1/2006 | Rouse et al. | |
| 6,990,548 B1 | 1/2006 | Kaylor | |
| 6,995,859 B1 * | 2/2006 | Silverbrook | G06F 3/0321 |
| | | | 358/1.18 |
| 6,996,555 B2 | 2/2006 | Muto et al. | |
| 6,999,112 B2 | 2/2006 | Seaman et al. | |
| 7,004,395 B2 | 2/2006 | Koenck et al. | |
| 7,007,066 B1 | 2/2006 | Malik | |
| 7,007,067 B1 | 2/2006 | Azvine et al. | |
| 7,016,062 B2 | 3/2006 | Ishizuka | |
| 7,020,685 B1 | 3/2006 | Chen et al. | |
| 7,024,200 B2 | 4/2006 | McKenna et al. | |
| 7,025,256 B1 | 4/2006 | Drummond et al. | |
| 7,028,102 B1 * | 4/2006 | Larsson | H04L 67/2823 |
| | | | 709/232 |
| 7,038,797 B1 | 5/2006 | Lapstun et al. | |

(56) References Cited

U.S. PATENT DOCUMENTS

| | | |
|---|---|---|
| 7,039,358 B1 | 5/2006 | Shellhammer et al. |
| 7,039,445 B1 | 5/2006 | Yoshizawa |
| 7,047,302 B1 | 5/2006 | Chatani et al. |
| 7,054,296 B1 | 5/2006 | Sorrells et al. |
| 7,058,356 B2 | 6/2006 | Slotznick |
| 7,062,651 B1 | 6/2006 | Lapstun et al. |
| 7,068,621 B2 | 6/2006 | Bouet et al. |
| 7,069,578 B1 | 6/2006 | Prus et al. |
| 7,076,534 B1 | 7/2006 | Cleron et al. |
| 7,076,730 B1 | 7/2006 | Baker |
| 7,085,814 B1 | 8/2006 | Gandhi et al. |
| 7,088,691 B2 | 8/2006 | Fujita |
| 7,088,990 B1 | 8/2006 | Isomursu et al. |
| 7,095,854 B1 | 8/2006 | Ginter et al. |
| 7,099,027 B1 | 8/2006 | Barry et al. |
| 7,099,304 B2 | 8/2006 | Liu et al. |
| 7,103,834 B1 | 9/2006 | Humpleman et al. |
| 7,112,138 B2 | 9/2006 | Hedrick et al. |
| 7,113,979 B1 | 9/2006 | Smith et al. |
| 7,133,845 B1 | 11/2006 | Ginter et al. |
| 7,133,846 B1 | 11/2006 | Ginter et al. |
| 7,136,999 B1 | 11/2006 | Griffiths |
| 7,139,591 B2 | 11/2006 | Callaghan et al. |
| 7,143,356 B1 | 11/2006 | Shafrir et al. |
| 7,149,726 B1 | 12/2006 | Lingle et al. |
| 7,155,163 B2 | 12/2006 | Cannon et al. |
| 7,158,953 B1 | 1/2007 | DeMello et al. |
| 7,164,413 B2 | 1/2007 | Davis et al. |
| 7,164,885 B2 | 1/2007 | Jonsson et al. |
| 7,170,857 B2 | 1/2007 | Stephens et al. |
| 7,178,718 B2 | 2/2007 | Silverbrook et al. |
| 7,180,475 B2 | 2/2007 | Slobodin et al. |
| 7,180,614 B1 | 2/2007 | Senoo et al. |
| 7,184,707 B2 | 2/2007 | Tada et al. |
| 7,185,108 B1 | 2/2007 | Okachi |
| 7,187,947 B1 | 3/2007 | White et al. |
| 7,197,531 B2 | 3/2007 | Anderson |
| 7,203,721 B1 | 4/2007 | Ben-Efraim et al. |
| 7,209,955 B1 | 4/2007 | Major et al. |
| 7,213,061 B1 | 5/2007 | Hite et al. |
| 7,215,436 B2 | 5/2007 | Hull et al. |
| 7,221,961 B1 | 5/2007 | Fukumoto et al. |
| 7,237,253 B1 | 6/2007 | Blackketter et al. |
| 7,239,346 B1 | 7/2007 | Priddy |
| 7,239,868 B2 | 7/2007 | Furukawa et al. |
| 7,260,597 B1 | 8/2007 | Hofrichter et al. |
| 7,262,873 B1 | 8/2007 | Rasche et al. |
| 7,263,270 B1 | 8/2007 | Lapstun et al. |
| 7,272,788 B2 | 9/2007 | Anderson et al. |
| 7,283,808 B2 | 10/2007 | Castell et al. |
| 7,287,089 B1 | 10/2007 | Lamoureux et al. |
| 7,289,792 B1 | 10/2007 | Turunen |
| 7,289,964 B1 | 10/2007 | Bowman-Amuah |
| 7,305,713 B1 | 12/2007 | Crance |
| 7,318,086 B2 | 1/2008 | Chang et al. |
| 7,327,481 B2 | 2/2008 | Such et al. |
| 7,330,110 B1 | 2/2008 | Heintzman et al. |
| 7,334,024 B2 | 2/2008 | Martino |
| 7,337,472 B2 | 2/2008 | Olsen et al. |
| 7,345,347 B2 | 3/2008 | Ohkubo et al. |
| 7,346,374 B2 | 3/2008 | Witkowski et al. |
| 7,348,961 B1 | 3/2008 | Shneidman |
| 7,349,722 B2 | 3/2008 | Witkowski et al. |
| 7,349,955 B1 | 3/2008 | Korb et al. |
| 7,353,280 B2 | 4/2008 | Chiles et al. |
| 7,355,730 B2 | 4/2008 | Landau et al. |
| 7,355,732 B2 | 4/2008 | Yamaguchi |
| 7,356,347 B1 | 4/2008 | Kammer |
| 7,359,714 B2 | 4/2008 | Parupudi et al. |
| 7,360,230 B1 | 4/2008 | Paz et al. |
| 7,366,468 B2 | 4/2008 | Yoshida |
| 7,370,090 B2 | 5/2008 | Nakaoka et al. |
| 7,376,583 B1 | 5/2008 | Rolf |
| 7,379,660 B2 | 5/2008 | Shiohara |
| 7,379,914 B2 | 5/2008 | Aoki et al. |
| 7,379,958 B2 | 5/2008 | Karhu |
| 7,383,355 B1 | 6/2008 | Berkman et al. |
| 7,403,510 B1 | 7/2008 | Miyake |
| 7,412,651 B2 | 8/2008 | Lapstun et al. |
| 7,428,575 B1 | 9/2008 | Motoyama |
| 7,440,772 B2 | 10/2008 | White et al. |
| 7,451,195 B1 | 11/2008 | Seligmann |
| 7,454,796 B2 | 11/2008 | Mazzagatte et al. |
| 7,460,853 B2 | 12/2008 | Toyoshima |
| 7,477,890 B1 | 1/2009 | Narayanaswami |
| 7,478,403 B1 | 1/2009 | Allavarpu et al. |
| 7,483,958 B1 | 1/2009 | Elabbady et al. |
| 7,511,630 B2 | 3/2009 | Strickland et al. |
| 7,512,671 B1 | 3/2009 | Gladwin et al. |
| 7,526,762 B1 | 4/2009 | Astala et al. |
| 7,533,344 B1 | 5/2009 | Motoyama et al. |
| 7,554,684 B1 | 6/2009 | Senoo et al. |
| 7,555,287 B1 | 6/2009 | Heinonen et al. |
| 7,571,142 B1 | 8/2009 | Flitcroft et al. |
| 7,574,723 B2 | 8/2009 | Putterman et al. |
| 7,577,910 B1 | 8/2009 | Husemann et al. |
| 7,580,005 B1 | 8/2009 | Palin |
| RE40,910 E | 9/2009 | Aoki et al. |
| 7,584,269 B2 | 9/2009 | Moore et al. |
| 7,587,196 B2 | 9/2009 | Hansen |
| 7,593,123 B2 | 9/2009 | Sugahara |
| 7,609,402 B2 | 10/2009 | Chang et al. |
| 7,616,600 B2 | 11/2009 | Sparr et al. |
| 7,630,721 B2 | 12/2009 | Ortiz |
| 7,644,018 B1 | 1/2010 | Yukie |
| 7,644,039 B1 | 1/2010 | Magee et al. |
| 7,646,503 B2 | 1/2010 | Silverbrook et al. |
| 7,650,145 B2 | 1/2010 | Ukita et al. |
| 7,660,460 B2 | 2/2010 | Wu et al. |
| 7,660,601 B2 | 2/2010 | Janik et al. |
| 7,668,535 B2 | 2/2010 | Conneely et al. |
| 7,685,244 B2 | 3/2010 | Mousseau et al. |
| 7,688,467 B2 | 3/2010 | Enmei |
| 7,697,467 B2 | 4/2010 | Kubler et al. |
| 7,712,125 B2 | 5/2010 | Herigstad et al. |
| 7,725,912 B2 | 5/2010 | Margulis |
| 7,738,886 B1 | 6/2010 | Connolly et al. |
| 7,743,133 B1 | 6/2010 | Motoyama et al. |
| RE41,416 E | 7/2010 | Liu et al. |
| 7,761,541 B1 | 7/2010 | Morley et al. |
| RE41,487 E | 8/2010 | Liu et al. |
| RE41,532 E | 8/2010 | Liu et al. |
| 7,779,097 B2 | 8/2010 | Lamkin et al. |
| RE41,689 E | 9/2010 | Liu et al. |
| 7,797,367 B1 | 9/2010 | Gelvin et al. |
| 7,805,720 B2 | 9/2010 | Chang et al. |
| RE41,882 E | 10/2010 | Liu et al. |
| 7,812,856 B2 | 10/2010 | Ortiz et al. |
| 7,814,516 B2 | 10/2010 | Stecyk et al. |
| 7,831,276 B2 | 11/2010 | Kumar |
| 7,840,639 B1 | 11/2010 | Gough |
| 7,890,581 B2 | 2/2011 | Rao et al. |
| 7,894,474 B1 | 2/2011 | Bell |
| 7,900,833 B2 | 3/2011 | Silverbrook et al. |
| 7,904,579 B2 | 3/2011 | Janik et al. |
| 7,908,401 B2 | 3/2011 | Chang |
| 7,929,950 B1 | 4/2011 | Rao et al. |
| 7,937,450 B2 | 5/2011 | Janik |
| 7,941,541 B2 | 5/2011 | Chang et al. |
| 7,944,577 B2 | 5/2011 | Chang et al. |
| 7,949,223 B2 | 5/2011 | Shiohara |
| 7,953,818 B2 | 5/2011 | Chang et al. |
| 7,957,354 B1 | 6/2011 | Hickman et al. |
| 7,958,457 B1 | 6/2011 | Brandenberg et al. |
| 7,971,784 B2 | 7/2011 | Lapstun et al. |
| 7,984,098 B2 | 7/2011 | Enete et al. |
| 7,986,298 B1 | 7/2011 | Dulaney et al. |
| 7,991,347 B1 | 8/2011 | Chan |
| RE42,725 E | 9/2011 | Chang et al. |
| RE42,828 E | 10/2011 | Liu et al. |
| 8,045,952 B2 | 10/2011 | Qureshey et al. |
| 8,073,565 B2 | 12/2011 | Johnson |
| 8,082,491 B1 | 12/2011 | Abdelaziz et al. |
| 8,082,572 B1 | 12/2011 | Tilford |

(56) References Cited

U.S. PATENT DOCUMENTS

| | | |
|---|---|---|
| 8,086,961 B2 | 12/2011 | Saeki et al. |
| 8,098,140 B1 | 1/2012 | Escobosa et al. |
| RE43,181 E | 2/2012 | Liu et al. |
| 8,122,163 B2 | 2/2012 | Morohashi |
| 8,146,077 B2 | 3/2012 | McNally et al. |
| 8,169,649 B2 | 5/2012 | Chang et al. |
| 8,184,324 B2 | 5/2012 | Chang et al. |
| 8,285,802 B2 | 10/2012 | Chang et al. |
| 8,295,406 B1 | 10/2012 | Sorrells et al. |
| 8,296,757 B2 | 10/2012 | Chang et al. |
| 8,332,521 B2 | 12/2012 | Chang et al. |
| 8,339,496 B2 | 12/2012 | Shiohara |
| 8,359,397 B2 | 1/2013 | Traversat et al. |
| 8,386,557 B2 | 2/2013 | Fillebrown et al. |
| RE44,103 E | 3/2013 | Williams |
| 8,448,215 B2 | 5/2013 | Hassell et al. |
| 8,467,969 B2 | 6/2013 | Nielsen et al. |
| 8,533,352 B2 | 9/2013 | Chang |
| 8,535,151 B2 | 9/2013 | Walter |
| 8,583,263 B2 | 11/2013 | Hoffberg et al. |
| 8,595,717 B2 | 11/2013 | Chang et al. |
| 8,630,000 B2 | 1/2014 | Chang et al. |
| 8,705,097 B2 | 4/2014 | Chang et al. |
| 8,706,627 B2 | 4/2014 | Shore |
| 8,707,185 B2 | 4/2014 | Robinson et al. |
| 8,711,408 B2 | 4/2014 | Chang et al. |
| 8,797,926 B2 | 8/2014 | Kearney, III et al. |
| 8,892,691 B2 | 11/2014 | Pantos et al. |
| 8,964,220 B2 | 2/2015 | Chang et al. |
| 8,972,610 B2 | 3/2015 | Chang |
| 8,989,064 B2 | 3/2015 | Chang et al. |
| 9,009,060 B2 | 4/2015 | McNally |
| 9,015,329 B2 | 4/2015 | Chang et al. |
| 9,031,537 B2 | 5/2015 | Ortiz et al. |
| 9,036,181 B2 | 5/2015 | Chang et al. |
| 9,037,088 B2 | 5/2015 | Chang et al. |
| 9,042,811 B2 | 5/2015 | Chang et al. |
| 9,043,482 B2 | 5/2015 | Chang |
| 9,069,510 B2 | 6/2015 | Chang et al. |
| 9,075,504 B2 | 7/2015 | Takeuchi |
| 9,092,177 B2 | 7/2015 | Chang et al. |
| 9,092,535 B1 | 7/2015 | Gough |
| 9,099,152 B2 | 8/2015 | Marcus |
| 9,100,825 B2 | 8/2015 | Schultz et al. |
| 9,110,622 B2 | 8/2015 | Chang et al. |
| 9,116,723 B2 | 8/2015 | Chang et al. |
| 9,122,429 B1 | 9/2015 | Cecile et al. |
| 9,164,718 B2 | 10/2015 | Chang et al. |
| 9,210,340 B2 | 12/2015 | Mizutani et al. |
| 9,239,912 B1 | 1/2016 | Dorwin et al. |
| 9,298,407 B2 | 3/2016 | Chang et al. |
| 9,319,405 B2 | 4/2016 | Russell et al. |
| 9,324,208 B2 | 4/2016 | Gagner et al. |
| 9,351,193 B2 | 5/2016 | Raleigh et al. |
| 9,383,956 B2 | 7/2016 | Chang et al. |
| 9,389,822 B2 | 7/2016 | Chang et al. |
| 9,491,523 B2 | 11/2016 | Margulis |
| 9,497,137 B2 | 11/2016 | Sukoff et al. |
| 9,549,835 B2 | 1/2017 | Schreck et al. |
| 9,622,058 B1 | 4/2017 | Imes |
| 9,798,516 B2 | 10/2017 | Chang et al. |
| 9,819,710 B2 | 11/2017 | Anderson et al. |
| RE46,637 E | 12/2017 | Liu et al. |
| 9,836,257 B2 | 12/2017 | Chang et al. |
| 9,836,259 B2 | 12/2017 | Chang et al. |
| 9,841,935 B2 | 12/2017 | Chang et al. |
| 9,965,233 B2 | 5/2018 | Chang et al. |
| 9,971,555 B2 | 5/2018 | Chang et al. |
| 10,037,178 B2 | 7/2018 | Chang et al. |
| 10,055,634 B2 | 8/2018 | Han et al. |
| 10,108,394 B2 | 10/2018 | Chang et al. |
| 10,126,991 B2 | 11/2018 | Chang et al. |
| 10,133,527 B2 | 11/2018 | Chang et al. |
| 10,140,071 B2 | 11/2018 | Chang et al. |
| 10,140,072 B2 | 11/2018 | Chang et al. |
| 10,140,073 B2 | 11/2018 | Chang et al. |
| 10,152,285 B2 | 12/2018 | Chang et al. |
| 10,162,596 B2 | 12/2018 | Chang et al. |
| 10,284,953 B2 | 5/2019 | Hammer et al. |
| 10,303,411 B2 | 5/2019 | Chang et al. |
| 10,326,662 B2 | 6/2019 | Gunderson et al. |
| 10,346,114 B2 | 7/2019 | Chang et al. |
| 10,359,957 B2 | 7/2019 | Chang et al. |
| 10,387,087 B2 | 8/2019 | Chang et al. |
| 10,481,846 B2 | 11/2019 | Chang et al. |
| 10,481,847 B2 | 11/2019 | Chang et al. |
| 10,489,096 B2 | 11/2019 | Chang et al. |
| 10,574,931 B2 | 2/2020 | Bakar et al. |
| 10,592,201 B2 | 3/2020 | Chang et al. |
| 10,592,202 B2 | 3/2020 | Chang et al. |
| 10,606,535 B2 | 3/2020 | Chang et al. |
| 10,642,576 B2 | 5/2020 | Chang et al. |
| RE48,066 E | 6/2020 | Liu et al. |
| RE48,088 E | 7/2020 | Liu et al. |
| 10,740,066 B2 | 8/2020 | Chang et al. |
| 10,761,791 B2 | 9/2020 | Chang et al. |
| 10,768,871 B2 | 9/2020 | Chang et al. |
| 10,841,798 B2 | 11/2020 | Chang et al. |
| 10,846,031 B2 | 11/2020 | Chang et al. |
| 10,860,290 B2 | 12/2020 | Chang et al. |
| 10,866,773 B2 | 12/2020 | Chang et al. |
| 10,873,856 B2 | 12/2020 | Chang et al. |
| 10,915,296 B2 | 2/2021 | Chang et al. |
| 10,963,169 B2 | 3/2021 | Chang et al. |
| 11,029,903 B2 | 6/2021 | Chang et al. |
| 11,096,056 B2 | 8/2021 | Chang et al. |
| 2001/0011302 A1 | 8/2001 | Son |
| 2001/0012281 A1* | 8/2001 | Hall ................ H04M 1/72563 370/338 |
| 2001/0015717 A1 | 8/2001 | Mishra et al. |
| 2001/0019953 A1 | 9/2001 | Furukawa et al. |
| 2001/0029531 A1 | 10/2001 | Ohta |
| 2001/0032254 A1 | 10/2001 | Hawkins |
| 2001/0034222 A1* | 10/2001 | Roustaei ............ H04N 1/33353 455/403 |
| 2001/0055492 A1 | 12/2001 | Wood et al. |
| 2001/0055951 A1* | 12/2001 | Slotznick ............. H04N 21/812 455/41.3 |
| 2002/0002707 A1 | 1/2002 | Ekel et al. |
| 2002/0009988 A1 | 1/2002 | Murata |
| 2002/0010756 A1 | 1/2002 | Oku |
| 2002/0012329 A1 | 1/2002 | Atkinson et al. |
| 2002/0013730 A1 | 1/2002 | Bigus |
| 2002/0017827 A1 | 2/2002 | Zuppero et al. |
| 2002/0026492 A1 | 2/2002 | Fujita |
| 2002/0038612 A1 | 4/2002 | Iwazaki |
| 2002/0042263 A1 | 4/2002 | Ishikawa |
| 2002/0049580 A1 | 4/2002 | Kutaragi et al. |
| 2002/0049839 A1 | 4/2002 | Miida et al. |
| 2002/0051200 A1 | 5/2002 | Chang et al. |
| 2002/0057452 A1 | 5/2002 | Yoshino |
| 2002/0058499 A1 | 5/2002 | Ortiz |
| 2002/0059489 A1* | 5/2002 | Davis .................... G06F 3/1204 710/72 |
| 2002/0062398 A1 | 5/2002 | Chang et al. |
| 2002/0062406 A1 | 5/2002 | Chang et al. |
| 2002/0065873 A1 | 5/2002 | Ishizuka |
| 2002/0071577 A1 | 6/2002 | Lemay et al. |
| 2002/0077980 A1 | 6/2002 | Chang et al. |
| 2002/0078101 A1 | 6/2002 | Chang et al. |
| 2002/0078161 A1 | 6/2002 | Cheng |
| 2002/0081993 A1 | 6/2002 | Toyoshima |
| 2002/0087622 A1 | 7/2002 | Anderson |
| 2002/0090912 A1 | 7/2002 | Cannon et al. |
| 2002/0092029 A1 | 7/2002 | Smith |
| 2002/0097408 A1 | 7/2002 | Chang et al. |
| 2002/0097415 A1 | 7/2002 | Chang et al. |
| 2002/0097416 A1 | 7/2002 | Chang et al. |
| 2002/0097417 A1 | 7/2002 | Chang et al. |
| 2002/0097418 A1 | 7/2002 | Chang et al. |
| 2002/0097419 A1 | 7/2002 | Chang et al. |
| 2002/0097433 A1 | 7/2002 | Chang et al. |
| 2002/0099884 A1 | 7/2002 | Chang et al. |
| 2002/0178272 A1 | 11/2002 | Igarashi et al. |

(56) References Cited

U.S. PATENT DOCUMENTS

| | | |
|---|---|---|
| 2002/0194302 A1 | 12/2002 | Blumberg |
| 2003/0002072 A1 | 1/2003 | Berkema et al. |
| 2003/0011805 A1 | 1/2003 | Yacoub |
| 2003/0013483 A1* | 1/2003 | Ausems ............ H04M 1/72522 455/556.1 |
| 2003/0013484 A1 | 1/2003 | Nishimura et al. |
| 2003/0028481 A1 | 2/2003 | Flitcroft et al. |
| 2003/0054846 A1 | 3/2003 | Parry |
| 2003/0061381 A1 | 3/2003 | Brisebois et al. |
| 2003/0061606 A1 | 3/2003 | Hartwig et al. |
| 2003/0073431 A1 | 4/2003 | Dorenbosch |
| 2003/0084177 A1 | 5/2003 | Mulligan |
| 2003/0088421 A1 | 5/2003 | Maes et al. |
| 2003/0115256 A1 | 6/2003 | Brockway et al. |
| 2003/0120754 A1 | 6/2003 | Muto et al. |
| 2003/0122934 A1 | 7/2003 | Shiohara |
| 2003/0128272 A1 | 7/2003 | Clough et al. |
| 2003/0149662 A1 | 8/2003 | Shore |
| 2003/0160993 A1 | 8/2003 | Kang |
| 2003/0211188 A1 | 11/2003 | Kachnic |
| 2003/0228842 A1 | 12/2003 | Heinonen et al. |
| 2004/0024688 A1 | 2/2004 | Bi et al. |
| 2004/0057075 A1 | 3/2004 | Stewart et al. |
| 2004/0127254 A1 | 7/2004 | Chang |
| 2004/0193900 A1 | 9/2004 | Nair |
| 2005/0078088 A1 | 4/2005 | Davis et al. |
| 2005/0086300 A1 | 4/2005 | Yeager et al. |
| 2005/0114869 A1 | 5/2005 | Iwamura et al. |
| 2005/0125664 A1 | 6/2005 | Berkema et al. |
| 2005/0204176 A1 | 9/2005 | Togawa |
| 2005/0210120 A1 | 9/2005 | Yukie et al. |
| 2005/0222963 A1 | 10/2005 | Johnson |
| 2005/0231761 A1* | 10/2005 | Pineau .................... H04L 29/06 358/1.15 |
| 2006/0013630 A1 | 1/2006 | Silverbrook et al. |
| 2006/0112414 A1 | 5/2006 | Ikonen et al. |
| 2006/0129627 A1 | 6/2006 | Phillips et al. |
| 2006/0167784 A1 | 7/2006 | Hoffberg |
| 2006/0253547 A1 | 11/2006 | Wood et al. |
| 2007/0110074 A1 | 5/2007 | Bradley et al. |
| 2007/0125860 A1 | 6/2007 | Lapstun et al. |
| 2007/0129109 A1* | 6/2007 | Silverbrook ............ H04N 5/445 455/556.1 |
| 2007/0133073 A1 | 6/2007 | Shida et al. |
| 2008/0004925 A1 | 1/2008 | Bangel et al. |
| 2008/0004965 A1 | 1/2008 | Park |
| 2008/0007482 A1 | 1/2008 | Morioka |
| 2008/0049253 A1 | 2/2008 | Chang et al. |
| 2008/0049651 A1 | 2/2008 | Chang et al. |
| 2008/0098468 A1 | 4/2008 | Cortopassi et al. |
| 2008/0146283 A1 | 6/2008 | Rao et al. |
| 2008/0201236 A1 | 8/2008 | Field et al. |
| 2008/0218776 A1 | 9/2008 | Takami et al. |
| 2008/0229335 A1 | 9/2008 | Robbin et al. |
| 2008/0250459 A1 | 10/2008 | Roman |
| 2008/0318602 A1 | 12/2008 | Chang et al. |
| 2009/0002760 A1 | 1/2009 | Chang et al. |
| 2009/0048978 A1 | 2/2009 | Ginter |
| 2009/0070411 A1 | 3/2009 | Chang et al. |
| 2009/0094457 A1* | 4/2009 | Lapstun ................ B42C 9/0006 713/168 |
| 2009/0125609 A1 | 5/2009 | Wood et al. |
| 2009/0180142 A1 | 7/2009 | Suzuki et al. |
| 2009/0290182 A1 | 11/2009 | Hashimoto et al. |
| 2010/0003966 A1 | 1/2010 | Lu et al. |
| 2010/0020199 A1 | 1/2010 | Meitav et al. |
| 2010/0020382 A1 | 1/2010 | Su et al. |
| 2010/0022755 A1 | 1/2010 | Umeda et al. |
| 2010/0039660 A1 | 2/2010 | Chang et al. |
| 2010/0039669 A1 | 2/2010 | Chang et al. |
| 2010/0201996 A1 | 8/2010 | Chang et al. |
| 2010/0203824 A1 | 8/2010 | Chang et al. |
| 2010/0227550 A1 | 9/2010 | Chang et al. |
| 2011/0016280 A1 | 1/2011 | Chang et al. |
| 2011/0034150 A1 | 2/2011 | Chang et al. |
| 2011/0035319 A1 | 2/2011 | Brand et al. |
| 2011/0035682 A1 | 2/2011 | Chang et al. |
| 2011/0138378 A1 | 6/2011 | Chang et al. |
| 2011/0145074 A1 | 6/2011 | Polizzotto |
| 2011/0167166 A1 | 7/2011 | Chang et al. |
| 2011/0167175 A1 | 7/2011 | Chang |
| 2011/0197159 A1 | 8/2011 | Chaganti et al. |
| 2011/0211226 A1 | 9/2011 | Chang et al. |
| 2011/0279829 A1 | 11/2011 | Chang et al. |
| 2011/0279863 A1 | 11/2011 | Chang et al. |
| 2011/0313775 A1 | 12/2011 | Laligand et al. |
| 2012/0036016 A1 | 2/2012 | Hoffberg et al. |
| 2012/0089299 A1 | 4/2012 | Breed |
| 2012/0226777 A1 | 9/2012 | Shanahan |
| 2012/0230315 A1 | 9/2012 | Chang et al. |
| 2012/0258700 A1 | 10/2012 | Chang et al. |
| 2013/0079141 A1 | 3/2013 | Barney et al. |
| 2013/0095887 A1 | 4/2013 | Chang et al. |
| 2013/0103775 A1 | 4/2013 | Chang et al. |
| 2013/0104052 A1 | 4/2013 | Chang et al. |
| 2013/0109353 A1 | 5/2013 | Chang et al. |
| 2013/0267204 A1 | 10/2013 | Schultz et al. |
| 2013/0297670 A1 | 11/2013 | Lundberg et al. |
| 2014/0018130 A1 | 1/2014 | Chang |
| 2014/0082604 A1 | 3/2014 | Chang et al. |
| 2014/0309806 A1 | 10/2014 | Ricci |
| 2014/0309813 A1 | 10/2014 | Ricci |
| 2014/0309862 A1 | 10/2014 | Ricci |
| 2014/0309863 A1 | 10/2014 | Ricci |
| 2014/0309870 A1 | 10/2014 | Ricci et al. |
| 2014/0310031 A1 | 10/2014 | Ricci |
| 2014/0310333 A1 | 10/2014 | Franco et al. |
| 2014/0310788 A1 | 10/2014 | Ricci |
| 2015/0238817 A1 | 8/2015 | Watterson et al. |
| 2015/0325061 A1 | 11/2015 | Gerstenberg et al. |
| 2015/0356561 A1 | 12/2015 | Chang et al. |
| 2015/0356564 A1 | 12/2015 | Chang et al. |
| 2015/0356565 A1 | 12/2015 | Chang et al. |
| 2015/0363763 A1 | 12/2015 | Chang et al. |
| 2015/0381612 A1 | 12/2015 | Chang et al. |
| 2015/0382150 A1 | 12/2015 | Ansermet et al. |
| 2016/0011836 A1 | 1/2016 | Chang et al. |
| 2016/0054962 A1 | 2/2016 | Park |
| 2016/0072975 A1 | 3/2016 | Fujioka |
| 2016/0087957 A1 | 3/2016 | Shah et al. |
| 2016/0112798 A1 | 4/2016 | Kim et al. |
| 2016/0174068 A1 | 6/2016 | Chang et al. |
| 2016/0179462 A1 | 6/2016 | Bjorkengren |
| 2016/0239232 A1 | 8/2016 | Chang et al. |
| 2016/0239243 A1 | 8/2016 | Chang et al. |
| 2016/0274839 A1 | 9/2016 | Ohguro et al. |
| 2016/0313974 A1 | 10/2016 | Chang et al. |
| 2016/0314546 A1 | 10/2016 | Malnati et al. |
| 2016/0360341 A1 | 12/2016 | Srivatsa et al. |
| 2017/0006329 A1 | 1/2017 | Jang et al. |
| 2017/0039009 A1 | 2/2017 | Chang et al. |
| 2017/0064746 A1 | 3/2017 | Chang et al. |
| 2017/0075636 A1 | 3/2017 | Chang et al. |
| 2017/0078521 A1 | 3/2017 | Chang et al. |
| 2017/0078922 A1 | 3/2017 | Raleigh et al. |
| 2017/0185376 A1 | 6/2017 | Chang et al. |
| 2017/0228202 A1 | 8/2017 | Chang et al. |
| 2017/0242649 A1 | 8/2017 | Jarvis et al. |
| 2017/0249116 A1 | 8/2017 | Chang et al. |
| 2017/0277487 A1 | 9/2017 | Chang et al. |
| 2017/0286027 A1 | 10/2017 | Chang et al. |
| 2017/0318115 A1 | 11/2017 | Peng et al. |
| 2017/0364326 A1 | 12/2017 | Chang et al. |
| 2018/0011667 A1 | 1/2018 | Chang et al. |
| 2018/0024790 A1 | 1/2018 | Chang et al. |
| 2018/0024791 A1 | 1/2018 | Chang et al. |
| 2018/0039456 A1 | 2/2018 | Chang et al. |
| 2018/0039459 A1 | 2/2018 | Chang et al. |
| 2018/0041482 A1 | 2/2018 | Chang et al. |
| 2018/0046418 A1 | 2/2018 | Chang et al. |
| 2018/0107449 A1 | 4/2018 | Krampf et al. |
| 2018/0121633 A1 | 5/2018 | Bi et al. |
| 2018/0203647 A1 | 7/2018 | Chang et al. |
| 2018/0203648 A1 | 7/2018 | Chang et al. |

(56) References Cited

U.S. PATENT DOCUMENTS

| | | |
|---|---|---|
| 2018/0227140 A1 | 8/2018 | Ansari et al. |
| 2018/0253264 A1 | 9/2018 | Chang et al. |
| 2018/0335989 A1 | 11/2018 | Chang et al. |
| 2018/0364929 A9 | 12/2018 | Chang et al. |
| 2018/0370701 A1 | 12/2018 | Maguire |
| 2019/0107980 A1 | 4/2019 | Chang et al. |
| 2019/0121585 A1 | 4/2019 | Chang et al. |
| 2019/0121613 A1 | 4/2019 | Chang et al. |
| 2019/0250883 A1 | 8/2019 | Chang et al. |
| 2019/0272148 A1 | 9/2019 | Chang et al. |
| 2019/0303100 A1 | 10/2019 | Chang et al. |
| 2019/0344944 A1 | 11/2019 | Maguire |
| 2019/0361617 A1 | 11/2019 | Chang et al. |
| 2019/0384547 A1 | 12/2019 | Chang et al. |
| 2020/0097225 A1 | 3/2020 | Chang et al. |
| 2020/0225889 A1 | 7/2020 | Chang et al. |
| 2021/0055891 A1 | 2/2021 | Chang et al. |
| 2021/0165632 A1 | 6/2021 | Chang et al. |

FOREIGN PATENT DOCUMENTS

| | | |
|---|---|---|
| CN | 1488106 A | 4/2004 |
| CN | 100334577 C | 8/2007 |
| CN | 1541370 B | 5/2010 |
| CN | 101833430 A | 9/2010 |
| CN | 101834892 A | 9/2010 |
| CN | 101825996 B | 5/2012 |
| DE | 19846452 A1 | 12/1999 |
| EP | 0866398 A2 | 9/1998 |
| EP | 0938041 A2 | 8/1999 |
| EP | 738949 B1 | 2/2002 |
| EP | 952513 B1 | 2/2004 |
| EP | 691619 B1 | 2/2007 |
| GB | 2357663 A | 6/2001 |
| GB | 2332764 B | 11/2002 |
| JP | H11143656 A | 5/1999 |
| JP | 11316658 A | 11/1999 |
| JP | 2000132353 A | 5/2000 |
| JP | 2000305834 A | 11/2000 |
| JP | 3382881 A | 3/2003 |
| WO | 9817032 A1 | 4/1998 |
| WO | 9833293 A1 | 7/1998 |
| WO | 9839766 A1 | 9/1998 |
| WO | 9843433 A1 | 10/1998 |
| WO | 002358 A1 | 1/2000 |
| WO | 0024192 A1 | 4/2000 |
| WO | 0044119 A1 | 7/2000 |
| WO | 0051293 A1 | 8/2000 |
| WO | 0142894 A1 | 6/2001 |
| WO | 0195096 A2 | 12/2001 |
| WO | 0195097 A2 | 12/2001 |
| WO | 02084928 A2 | 10/2002 |
| WO | 2007030191 A2 | 3/2007 |

OTHER PUBLICATIONS

United States Patent and Trademark Office, Corrected Notice of Allowability for U.S. Appl. No. 09/992,413, dated Apr. 4, 2018, 7 pages.
Declaration of Dr. Vijay Madisetti in support of Petition for Post-Grant Review of U.S. Pat. No. 10,303,411. Dec. 23, 2019.
Markus Albrecht et al., "IP Services over Bluetooth: Leading the Way to a New Mobility," IEEE Proceedings of 24th Conference on Local Computer Networks (Oct. 18-20, 1999, Lowell, MA).
United States Patent and Trademark Office, Notice of Allowance for U.S. Appl. No. 13/477,987, dated Sep. 26, 2014, 42 pages.
United States Patent and Trademark Office, Notice of Allowance for U.S. Appl. No. 19/992,413, dated Oct. 15, 2014, 14 pages.
United States Patent and Trademark Office, Supplemental Notice of Allowability for U.S. Appl. No. 13/477,987, dated Jan. 21, 2015, 7 pages.
United States Patent and Trademark Office, Office Action for U.S. Appl. No. 12/204,689, dated Feb. 3, 2015, 57 pages.
United States Patent and Trademark Office, Office Action for U.S. Appl. No. 12/204,695, dated Feb. 3, 2015, 57 pages.
United States Patent and Trademark Office, Notice of Allowance for U.S. Appl. No. 09/992,413, dated Feb. 19, 2015, 14 pages.
United States Patent and Trademark Office, Notice of Allowance for U.S. Appl. No. 09/992,413, dated Jun. 4, 2015, 17 pages.
United States Patent and Trademark Office, Notice of Allowance for U.S. Appl. No. 12/204,695, dated Sep. 28, 2015, 33 pages.
United States Patent and Trademark Office, Notice of Allowance for U.S. Appl. No. 12/204,689, dated Oct. 5, 2015, 33 pages.
United States Patent and Trademark Office, Notice of Allowance for U.S. Appl. No. 09/992,413, dated Oct. 5, 2015, 9 pages.
United States Patent and Trademark Office, Notice of Allowance for U.S. Appl. No. 12/204,695, dated Feb. 26, 2016, 13 pages.
United States Patent and Trademark Office, Office Action for U.S. Appl. No. 11/933,031, dated Feb. 10, 2016, 106 pages.
United States Patent and Trademark Office, Notice of Allowance for U.S. Appl. No. 09/992,413, dated Aug. 11, 2016, 26 pages.
United States Patent and Trademark Office, Notice of Allowance for U.S. Appl. No. 11/933,031, dated Oct. 5, 2016, 12 pages.
United States Patent and Trademark Office, Notice of Allowance for U.S. Appl. No. 09/992,413, dated Jan. 12, 2017, 10 pages.
United States Patent and Trademark Office, Notice of Allowance for U.S. Appl. No. 09/992,413, dated May 3, 2017, 9 pages.
United States Patent and Trademark Office, Office Action for U.S. Appl. No. 11/933,031, dated Jun. 26, 2017, 28 pages.
United States Patent and Trademark Office, Notice of Allowance for U.S. Appl. No. 09/992,413, dated Aug. 23, 2017, 8 pages.
United States Patent and Trademark Office, Notice of Allowance for U.S. Appl. No. 15/785,190, dated Feb. 23, 2018, 72 pages.
Notice of Allowance prepared by the US Patent and Trademark Office for U.S. Appl. No. 15/978,076, dated Jun. 28, 2018, 19 pages.
Notice of Allowance prepared by the US Patent and Trademark Office for U.S. Appl. No. 15/785,190, dated Jul. 18, 2018, 21 pages.
Notice of Allowance prepared by the US Patent and Trademark Office for U.S. Appl. No. 15/922,741, dated Sep. 27, 2018, 76 pages.
Office Action prepared by the US Patent and Trademark Office for U.S. Appl. No. 15/787,067, dated Sep. 28, 2018, 73 pages.
Notice of Allowance prepared by the US Patent and Trademark Office for U.S. Appl. No. 15/973,317, dated Sep. 28, 2018, 71 pages.
Notice of Allowance prepared by the US Patent and Trademark Office for U.S. Appl. No. 15/973,317, dated Nov. 29, 2018, 9 pages.
Notice of Allowance prepared by the US Patent and Trademark Office for U.S. Appl. No. 15/973,317, dated Feb. 13, 2019, 14 pages.
Schulyer et al., "Solutions to Sharing Local Printers: LAN Systems Inc., LANSpool, $395 per Server", PC Week, Oct. 1989, vol. 6, No. 39, pp. 75 (2), 3 pages.
Haynie, Dave, "The Zorro III Bus Specification: A General Purpose Expansion Bus for High Performance Amiga Computers," Mar. 20, 1991, Revision 1.0, pp. 1-84.
House et al., "An on-line communication print service for the demanding client." In Proceedings of the 11th Annual International Conference on Systems Documentation (Waterloo, Ontario, Canada, Oct. 5-8, 1993). SIGDOC 93. Acm, New York, NY, 135-139, 8 pages.
Screenshots from Microsoft® NT™, Figures 5-7, 1998, 3 pages.
Bisdikian et al., "WiSAP: a wireless personal access network for handheld computing devices," Personal Communications, IEEE [see also IEEE Wireless Communications], vol. 5, No. 6, pp. 18-25, Dec. 1998, 9 pages.
Screenshots from Microsoft® Word 2000, Figures 1-4, 1999, 4 pages.
Miller, Brent, "Mapping Salutation Architecture APIs to Bluetooth Service Discovery Layer", Jul. 1, 1999, Version 1.0., 26 pages.
U.S. Appl. No. 60/224,701, U.S. Appl. No. 60/227,878, U.S. Appl. No. 60/243,654, U.S. Appl. No. 60/208,967, U.S. Appl. No. 60/220,047, U.S. Appl. No. 60/239,320.
Bettstetter et al., "A Comparison of Service Discovery Protocols and Implementation of the Service Location Protocol", Sep. 13-15, 2000, In Proceedings of the 6th EUNICE Open European Summer School: Innovative Internet Applications, 12 pages.

(56) References Cited

OTHER PUBLICATIONS

United States Patent and Trademark Office, International Search Report for PCT Application No. PCT/US01/43796, dated Mar. 20, 2002, 3 pages.
United States Patent and Trademark Office, International Preliminary Examination Report for PCT Application No. PCT/US01/43796, dated Jan. 15, 2003, 5 pages.
United States Patent and Trademark Office, Office Action for U.S. Appl. No. 09/992,198, dated Jul. 6, 2004, 7 pages.
United States Patent and Trademark Office, Office Action for U.S. Appl. No. 09/992,417, dated Oct. 27, 2004, 28 pages.
United States Patent and Trademark Office, Office Action for U.S. Appl. No. 09/992,420, dated Feb. 25, 2005, 24 pages.
United States Patent and Trademark Office, Office Action for U.S. Appl. No. 09/992,183, dated Mar. 14, 2005, 10 pages.
United States Patent and Trademark Office, Office Action for U.S. Appl. No. 09/992,198, dated Apr. 4, 2005, 8 pages.
United States Patent and Trademark Office, Office Action for U.S. Appl. No. 09/992,413, dated Jun. 29, 2007, 10 pages.
United States Patent and Trademark Office, Office Action for U.S. Appl. No. 09/992,413, dated Apr. 1, 2009, 11 pages.
United States Patent and Trademark Office, Office Action for U.S. Appl. No. 11/933,031, dated Sep. 9, 2009, 5 pages.
United States Patent and Trademark Office, Office Action for U.S. Appl. No. 09/992,183, dated Jan. 13, 2010, 11 pages.
United States Patent and Trademark Office, Office Action for U.S. Appl. No. 11/933,005, dated Apr. 30, 2010, 26 pages.
United States Patent and Trademark Office, Office Action for U.S. Appl. No. 09/992,413, dated May 25, 2010, 12 pages.
United States Patent and Trademark Office, Office Action for U.S. Appl. No. 12/204,689, dated Sep. 15, 2010, 9 pages.
United States Patent and Trademark Office, Office Action for U.S. Appl. No. 12/684,869, dated Sep. 29, 2010, 17 pages.
United States Patent and Trademark Office, Office Action for U.S. Appl. No. 09/992,413, dated Dec. 17, 2010, 14 pages.
United States Patent and Trademark Office, Office Action for U.S. Appl. No. 12/204,695, dated Dec. 21, 2010, 13 pages.
United States Patent and Trademark Office, Notice of Allowance for U.S. Appl. No. 11/933,005, dated Jan. 12, 2011, 44 pages.
United States Patent and Trademark Office, Notice of Allowance for U.S. Appl. No. 09/992,183, dated Jan. 25, 2011, 40 pages.
United States Patent and Trademark Office, Office Action for U.S. Appl. No. 12/204,689, dated Feb. 22, 2011, 33 pages.
United States Patent and Trademark Office, Office Action for U.S. Appl. No. 11/933,031, dated May 26, 2011, 63 pages.
United States Patent and Trademark Office, Office Action for U.S. Appl. No. 09/992,413, dated Sep. 14, 2011, 29 pages.
United States Patent and Trademark Office, Office Action for U.S. Appl. No. 12/204,695, dated Sep. 15, 2011, 38 pages.
United States Patent and Trademark Office, Office Action for U.S. Appl. No. 13/108,922, dated Mar. 15, 2012, 40 pages.
United States Patent and Trademark Office, Office Action for U.S. Appl. No. 13/108,925, dated Mar. 26, 2012, 30 pages.
United States Patent and Trademark Office, Notice of Allowance for U.S. Appl. No. 11/933,031, dated May 9, 2012, 60 pages.
United States Patent and Trademark Office, Office Action for U.S. Appl. No. 13/108,922, dated Nov. 5, 2012, 63 pages.
United States Patent and Trademark Office, Office Action for U.S. Appl. No. 13/108,925, dated Feb. 11, 2013, 44 pages.
United States Patent and Trademark Office, Notice of Allowance for U.S. Appl. No. 13/108,922, dated May 24, 2013, 24 pages.
United States Patent and Trademark Office, Office Action for U.S. Appl. No. 13/108,925, dated Jul. 17, 2013, 46 pages.
United States Patent and Trademark Office, Office Action for U.S. Appl. No. 11/933,031, dated Jul. 18, 2013, 60 pages.
United States Patent and Trademark Office, Office Action for U.S. Appl. No. 12/204,689, dated Aug. 15, 2013, 63 pages.
United States Patent and Trademark Office, Office Action for U.S. Appl. No. 12/204,695, dated Aug. 27, 2013, 62 pages.
United States Patent and Trademark Office, Office Action for U.S. Appl. No. 09/992,413, dated Sep. 17, 2013, 60 pages.
United States Patent and Trademark Office, Notice of Allowance for U.S. Appl. No. 13/108,922, dated Sep. 19, 2013, 44 pages.
United States Patent and Trademark Office, Notice of Allowance for U.S. Appl. No. 13/477,987, dated Feb. 25, 2014, 104 pages.
United States Patent and Trademark Office, Office Action for U.S. Appl. No. 11/933,031, dated Apr. 22, 2014, 68 pages.
United States Patent and Trademark Office, Notice of Allowance for U.S. Appl. No. 13/477,987, dated Jun. 6, 2014, 26 pages.
United States Patent and Trademark Office, Office Action for U.S. Appl. No. 12/204,689, dated Jun. 10, 2014, 59 pages.
United States Patent and Trademark Office, Office Action for U.S. Appl. No. 12/204,695, dated Jun. 10, 2014, 58 pages.
United States Patent and Trademark Office, Notice of Allowance for U.S. Appl. No. 09/992,413, dated Jun. 19, 2014, 70 pages.
Office Action prepared by the US Patent and Trademark Office for U.S. Appl. No. 15/978,076, dated Apr. 1, 2019, 85 pages.
Notice of Allowance prepared by the US Patent and Trademark Office for U.S. Appl. No. 15/973,317, dated Jun. 7, 2019, 10 pages.
Notice of Allowance prepared by the US Patent and Trademark Office for U.S. Appl. No. 16/229,896, dated Jul. 29, 2019, 7 pages.
Notice of Allowance prepared by the US Patent and Trademark Office for U.S. Appl. No. 15/924,077, dated Oct. 18, 2018, 75 pages.
Defendant Arlo Technologies, Inc.'s Opening Brief in Support of Motion to Dismiss Plaintiff's Complaint for Failure to State a Claim.
International Telecommunication Union, "Series T: Terminals for Telematic Services, Mixed Raster Content (MRC)", Apr. 1999, 55 pages.
Bluetooth, Core, "Specification of the Bluetooth System," Dec. 1, 1999, 1080 pages (attachments are in 4 parts).
White, "How Computers Work," Oct. 2003, 420 pages (attachments are in 5 parts).
Wright, "Design Goals for an Internet Printing Protocol," Apr. 1999, 43 pages.
United States Patent and Trademark Office, Notice of Allowance for U.S. Appl. No. 15/787,067, dated Aug. 29, 2019 14 pages.
United States Patent and Trademark Office, Notice of Allowance for U.S. Appl. No. 15/978,076, dated Oct. 4, 2019, 17 pages.
United States Patent and Trademark Office, Notice of Allowance for U.S. Appl. No. 15/787,067, dated Oct. 23, 2019, 7 pages.
United States Patent and Trademark Office, Notice of Allowance for U.S. Appl. No. 16/215,506, dated Aug. 6, 2020, 119 pages.
United States Patent and Trademark Office, Notice of Allowance for U.S. Appl. No. 16/696,989, dated Aug. 7, 2020, pages.
United States Patent and Trademark Office, Notice of Allowance for U.S. Appl. No. 16/696,989, dated Jan. 11, 2021, 22 pages.
Petition filed in the US Patent Trial and Appeal Board for Post Grant Review of U.S. Pat. No. 10,303,411, filed Dec. 23, 2019, 129 pages.
Defendant PetCube, Inc.'s Opening Brief in Support of Its Renewed Motion to Dismiss for Failure to State a Claim, fled in the US District Court for the District of Delaware, Nov. 5, 2019, 26 pages.
Defendant PetCube, Inc.'s Reply in Support of Its Renewed Rule 12(b)(6) Motion to Dismiss for Failure to State a claim, filed in the US District Court for the District of Delaware, Nov. 19, 2019, 15 pages.
Defendant Arlo Technologies, Inc.'s Reply Brief in Support of Motion to Dismiss Plaintiff's First Amended Complaint, fled in the US District Court for the District of Delaware, Nov. 25, 2019, 15 pages.
United States District Court for the District of Delaware Memorandum Order, Jan. 31, 2020, 9 pages.
US Patent Trial and Appeal Board, Decision Granting Institution of Post-Grant Review, Jul. 7, 2020, 41 pages.
"Part 11 Wireless LAN Medium Access Control (MAC) and Physical Layer (PHY) Specifications," ANSI/IEEE Std 802.11,1999 Edition, 528 pages (split into two documents).
Judgment re: Patent Owner's Request for Adverse Judgment (dated Apr. 13, 2021) 5 pages.
Kindberg et al., "A Web Based Nomadic Computing System", HP Laboratories, Palo Alto, CA; Aug. 24, 2000, 14 pages.

(56) References Cited

OTHER PUBLICATIONS

Supplement to Part 11, Standard for Infomation Technology, IEEE Std. 802.11b, Sep. 16, 1999, 96 pages.
Order Granting Request for Ex Parte Reexamination prepared by the United States Patent and Trademark Office for U.S. Pat. No. 10,346,114, dated May 11, 2021, 21 pages.
Richard III, Golden G., "Service Advertisement and Discovery: Enabling Universal Device Cooperation" (IEEE Internet Computing Magazine, Sep./Oct. 2000), 9 pages.
Rigney, Steve, Print Servers (PC Magazine, Jan. 19, 1999), 12 pages.
Excerpts from Gerard O'Driscoll, The Essential Guide to Home Networking (Published 2000/ Reprinted 2001), 25 pages.
Axis Print Server Brochure (archived on Sep. 25, 2000, available at https://web.archive.org/web/20000925114525/http:/www.axis.com/ftp/pub/axis/data_sheets/npsds.pdf), 4 pages.
Excerpts from UPnP Forum Connections Newsletter, Third Quarter 2000 (archived on Aug. 16, 2000, available at https://web.archive.org/web/20000816073400/http://upnp.org/newsletter/default.htm, https://web.archive.org/web/20000818105427/http://www.upnp.org/newsletter/devtools.htm), 6 pages.
Excerpts from Bluetooth Core Specification v1.0 B (Dec. 1, 1999), 60 pages.
Excerpts from Roy Hoffman, Data Compression in Digital Systems (1997), 189 pages.
Excerpts from Michael Miller, The Complete Idiot's Guide to Home Theater Systems (2000), 58 pages.
Petition for Inter Partes Review of U.S. Pat. No. 10,740,066 (Apr. 2, 2021) 96 pages.
Petition for Inter Partes Review of U.S. Pat. No. 8,989,064 (Apr. 9, 2021) 93 pages.
Petition for Inter Partes Review of U.S. Pat. No. 10,346,114 (Apr. 9, 2021) 78 pages.
Daniel O. Awduche, On Resource Discovery Systems with Mobile Hosts (1996), 6 pages.
IEEE Standard for Information Technology—Transport Independent Printer/System Interface (TIP/SI) (1997), 124 pages.
Macintosh PowerBook User's Manual (1998), 94 pages.
Setting Up Your PowerBook (2000), 80 pages.
Office Action prepared by the U.S. Patent and Trademark Office for U.S. Appl. No. 16/836,573, dated Jun. 24, 2021, 102 pages.
Request for ExParte Reexamination of U.S. Pat. No. 10,346,114 (Apr. 8, 2021), 106 pages.
Mark Weiser, "The Computer for the 21st Century", 1991, 8 pages.
Haartsen, Jaap, Bluetooth - "The Universal Radio Interface for Ad Hoc, Wireless Connectivity", 1998, 8 pages.
Goland, Yaron Y. et al., "Simple Service Discovery Protocol/1.0 RFC", Oct. 18, 1999,18 pages.
Microsoft Corporation, Univeral Plug and Play Device Architecture, Version 1.0, Jun. 8, 2000, 54 pages.
Microsoft Corporation, Understanding Universal Plug and Play (White Paper), 2000, 45 pages.
Brent A Miller, et al., Home Networking with Universal Plug and Play, 2001, 6 pages.
U.S. Appl. No. 60/243,925, filed in the U.S. Patent and Trademark Office on Oct. 26, 2000, 24 pages.
Apple—AirPort Express—On the Go, 2004, 2 pages.
Stuart Cheshire & Marc Krochmal, DNS-Based Service Discovery, Jun. 20, 2003, 30 pages.
Apple, Rendezvous Technology Brief, 2002, 5 pages.
Apple, Bonjour Technology Brief, 2005, 6 pages.
Apple, Airport Extreme Technology Overview, Apr. 2004, 37 pages.
Upnp, UPnP AV Architecture, Jun. 25, 2002, 22 pages.
Upnp, UPnP MediaServer Device Template, Jun. 25, 2002, 12 pages.
Upnp, UPnP MediaRenderer Device Template, Jun. 25, 2002, 12 pages.
Apple—AirPort Express—Technical Specifications, 2004, 2 pages.
Apple—AirPort Express—Unwire Your Home, 2004, 2 pages.
Apple—AirPort Extreme Regulatory Certification, 2007, 2 pages.
Apple—AirPort Express—AirTunes, 2004, 3 pages.
Apple "Open Sources" Rendezvous, 2003, 2 pages.
Apple—Apple Unveils AirPort Express for MAC & PC Users , 2004, 3 pages.
Apple—Apple TV (1st generation)—Technical Specifications , 2016, 2 pages.
Apple—Apple TV Users Guide, 2007, 48 pages.
Apple—Bonjour Overview, 2006, 32 pages.
Broadband Internet Access for Dummies, IDG Books Worldwide, Inc. 2001, 310 pages (split into two documents).
D-Link DP-313 Wireless Print Server Quick Installation Guide, Aug. 2001, 12 pages.
D-Link DP-313 Wireless Print Server Quick Installation Guide TCP/IP Printing (LPR for Windows 95/98/Me/2000), 2001, 21 pages.
D-Link Quick Installation Guide DSM-320, MediaLounge Entertainment Network, 2004, 16 pages.
D-Link Wireless Media Player User Manual Version 1.7, 2006, 115 pages.
D-Link Wireless Print Server, DP-313 User's Manual, 2006, 26 pages.
Apple—DNSServiceDiscovery API (Socket-Based), 2003, 66 pages.
Firefly Roku—Using Firefly Media Server with Roku SoundBridge, 2006, 12 pages.
Roku—HD1000 High-Def Digital Media Player, 2003, 2 pages.
Roku—Roku HD1000 Helpful Tips (For customer who want to share photos & music from the Mac), 2003, 11 pages.
Roku—User Guide For Software Release 1.5.18, 2004, 34 pages.
Roku—Configuring the Roku HD1000 to use a Wi-Fi Adapter with Security (WEP), 2004, 15 pages.
Roku—Supported PhotoBridge HD1000 Wi-Fi Hardware, 2005, 2 pages.
Roku—Roku HD1000 Helpful Tips (For customers who want to share files from Windows 98), 2003, 8 pages.
Roku—Roku HD1000 Helpful Tips (For customers who want to share files from Windows 2000), 2003, 12 pages.
Roku—Roku HD1000 Helpful Tips (For customers who want to share files from Windows XP Professional), 2003, 4 pages.
HP—HP Wireless Print Server Guide, 2001, 29 pages.
Apple—Apple Introduces the New iMAC G5, 2006, 4 pages.
Apple—Mac mini—Front Row, 2006, 1 page.
Apple—Mac mini User's Guide, 2006, 96 pages.
Roku—User Guide For Software Release 1.5.18, 2004, 35 pages.
Roku—SoundBridge Network Music Player User Guide, 2006, 40 pages.
Roku—SoundBridge Network Music Player M1000, 2005, 2 pages.
Roku Wi-Fi Media Streaming Modules, 2005, 4 pages.
Wireless Multimedia Link SL300i, 2003, 2 pages.
Wifi Wireless Multimedia Link SL400i, 2003, 54 pages.
Roku SoundBridge Press, Awards & Accolades, 2006, 4 pages.
Roku SoundBridge Network Music Player, 2005, 40 pages.
How to upgrade your Streamium (SI300I, SL400I, MX6000i, Streamium TV), 2004, 1 page.
Apple—YouTube Coming to Apple TV, May 30, 2007, 3 pages.
Apple—YouTube Live on Apple TV Today; Coming to iPhone on Jun. 29, 2007, 3 pages.
D-Link DSM-320 Wireless Media Player, MediaLounge Entertainment Network, 2002, 115 pages.
Edwards, Keith W., "Discovery Systems in Ubiquitous Computing", Pervasive Computing, IEEE CS and IEEE ComSoc, 2006, 8 pages.
D-Link Wireless Media Player, Info Sheet, MediaLounge Entertainment Network, 2004, 2 pages.

* cited by examiner

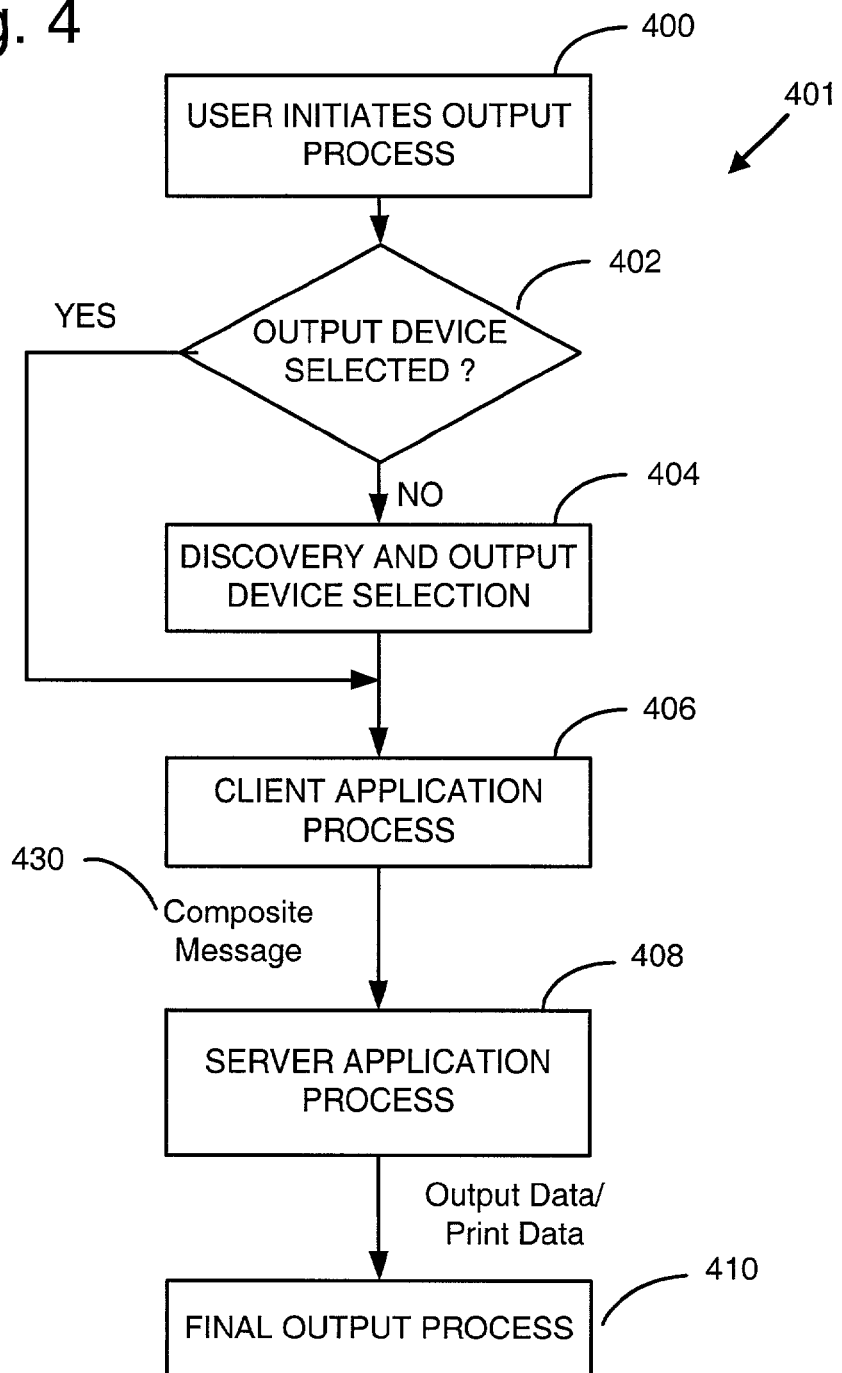

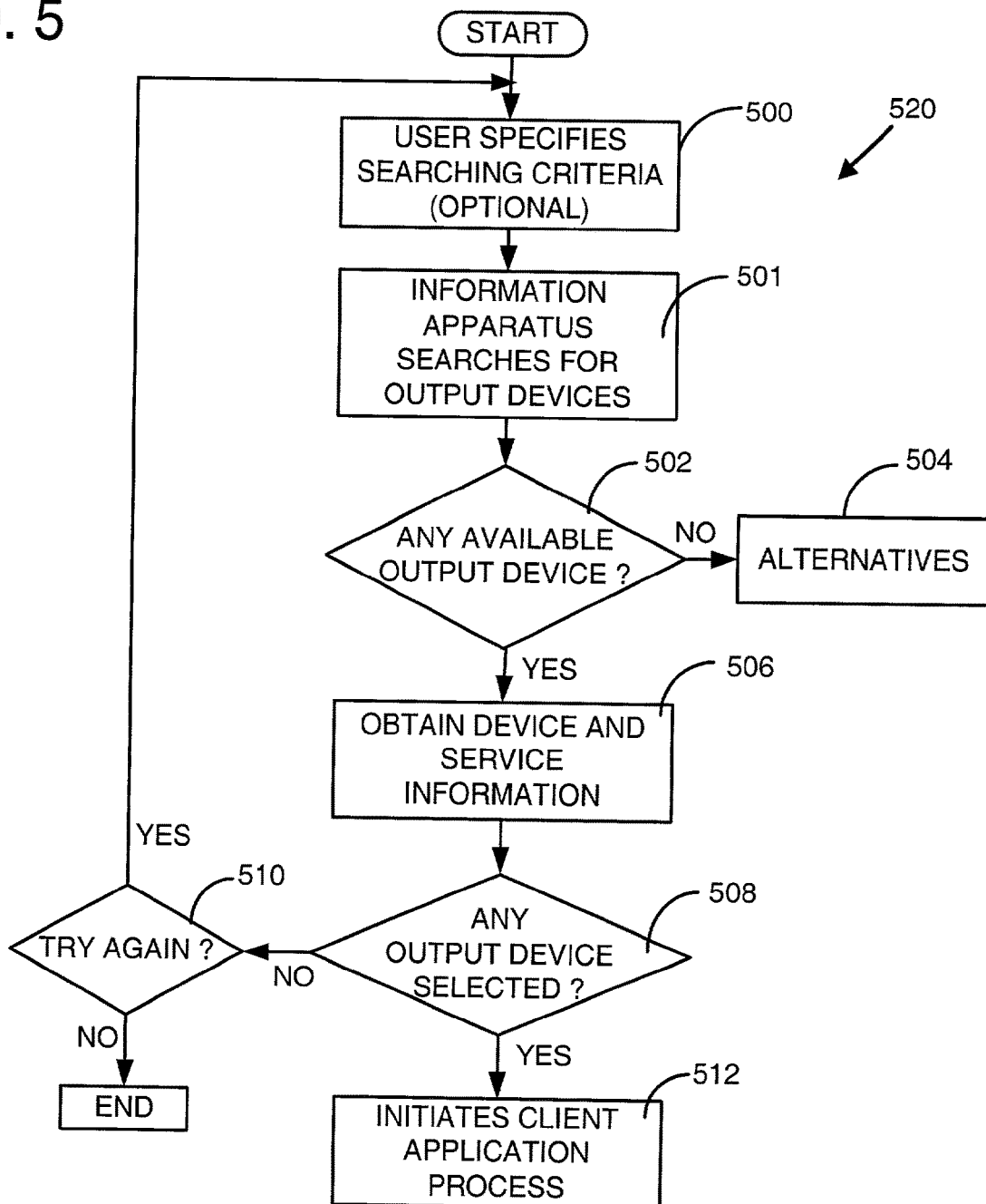

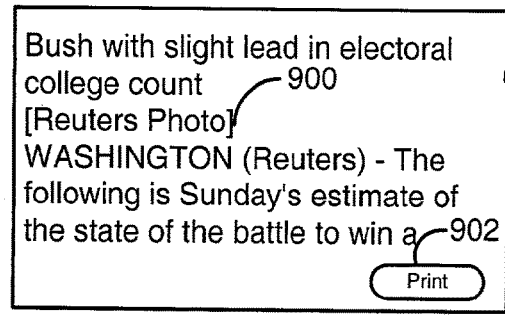
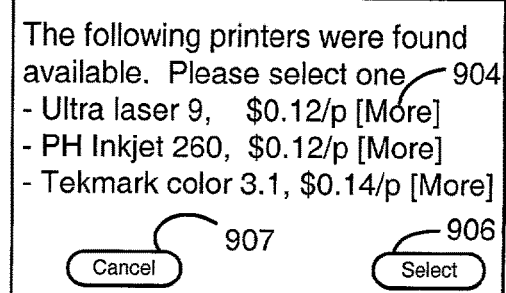
Fig. 9 A    Fig. 9 B
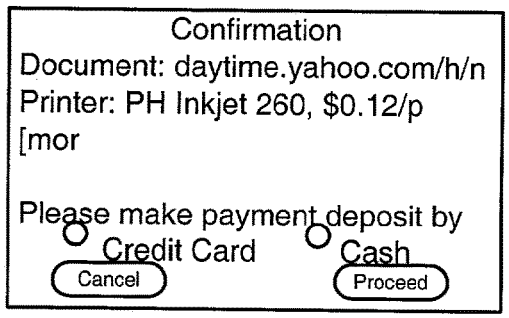
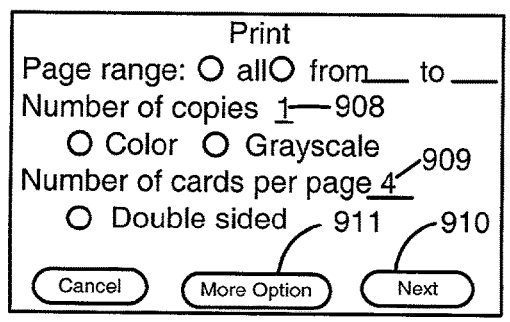
Fig. 9 C    Fig. 9 D
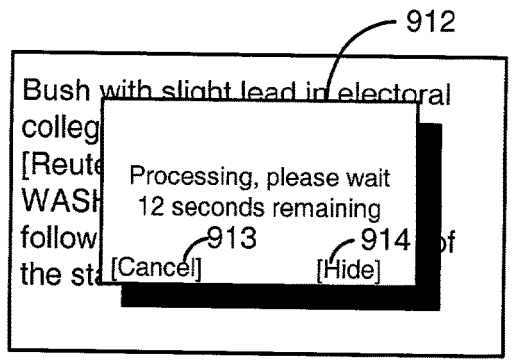
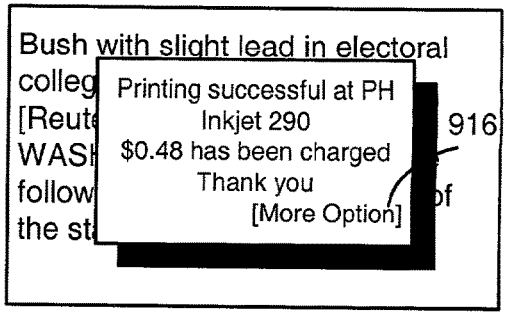
Fig. 9 E    Fig. 9 F

METHOD FOR CAPTURING, STORING, ACCESSING, AND OUTPUTTING DIGITAL CONTENT

CROSS-REFERENCE TO RELATED APPLICATIONS

This application is a continuation of U.S. patent application Ser. No. 15/924,077 filed Mar. 16, 2018, which is a continuation of U.S. patent application Ser. No. 09/992,413 filed Nov. 18, 2001, which claims benefit of U.S. Provisional Patent Application Ser. No. 60/252,682 filed Nov. 20, 2000. The complete disclosure of the above patent applications is hereby incorporated by reference for all purposes.

TECHNICAL FIELD OF THE INVENTION

Present invention relates to providing digital content to an output device and, in particular, to providing pervasive output in which an information apparatus can pervasively output digital content to an output device regardless of the processing power, display screen size and memory space of the information apparatus.

BACKGROUND AND SUMMARY OF THE INVENTION

As described herein, information apparatuses refer generally to computing devices, which include both stationary computers and mobile computing devices (pervasive devices). Examples of such information apparatuses include, without limitation, desktop computers, laptop computers, networked computers, palmtop computers (hand-held computers), personal digital assistants (PDAs), Internet enabled mobile phones, smart phones, pagers, digital capturing devices (e.g., digital cameras and video cameras), Internet appliances, e-books, information pads, and digital or web pads. An output device may include any one or more of fax machines, printers, copiers, image and/or video display devices (e.g., televisions, monitors and projectors), and audio output devices.

For simplicity and convenience, hereafter, the following description may refer to an output device as a printer and an output process as printing. However, it should be understood that the term printer and printing used in the discussion of present invention may refer to a specific example used to simplify description or may be one exemplary embodiment. The reference to printer and printing used here is intended to be applied or extended to the larger scope and definition of output devices and should not be construed as restricting the scope and practice of present invention.

Fueled by ever-increasing bandwidth and processing power and ever-increasing numbers of wireless mobile devices and available software applications for pervasive devices, millions of users are or will be creating, downloading, and transmitting content and information using their pervasive computing devices. As a result, there is a need to allow users to easily output content and information from their pervasive computing devices to any output device. People need to output directly and conveniently from their pervasive information apparatus, without depending on synchronizing with a stationary computer (e.g., desktop personal computer) for printing, as an example.

To illustrate, an information worker at an airport receiving Email in his hand-held computer may want to walk up to a nearby printer or fax machine to have his e-mail printed. In addition, the mobile worker may also want to print a copy of his to-do list, appointment book, business card, and his flight schedule from his mobile device. As another example, a user reading a news article using his/her Internet-enabled pager or mobile phone may want to print out the complete article instead of reading it through the small screen on the pager or mobile device. In still another example, a user visiting an e-commerce site using his mobile phone may want to print out pictures of the product he/she is buying because the pictures (image and/or graphics) may not be displayed on the small screen of his/her mobile phone. In yet another example, a user who takes a picture with a digital camera may want to easily print it out to a nearby printer. In still another example, a user with a mobile device may want to simply walk up to a printer and conveniently print a file that is stored on the mobile device or that is stored on a network (e.g., Internet, corporate network) and accessible from the mobile device, such as a PowerPoint® display application document, word processing document, or a document in any other file format such as PDF, HTML, JPEG etc. In addition, a user should also be able to print a web page or a book or a report published on the Internet. Finally, a user may want to output a complete web page or any document or file to a larger display screen nearby, even though the small screen of his/her mobile device cannot completely display or open a document of such a size.

Conventionally, an output device (e.g., a printer) is connected to an information apparatus via a wired connection such as a cable line. A wireless connection is also possible by using, for example, radio communication or infrared communication. Regardless of wired or wireless connection, a user must first install in the information apparatus an output device driver (e.g., printer driver in the case the output device is a printer) corresponding to a particular output device model and make. Using a device-dependent or specific driver, the information apparatus may process output content or digital document into a specific output device's input space (e.g., printer input space). The output device input space corresponds to the type of input that an output device (e.g., a printer) understands (herein referred to as output data or print data in the case the output device is a printer). For example, the printer input space or print data may include printer specific input format (e.g., one or more of an image format, graphics format, text format, audio format, video format, file format, and data format), encoding, language (e.g., page description language, markup language etc), instructions, protocols or data that can be understood or used by a particular printer make and model.

Output data may be proprietary or published or a combination of the two. An output device's input space or output data is therefore, in general, device dependent. Different output device models may have their own input spaces specified, designed or adopted by the output device manufacturer (e.g., the printer manufacturer) according to a specification for optimal operation. Consequently, different output devices usually require use of specific output device drivers (e.g., printer drivers) for accurate output (e.g., printing). For example, a printer driver may control, manage, communicate, and output print data to a printer. Sometimes, instead of using a device driver (e.g., printer driver), the device driving feature may be included or as part of an application software.

Installation of a device driver (e.g., printer driver) or application may be accomplished by, for example, manual installation using a CD or floppy disk supplied by the printer manufacturer. Or alternatively, a user may be able to download that particular driver or application from a network. For a home or office user, this installation process may take anywhere from several minutes to several hours depending on the type of driver and user's sophistication level with computing devices and networks. Even with plug-and-play driver installation, the user is still required to execute a multi-step process for each printer or output device.

This installation and configuration process adds a degree of complexity and work to end-users who may otherwise spend their time doing other productive or enjoyable work. Moreover, many unsophisticated users may be discouraged from adding new peripherals (e.g., printers, scanners, etc.) to their home computers or networks to avoid the inconvenience of installation and configuration. Therefore, there is a need to provide a manner in which a user can more conveniently or easily output digital content to an output device without the inconvenience of finding and installing new device drivers or printer drivers.

In addition, conventional output or printing methods may pose significantly higher challenges and difficulties for mobile device users than for home and office users. The requirement for pre-installation of a device-dependent driver diminishes the benefit and concept of mobile (pervasive) computing and output. For example, a mobile user may want to print or output e-mail, PowerPoint® presentation documents, web pages, or other documents in an airplane or at an airport, gas station, convenient store, kiosk, hotel, conference room, office, home, etc. It is highly unlikely that the user would find at any of these locations a printer of the same make and model as is at the user's base station. It is usually not a viable option to pre-install all of the possible hundreds, or even thousands, of printer drivers or device drivers available to the user's information apparatus.

As a consequence, the user would currently have to install and configure a printer driver each time at each such remote location before printing. Moreover, the user may not want to be bothered with looking for a driver or downloading it and installing it just to print out or display one page of email at the airport. This is certainly an undesirable and discouraging process to promote pervasive or mobile computing. Therefore, a more convenient or automated printing and output solution is needed so that a user can simply walk up to an output device (e.g., printer or display device) and easily output a digital document without having to install or pre-install a particular output device driver (e.g., printer driver).

Another challenge for mobile users is that many mobile information apparatuses have limited memory space, processing capacity and power. These limitations are more apparent for small and low-cost mobile devices including, for example, PDAs, mobile phones, screen phones, pagers, e-books, Internet Pads, Internet appliances etc. Limited memory space poses difficulties in installing and running large or complete printer or device drivers, not to mention multiple drivers for a variety of printers and output devices. Slow processing speed and limited power supply create difficulties driving an output device. For example, processing or converting a digital document into output data by a small mobile information apparatus may be so slow that it is not suitable for productive output. Heavy processing may also drain or consume power or battery resources. Therefore, a method is needed so that a small mobile device, with limited processing capabilities, can still reasonably output digital content to various output devices.

Finally, some small mobile devices with limited display screens, such as mobile phones, may in some cases be limited to display only a few lines of text. Browsing the Internet with such devices can be a disappointing experience when viewing, for example, complex web pages containing rich formats, graphics, and images. Furthermore, some small mobile devices may not have appropriate applications to display complex documents or languages such as PDF-format files, word processing documents and PowerPoint® presentation documents etc. Typically, if an application is available, displaying complex original documents on small mobile devices may require downsizing the document or page into, for example, a few lines of text. As an example, WAP protocol, I-Mode, and web clipping among others may downsize, reduce or truncate information on the original web page for display on mobile devices. Therefore, it is desirable to allow mobile users to output from their small information apparatuses to an output device the full richness of the original document content.

One implementation of the present invention provides an easy, friendly and convenient process for digital output. Unlike conventional output or printing, a user does not have to manually pre-install a device driver (e.g., printer driver) from a CD, floppy disk, or download the driver somewhere from a network. This is well-suited for providing output capability to small and lower-cost mobile devices with limited memory space, power supply and processing capability to still be able to output or print to an output device.

In addition, this allows small mobile devices with limited display, processing power, and memory to be able to output a digital document (e.g., PDF, HTML, PowerPoint etc) in its full original richness, without resorting to downsizing, truncating, reducing, clipping or otherwise altering the original document. A user can output the original content or document even when the small mobile device cannot display or fully display the original digital document or content.

Finally, one implementation provides a convenient method allowing users to output to an output device with or without connection to a static network. Through local communication and synchronization between information apparatus and output device, hardware and software installation for static or permanent network connectivity may not be necessary for the output device.

Additional objects and advantages of the present invention will be apparent from the detailed description of the preferred embodiment thereof, which proceeds with reference to the accompanying drawings.

BRIEF DESCRIPTION OF THE DRAWINGS

FIG. 4 is a flow diagram of a pervasive output process of the present invention.

FIG. 5 is a flow diagram of an exemplary implementation of a discovery process optionally included in the output process of FIG. 4.

FIGS. 9A-9F show a series of exemplary graphical user interfaces (GUIs) rendered at different times on a display screen of an information apparatus.

DETAILED DESCRIPTION OF PREFERRED EMBODIMENTS

Figure 1:
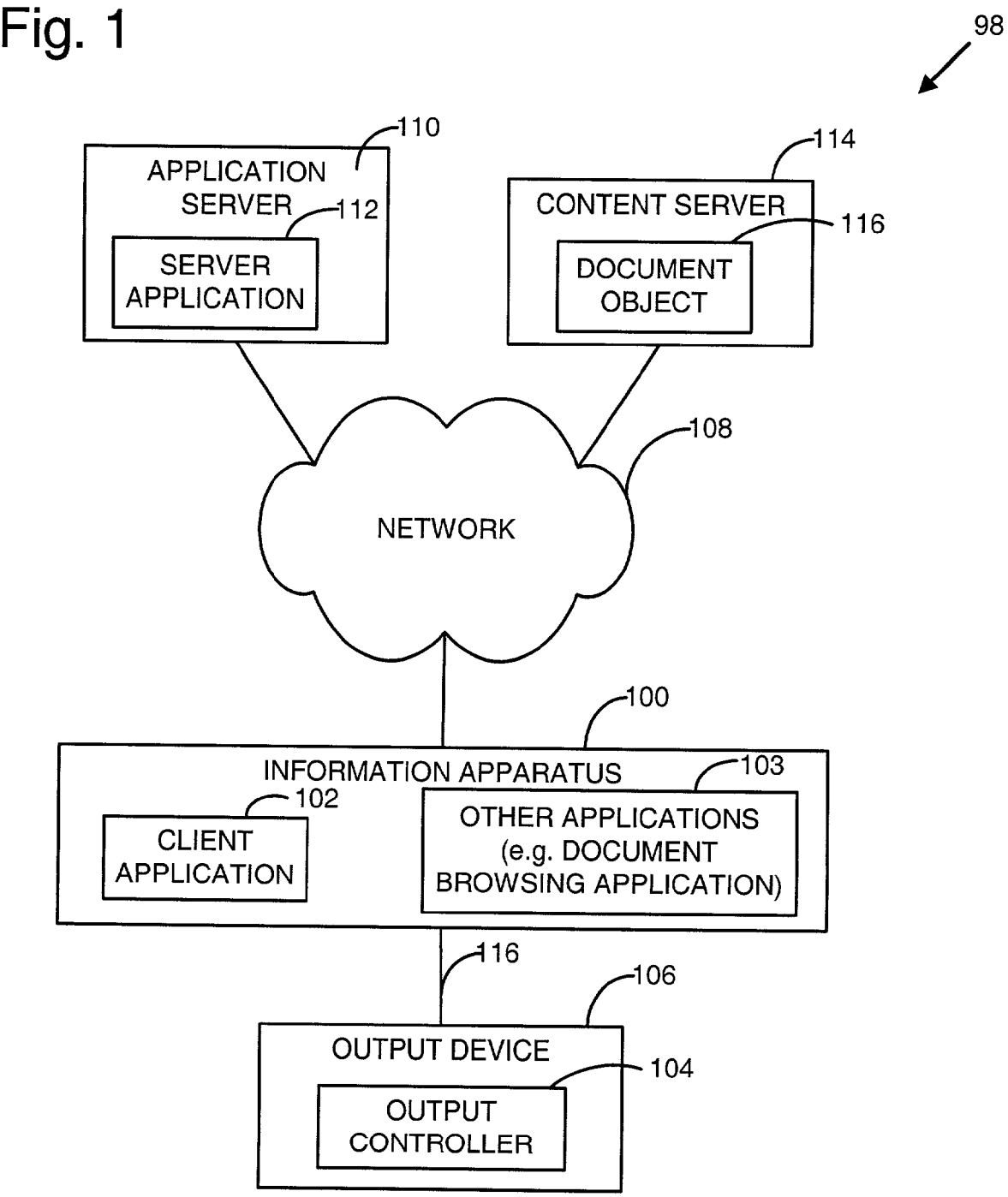
FIG. 1 is a block diagram of a pervasive output system that can implement the process and apparatus of the present invention.

Sets forth below are definitions of terms that are used in describing implementations of the present invention. These definitions are provided to facilitate understanding and illustration of implementations of the present invention and should in no way be construed as limiting the scope of the invention to a particular example, class, or category.

Objects

An object may refer to a software and data entity, which may reside in different hardware environments or platforms or applications. An object may encapsulate within itself both data and attributes describing the object, as well as instructions for operating that data. For simplicity of discussion, an object may also include, for example, the concept of software components that may have varying granularity and can consist of one class, a composite of classes, or an entire application.

It is important to note that the term object is not limited to software or data as its media. Any entity containing information, descriptions, attributes, data, instructions etc. in any computer-readable form or medium such as hardware, software, files based on or including voice, text, graphics, image, or video information, etc., are all valid forms of object definition.

An object may also contain in one of its fields or attributes a reference or pointer to another object, or a reference or pointer to data and or content. (The terms reference and pointer may be used interchangeably herein.) A reference to an object or any entity or content may include one or more, or a combination of, pointers, identifiers, names, paths, addresses or any descriptions relating to a location where an object, data, or content can be found. Examples of reference may include universal resource identifier scheme (URI), uniform resource locator (URL), IP address, file names, directory pointers, software object and component pointers, and run-time address, among others.

By way of example, a document object described in the present invention may contain or encapsulate one or more digital documents and/or one or more pointers or references to digital documents. Therefore, moving or passing document objects in connection with the present invention may include moving or passing (1) actual digital content or (2) reference to the actual content or (3) both. It will be appreciated that the document object can be quite small and lightweight if it does not also contain the digital document. These are examples of valid implementations and may be used in the description of present invention. Different implementations in different situations can be easily discerned and recognized by persons of ordinary skill in the art.

An object can reside anywhere in a network and can be transmitted to different environments, platforms, or applications. Downloading or transferring an object over the network may involve protocols such as file transfer protocol (FTP) or hypertext transfer protocol (http), among others. Transferring an object may also involve using messages or other methods through an object or component model. Three major objects used and described in present invention are output device object (or printer object in the case the output device is a printer), job object, and document object.

Output Device Object (or Printer Object in the Case the Output Device is a Printer)

An output device object may contain one or more attributes that may identify and describe, for example, the capabilities and functionalities of a particular output device such as a printer. An output device object may be stored in the memory component of an output device. As described below in greater detail, an information apparatus requesting output service may communicate with an output device. During such local service negotiation, at least a partial output device object may be uploaded to the information apparatus from the output device. By obtaining the output device object (or printer object in the case of a printer), the information apparatus may learn about the capability, compatibility, identification, and service provided by the output device.

As an example, an output device object or printer object may contain one or more of the following fields and or attribute descriptions. Each of following fields may be optional, and furthermore, each of the following fields or attributes may or may not exist in a particular implementation (e.g., may be empty or NULL).

- Identification of an output device (e.g., brand, model, registration, IP address etc.)
- Services and feature sets provided by an output device (e.g., color or grayscale output, laser or inkjet, duplex, output quality, price per page, quality of service, etc.)
- The type of input languages, formats, and or output data (e.g., PostScript, PCL, XML, RTL, etc.) supported by an output device.
- Device specific or dependent profiles (e.g., output device profiles, printer profiles, color profiles, halftoning profiles, communication profiles etc.). Device profiles may include information such as color tables, resolution, halftoning, dpi (dots-per-inch), bit depth, page size, printing speed, etc. One or multiple profiles may exist.
- Payment information on a plurality of services provided by an output device.
- Information or security requirements and type of authentication an output device supports.
- Date and version of the output device object (e.g., printer object).
- Software components containing algorithms or instructions or data, which may be uploaded to run in an information apparatus, as described with reference to FIG. 1. For example, a graphical user interface (GUI) software component may be uploaded to an information apparatus. The software component may be incorporated into or launched in the information apparatus by a client application of present invention to capture a user's preferences (e.g., print quality, page layout, number of copies, number of card per page, etc.). The client application may capture these user preferences and create a job object, as described below.
- Pointer or reference to any one or more output device parameters (output device parameters include one or more of the above described output device object fields and or attribute descriptions). For example, a more up-to-date or original version of output device parameters may sometimes be stored in a network node. An output device or may include pointer or pointers to these output device parameters.

Pointer or reference to another object or objects, including output device object, job object (described below) or document object.

Job Object

A job object may contain attributes and information that describe an output job. A user may provide some or all of these attributes, preferences and or information about the output job consciously by, for example, specifying his/her preference through a GUI or through defaults in his/her information apparatus. Alternatively, or in combination, a job object may be obtained without active user intervention. In one instance, default parameters may be provided, obtained, negotiated or calculated without user knowledge.

Examples of attributes and information contained in a job object may include one or more of the following, among others. Each of following fields may be optional, and furthermore, each of the following fields or attributes may or may not exist in a particular implementation (e.g., may be empty or NULL):

- Preferences such as print quality, page layout, number of pages, number of cards per page, output size, color or grayscale, among others.
- Information on security, authentication, payment, subscription, identification among others.
- Information on priority or quality of service.
- Status information of the output job or process.
- Job instructions such as queuing, cancellation, execution, output priority among others.
- Version or date of the job object.
- Sets of default parameters or instructions. The defaults may be stored in an output device, in the information apparatus, or in any network nodes.
- Pointer or reference to any one of the above-mentioned information, instructions, preferences and defaults.
- Pointer or reference to another object or objects.

Document Object

A document object may contain attributes and fields that describe a digital document and or reference or references to digital document or documents. The term digital document as used herein may refer to any digital content or data content that an output device may output. A digital document may contain text, graphics, image, sound, voice, forms, and video, among other content types. Examples of a digital document may be any one or combination of file types: HTML, VHTML, PostScript, PCL, XML, PDF, MS Word, PowerPoint, JPEG, MPEG, GIF, PNG, WML, VWML, CHTML, HDML, ASCII, 2-byte international coded characters, etc. A digital document can be composed of any format, language, encoding, data or combination, and the digital document may be partially or totally proprietary or otherwise. A digital document may be used interchangeably with the term output content or data content in the descriptions of present invention.

A document object may contain one or more of the following attributes, fields, or descriptions. Each of the following fields may be optional, and furthermore, each of the following fields or attributes may or may not exist in a particular implementation (e.g., may be empty or NULL).

- The actual digital document or output content.
- A pointer or reference to a digital document or output content and or instructions of where a digital document can be found and or retrieved. A digital document may be located in a user's information apparatus, in an application, or anywhere in a network node (e.g., in a content or file server). Using a pointer or reference to a digital document may reduce the size of the document object. Therefore, this may be beneficial, for example, when passing or uploading a document object from information apparatus to server application through a narrow bandwidth communication link.
- Date and version of the digital document.
- A history with the dates and descriptions of any changes, modifications, and updates made to the document since its creation.
- Descriptions and instructions for viewing, obtaining, opening, interpreting, encoding, decoding, compressing, decompressing, rendering, converting, describing, processing, and manipulating the digital document.
- Status and state of the digital document. For example, one of the fields may provide priority or instructions of when or where to use the reference to digital document or the actual digital document itself if they are both contained in a document object.
- Pointer or reference to another object or objects.

FIG. 1 is a block diagram of a pervasive output system 98 that can implement the process and apparatus of present invention. In one implementation, electronic system 98 includes an information apparatus 100, an application server 110 and a content server 114 (sometimes referred to as "network nodes") that are connected together through network 108. Electronic system 98 may also include an output device 106 that communicates with information apparatus 100 through a communication link 116.

Network 108 generally refers to any type of wire or wireless link between multiple computing devices. Examples of network 108 may include, but are not limited to, a local area network (LAN), a wide area network (WAN), or a combination of networks. In one embodiment of the present invention, network 108 may include the Internet. In another embodiment, network 108 may contain multiple networks, including local area networks or wide area networks such as the Internet.

Information apparatus 100 is a computing device with processing capability. In one embodiment, information apparatus 100 may be a mobile computing device such as palmtop computer, handheld device, laptop computer, personal digital assistant (PDA), smart phone, screen phone, e-book, Internet pad, communication pad, Internet appliance, pager, digital camera, etc. It is possible that information apparatus 100 may also include a static computing device such as a desktop computer, workstation, server, etc.

Information apparatus 100 may contain components (not shown) such as a processing unit, a memory unit, a storage unit and an input/output control unit. Information apparatus 100 may also contain an interface (not shown) for interactions with users. The interface may be implemented in software or hardware or a combination. Examples of such interfaces include, without limitation, one or more of a mouse, a keyboard, a touch-sensitive or non-touch-sensitive screen, push buttons, soft keys, a stylus, a speaker, a microphone, etc.

Information apparatus 100 typically contains at least one network communication unit that interfaces with other electronic devices such as other nodes in network 108 or output device 106. The network communication unit may be implemented with hardware (e.g., silicon chipsets, antenna), software (e.g., protocol stacks, applications) or a combination. Sometimes an information apparatus 100 may contain more than one communication unit in order to support different interfaces, protocols, and or communication standards with different devices and or network nodes. For example, information apparatus 100 illustrated in FIG. 1 may communicate with output device 106 through a Bluetooth standard interface while communicating with other network nodes (e.g., content server 114 or application server 110) through a cellular telephone modem interface.

Information apparatus 100 may be coupled to network 108 through wired or wireless connections, or a combination of them. As an example, information apparatus 100 may subscribe to a wireless data network in which packet data is transmitted through, for example, radio links between information apparatus 100 and a plurality of base stations. A wireless communication connection may include a cellular telephone communication channel. As another example, information apparatus 100 may be connected to network 108 through wired lines such as, without limitation, telephone lines, Ethernet, WAN links (e.g., T1, T3, 56 kb, X.25) or broadband connections (e.g., ISDN, Frame Relay and ATM), among others.

In one embodiment of present invention, interface 116 between information apparatus 100 and output device 106 is a wireless interface. As an example, the wireless interface may be a short-range radio interface such as those implemented according to the Bluetooth or IEEE 802.11 standard. However, the interface may be realized by other means of wireless communication such as radio, infrared, ultrasonic or hydrophonic among others. The HomeRF Shared Wireless Access Protocol (SWAP) and one of many standards for cellular communication may constitute alternatives to the Bluetooth standard. Wired line connections such as serial or parallel interface, USB interface and fire wire (IEEE 1394) interface, among others, are also possible. Connection to a local network such as an Ethernet or a token Ring network, among others, may also be implemented in the present invention for local communication between information apparatus 100 and output device 106. Exemplary hardware components of communication units that may be used to implement wireless interface between the information apparatus 100 and output device 106 are described below with reference to FIGS. 2A and 2B.

Information apparatus 100 may be a dedicated device (e.g., email terminal, web terminal, digital camera, e-book, web pads, internet appliances etc.) with functionalities that are pre-configured by manufacturers. Alternatively, information apparatus 100 may allow users to install additional hardware components and or application software to expand its functionality.

Information apparatus 100 may contain a plurality of applications to implement its feature sets and functionalities. As an example, a document browsing application 103 may be implemented to help a user view and perhaps edit, partially or entirely, digital documents written in certain format or language (e.g., Page description language, markup language, etc.). Digital documents may be stored locally in the information apparatus 100 or in a network node (e.g., in content server 114). An example of a document browsing application is an Internet browser such as Internet Explorer, Netscape Navigator, or a WAP browser. Such browsers may use one or more standard protocols (e.g., HTTP, WAP, web clipping, I-Mode, etc.) to retrieve and display digital content written in mark-up languages such as HTML, WML, XML, CHTML, HDML, among others. Other software applications may also constitute examples of the document browsing application of the present invention. For example, a document editing software such as Microsoft Word™ also allows users to view and edit digital documents that have various file extensions (e.g., doc, rtf, html, XML etc.) whether stored locally in the information apparatus or in a network node.

In some instances, restrictions may be imposed on the format or size of digital content that may be transmitted to information apparatus 100, such as when information apparatus 100 has limited processing power, screen size, memory space, or a limited application, or when bandwidth is a valuable resource in the transmission link to information apparatus 100 (such as in some wireless data network). As a result, there are situations where a user may not be able to view on information apparatus 100 the full content of a digital document in its original form using a document browsing application. For example, some images, tables, graphics, fonts and formats in a digital document may be "clipped" out or completely or partially altered from the original content before or during the transmission process. Such restrictions may be, sometimes, imposed by a service providing the content, or by the application rendering the content, or by the user to avoid slow transmission etc.

To address the difficulties described above, information apparatus 100 includes a pervasive output client application 102 that provides pervasive output capability of the present invention. Client application 102 may include software and data that can be executed by the processing unit of information apparatus 100. Client application 102 may be implemented as a stand-alone software application or as a part or feature of another application software, or in the form of device driver, which may be invoked, shared and used by other application software. Pervasive output client application 102 may also have means to invoke other applications (e.g., a document browsing application, a communication manager, etc.) to provide certain feature sets, as described below. Client application 102 may be variously implemented in an information apparatus 100 and may run on different operating systems or platforms. As an example, client application 102 may include one or more of the following functionalities:

- Obtain output device object as a result of communication or negotiation with output device 106.
- Obtain document object (1) from user input or selection, or (2) from other applications (e.g., a document browsing application) residing in the information apparatus 100.
- Coordinate with a server application 112 residing in application server 110 to manage the process of communication and transmission of objects or data to and from application server 112.
- Coordinate with output device 106 that include an output controller 104 to manage the process of transmitting output data (or print data in the case of printers) received from the server application 112 for output.

The client application may also optionally comprise one or more of the following functionalities:

- Communicate directly or indirectly (such as through an operating system or component or object model or message, etc.) with other applications residing in the same information apparatus 100 to obtain objects, data, and or content needed, or relating to the pervasive output process of present invention.
- Directly or indirectly manage and utilize functionalities provided by hardware components residing in its host information apparatus such as the communication unit, storage unit, memory unit, etc.
- Provide a graphical user interface (GUI) in its host information apparatus 100 to interact with user.
- Obtain job object. Job object may be obtained (1) by user input through a GUI, or (2) by using default values stored in a network node or in the output device, or (3) the combination of the above. Default values may be pre-set or may be obtained calculated or generated by the client application as result of communication or negotiation between client application 102, output device 106 and or server application 112.

Launch or provide an interface, session or emulation for server application 112.

Further process output data or print data received from server application 112 before sending the data to output device 106 for final output. The processing may include converting the output data into a form (e.g., format, language, or instruction) more acceptable to or compatible with the associated output device 106. The processing may also include at least in part one or more raster image processing operations such as rasterization, scaling, color management, color conversion, halftoning, compression, decompression, etc.

Launch, invoke, integrate or involve a helper application to assist at least in part in the processing of the output data.

The above functionalities and process of pervasive output client application 102 are described in further detail in the pervasive output process with reference to FIG. 4.

Output device 106 is an electronic system capable of outputting digital content or data content regardless of whether the output medium is a substrate (e.g., paper), display, projection, or sound. A typical example of output device 106 may be a printer, which outputs digital documents containing text, graphics, image or any combination onto a substrate. Output device 106 may also be a display device capable of displaying still images or video, such as, without limitation, televisions, monitors, and projectors. Output device 106 can also be a device capable of outputting sound. Any device capable of playing or reading digital content in audio (e.g., music) or data (e.g., text or document) formats is also a possible output device 106. A printer (including a fax machine, copier, etc.) is frequently referred to herein as the exemplary output device 106. However, it should be recognized that the present invention applies also to output device 106 other than printers.

Outputting a data content or output content at an output device (e.g. printers, display devices, projection devices, sound output devices etc.) includes rendering the output content on a specific output medium (e.g., papers, display screens etc). For example, rendering an output content at a printer generates image on a substrate; rendering an output content at a display device generates image on a screen; and rendering an output content at an audio output device generates sound.

A printing system includes three basic components: a raster image processor, a memory buffer, and a marking engine. The raster image processor converts digital content into a raster suitable for printing; the memory buffer holds the rasterized image ready for printing; and the marking engine transfers colorant to a substrate (e.g., paper).

Marking engine may use any of a variety of different technologies to transform a rasterized image to paper or other media or, in other words, to transfer colorant to a substrate. The different marking or printing technologies that may be used include both impact and non-impact printing. Examples of impact printing may include dot matrix, teletype, daisywheel, etc. Non-impact printing technologies may include inkjet, laser, electrostatic, thermal, dye sublimation, etc.

The marking engine and memory buffer of a printer form its printer engine, which may also include additional circuitry and components, such as firmware, software or chips or chipsets for decoding and signal conversion, etc. Input to a printer engine is usually a final rasterized print data that is generated by the raster image processor. Such input is usually device dependent and printer specific. The printer engine may take this device dependent input and generate output pages.

FIG. 10A illustrates an exemplary block diagram of one printing system or printer 1000A that includes a printer controller 1010, a memory buffer 1004, and a marking engine 1006. The printer controller 1010 includes an interpreter 1001 and a raster image processor 1002.

The Raster image processor (RIP) may be located within an output device itself (as shown by raster image processor 1002 in FIG. 10A) or externally implemented as hardware, software, or a combination (not shown). As an example, RIP may be implemented in a software application or device driver in the information apparatus 100. A RIP may also reside within a printer controller 1010 (as shown by raster image processor 1002 in FIG. 10A), a print server or an output controller 104 of present invention. Examples of raster image processing operations may include image and graphics interpretation, rasterization, scaling, segmentation, color space transformation, image enhancement, color correction, halftoning, compression etc.

When a RIP 1002 is located inside an output device 106, the RIP 1002 is usually included in a printer controller 1010 (as shown in FIG. 10A). A printer controller 1010 may interpret, convert or rasterize input print data in the form of a page description language (e.g., PostScript, PCL), markup language (e.g., XML) or other special document format or language into a final format, language or instructions that printer engine 1008 can understand.

A variety of other page description languages, markup languages, image formats, graphic formats, and file formats may be used as input print data to a printer 1000A or output device 106. Examples of possible inputs other than PostScript and PCL may include without limitation, EMF, XML, HTML, among many others. Some printer manufacturers may also employ a combination of proprietary or non-proprietary page description languages, markup languages, file formats, graphics and image formats, color spaces, metafiles, encoding, decoding, compression or decompression etc. for the print data. The print data sent to a printer with printer controller 1010 is usually an intermediate description of a digital document that may require further interpretation, processing or conversion before the print data can be sent to a printer engine 1008 for output. A printer controller 1010 may interpret and process the input intermediate print data into a final format that can be understood by the printer engine 1008. Regardless of the type of print data, conventionally, a user may need a device-specific driver in his or her information apparatus 100 in order to output the proper language, format, or file that can be accepted by a specific printer or output device 106

FIG. 10B shows another exemplary output system or an output device 1000B. An output system or output device may include one or more of a printing system or device, a display system or device, a projection system or device, or a sound system or device. In the case that the output system or device is a printer, the printer with reference to FIG. 10A does not have a printer controller 1010. A typical example of printer 1000B is a lower-cost inkjet printer. RIP operations in this example may be implemented in a software application or device driver in an information apparatus 100 that outputs to such a printer 1000B. Conventionally, a device-specific driver or application may need to reside in the information apparatus 100 to rasterize and convert the digital document from its original format into final print data (for example a compressed CMKY data with one or more bits per pixel) that can be understood by a particular printer engine 1008B.

Regardless of type or sophistication level, different output devices 106 conventionally need different printer drivers or output management applications in the information apparatus 100 to provide output capability. Some mobile devices may have limited memory and processing power to store or process multiple device drivers. It may also be infeasible to install or preinstall multiple device dependent or specific printer drivers in such mobile devices. In pervasive output operations of the present invention described below, various device specific drivers or applications may be available and may be executed completely or partially in a remote application server 110, thereby reducing the workload of information apparatus 100 and realizing device-independent pervasive output.

In one implementation, output device 106 includes at least a communication unit or adapter to interface with information apparatus 100, as described below in greater detail. Output device 106 may sometimes include more than one communication unit in order to support different interfaces, protocols, or communication standards with different devices. For example, output device 106 may communicate with a first information apparatus 100 through a Bluetooth interface while communicating with a second information apparatus 100 through a parallel interface, and so on. Exemplary hardware components of a wireless communication unit are described below with reference to FIGS. 2A and 2B.

Output device 106 may also include an output controller 104 to help manage communication and negotiation processes with information apparatus 100. Output controller 104 may be dedicated hardware or software or combination of both for at least one output device 106. Output controller 104 may also be integrated, installed, or connected externally to one or more output devices 106. In such cases the output controller 104 may sometimes be referred to as print server or output server.

The difference between output controller 104 and printer controller 1010 should be noted. Printer controller 1010 and output controller 104 are both controllers and are both dedicated hardware and or software for at least one output device 106. Output controller 104 refers to a controller with feature sets, capabilities, and functionalities of the present invention. Printer controller 1010 may contain functions such as interpreting an input page description language, raster image processing, and queuing, among others. Output controller 104 may also contain partially or all the features of a printer controller 1010, plus the feature set, functionalities, capabilities, and processes of present invention.

In one embodiment, output controller 104 does not include a communication unit, but rather utilizes or manages a communication unit residing in the associated output device 106. In another embodiment, output controller 104 may include or provide a communication unit to output device 106. For example, an output controller 104 with a wireless communication unit may be installed internally or connected externally to a legacy printer to provide it with wireless communication capability that was previously lacking.

Figure 3A:
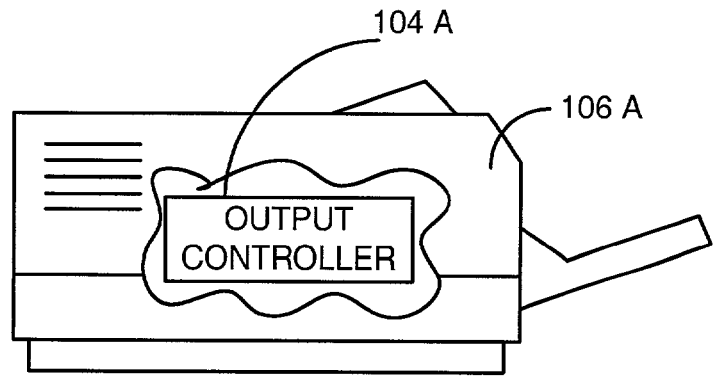
FIGS. 3A-3C illustrate various configurations and implementations of output controller with respect to an output device such as a printer.
Figure 3B:
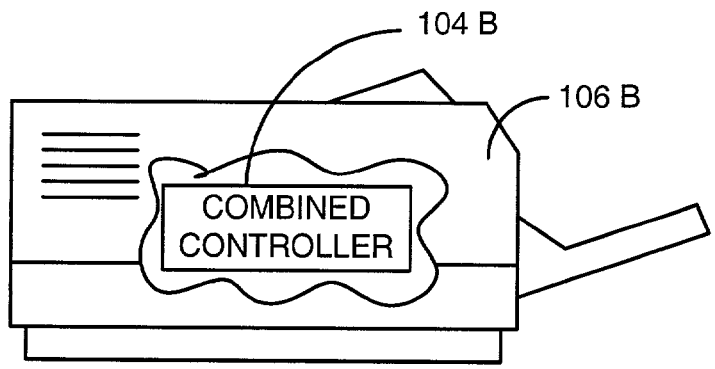
Figure 3C:
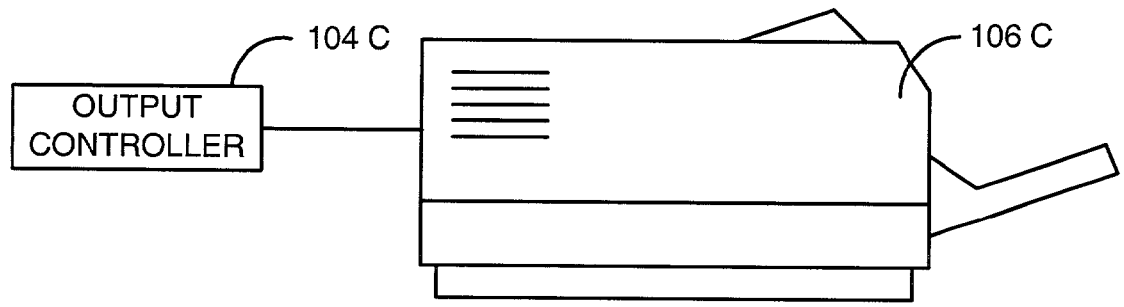

FIGS. 3A-3C show exemplary implementations of output controller 104 to illustrate that it may be implemented in a variety of ways. The output controller 104 may be connected externally to an output device 106 or integrated internally into the output device 106. FIG. 3A shows that output controller 104 may be implemented as a circuit board or a card that is installed inside an output device 106 and may include software, hardware, or both. FIG. 3C shows that output controller 104 may be implemented as an external box or station that is wired or wirelessly connected to an output device 106. Such an external box or station may contain its own user interface. One example of such an implementation is a print server connected to an output device 106. FIG. 3B shows another configuration in which the functionalities of output controller 104 may be integrated into an existing printer controller 1010 (referred to as "combined controller") which can be internally or externally (not shown) connected to output device 106. A combined controller 104B has functionalities of both printer controller 1010 (e.g., input interpretation and or raster image processing) and output controller 104 of the present invention. Under this configuration, the functionalities of output controller 104 and printer controller 1010 may share the same resources, such as processing unit, memory unit, etc.

Other possible implementations of output controller 104 may include, for example, a conventional personal computer (PC), a workstation, and an output server or print server. In these cases, the functionalities of output controller 104 may be implemented using application software installed in a computer (e.g., PC, server, or workstation), with the computer connected with a wired or wireless connection to an output device 106. Using a PC, server, workstation, or other computer to implement the feature sets of output controller 104 with application software is just another possible embodiment of the output controller 104 and in no way departs from the spirit, scope and process of the present invention.

Regardless of its manner of implementation, the output controller 104 will usually include hardware, software, or a combination. For example, an output controller 104 may include components using one or more or combinations of an application-specific integrated circuit (ASIC), a digital signal processor (DSP), a field programmable gate array (FPGA), firmware, system on a chip, and various communication chip sets. Output controller 104 may also contain embedded processors with software components or embedded application software to implement its feature sets, and functionalities.

Output controller 104 may contain an embedded operating system. With an operating system, some or all functionalities and feature sets of the output controller 104 may be provided by application software managed by the operating system. Additional application software may be installed or upgraded to newer versions in order to, for example, provide additional functionalities or bug fixes.

Output controller 104 typically includes a memory unit, or may share a memory unit with, for example, printer controller 1010. The memory unit, such as ROM, RAM, flash memory and disk drive among others, may provide persistent or volatile storage. The memory unit may store objects, codes, instructions or data (collectively referred to as software components) that implement the functionalities of the output controller 104. Part of the software components (e.g., the printer object) may be uploaded to information apparatus 100 during a data output operation.

Functionalities and components of output controller 104 for the purpose of providing pervasive output may include:

Input components and operations for receiving service requests from a plurality of information apparatuses 100.

Storage components and operations for storing partial or the entire printer or output object in a memory component.

Transmission components and operations for transmitting partial or the entire printer or output object to the information apparatus 100 requesting pervasive output service. The output controller 104 may transmit the output device object in one or multiple sessions.

Receiving components and operations for receiving output data (e.g., print data) from information apparatus 100 and sending the data to output device 106 or output engine (or printer engine) 1008.

In addition to the above functionalities, output controller 104 may further optionally include one or more of the following:

Response components and operations to respond to service request from an information apparatus 100 (e.g., in a discovery process, described below) by providing at least a partial output device object (e.g., printer object for printers).

Broadcast components and operations to broadcast or advertise the services provided by a host output device 106 to an information apparatus 100 that may request such services.

Payment components and operations for implementing payment processing and management functions by, for example, calculating and processing payments according to the services requested or rendered to a client (information apparatus 100).

Components and operations for implementing job management functionalities such as queuing and spooling among others.

User interface components and operations for providing a user interface (e.g., display screen, touch button, soft key, etc.) when it is implemented as an external box connected to an output device 106.

Security components and operations for implementing security or authentication procedures. For example, the output controller 104 may store in its memory component (or shared memory component) an access control list, which specifies what device or user may obtain service from its host (or connected) output device 106. Therefore, an authorized information apparatus 100 may gain access after confirming with the control list.

Processing components and operations to further process the output data. The processing of the output data may include converting the output data into a form (e.g., format, language, and or instruction) at least more acceptable to or compatible with the associated output device 106 or output engine or printer engine 1008. The processing may also include at least in part one or more raster image processing operations such as rasterization, scaling, color management, color conversion, halftoning, compression, decompression etc.

When output controller 104 is implemented as firmware, or an embedded application, the configuration and management of the functionalities of output controller 104 may be optionally accomplished by, for example, using controller management software in a host computer. A host computer may be a desktop personal computer (PC), workstation, or server. The host computer may be connected locally or through a network to the output device 106 or the controller 104. Communication between the host computer and the output controller 104 can be accomplished through wired or wireless communication. The management application software in the host computer can manage the settings, configurations, and feature sets of the output controller 104. Furthermore, host computer's configuration application may download and or installed application software, software components and or data to the output controller 104 for the purpose of upgrading, updating, and or modifying the features and capabilities of the output controller 104.

Output device 106 in one implementation includes or is connected to output controller 106 described above. Therefore, functionalities and feature sets provided by output controller 106 are automatically included in the functionalities of output device 106. The output device 106 may, however, implement or include other controllers and/or applications that provide at least partially the features and functionalities of the output controller 104.

Therefore, the output device 106 may include some or all of the following functionalities:

Components and operations to receive multiple service requests or queries (e.g., a service request, a data query, an object query etc.) from a plurality of information apparatus 100 and properly respond to them by returning software components, which may contain data, codes, instructions and/or objects.

Components and operations to receive, from information apparatus 100 device-specific output data containing the digital document intended for output.

Components and operations to output final output data or print data on a substrate or in another medium such as display screen.

An output device may further comprise optionally one or more of the following functionalities:

Components and operations for establishing and managing a communication link with an information apparatus 100 requesting service;

Components and operations to store and/or further process input print data or output data.

Components and operations for storing partial or the entire output device object (e.g. printer object) in a memory component.

Components and operations to advertise or broadcast services provided or available to an information apparatus 100 that may request such services.

Components and operations for implementing payment processing and management functions by, for example, calculating and processing payments according to the services requested by or rendered to a client (information apparatus 100).

Components and operations for implementing job management functionalities such as queuing and spooling among others.

Components and operations for providing a user interface (e.g., display screen, touch button, soft key, power switch, etc.).

Components and operations for implementing security or authentication procedures. For example, the output device 106 may store in its memory component (or a shared memory component) an access control list, which specifies what device or user may obtain service from it. Therefore, an authorized information apparatus 100 may gain access after confirming with the control list.

Components and operations to process the output data. The processing of the output data may include converting the output data into a form (e.g., format, language, and or instruction) more acceptable or compatible to the associated printer controller 1010, output engine or printer engine 1008. The processing may also include at least partially one or more raster image processing operations.

Application server 110 is a node on network 108. An application server 110 may include computing capability, data storage capability, and mechanisms for servicing requests from a plurality of client computers (referred to as clients), including the information apparatus 100, needing computational or data storage resources. A server typically includes processing unit, memory unit, storage unit, input/output control unit, and a communication unit, among others. Application server 110 may also include an interface to interact with users. The interface may be implemented with, for example, display screen, touch-sensitive screen, keyboard, mouse, stylus, push button, microphones and speakers among others.

Application server 110 preferably includes at least an operating system for supporting a plurality of application software to implement the functionalities of the application server 110 and to provide services to its clients (e.g., information apparatus 100). To provide services to multiple clients at the same time, the application server 110 may run a multi-user operating system that enables multiple concurrent users to log on and run applications in separate, protected sessions.

Application server 110 typically includes a server application 112 that may include software and data to be executed in the processing unit of a server node. The server application 112 may include one or more of the following functionalities:

Components and operations to receive data and/or objects (with at least an output device object and a document object) from client application 102.

Components and operations to process the objects received to generate device-dependent output data acceptable to one or more output devices 106 selected by a user. The server application 112 may perform the processing function independently or in combination with other applications.

Components and operations to transmit output data back to the client application 102.

The server application 112 may optionally include one or more of the following functionalities:

Components and operations to obtain digital document (output content) from another network node if it is not included or completely included in the document object received from client application 102.

Components and operations to obtain output device parameters if they are not included or completely included in the output device object received from client application 102.

Components and operations to obtain job object or relating parameters if it is not included or completely include in the composite message received from client application 102. The server application 112 may obtain job object by querying user or by assuming default values. For example, if a user did not specify print or output range, the server application 112 may assume the default by printing or outputting all pages.

Components and operations to manage and coordinate communication with an information apparatus 100 requesting output service.

Components and operations to identify, invoke and or incorporate appropriate applications (residing in the application server 112 or in other network nodes) to help interpret and or process the digital document obtained and generate output data. The processing of the digital document may include converting the digital document into an output data related at least in part to the output device object. The processing may also include at least in part one or more raster image processing operations such as rasterization, scaling, color management, color conversion, halftoning, compression, decompression, etc.

Components and operations to interact with (e.g., store, update, verify, etc.) one or more databases that store profiles of information apparatuses 100 and/or users who have subscribed to output service provided by the server application 112.

Components and operations to implement an independent computing architecture where the execution of the server application 112 may occur entirely in the application server 110. The GUI of the application 112, keystrokes and mouse clicks are transmitted over the network 108 to and from the client such as a user's information apparatus 100.

It should be noted that, in the example shown here, server application 112 is illustrated as the only application in application server 110. But in actuality, more than one application may exist in the application server 110 and the applications may provide various services to different clients. It is also possible that the functionalities and feature sets of the server application 112 may be implemented with multiple applications residing in the same server, multiple servers (e.g., in a server farm), or network nodes or combination.

Content server 114 may represent one of a plurality of server nodes on network 108 that may store digital documents 116. The digital documents stored in content server 114 may be viewed or edited by a user using an information apparatus 100. As an example, the content server 114 may be a web server that hosts a plurality of web pages written in markup languages such as HTML, WML, XML, HDML, CHTML, among others. A user may view web pages using an Internet browsing application such as Internet Explorer or Netscape Navigator, a WAP browser, etc. As another example, the content server 114 may be a file server that allows multiple clients to store and share digital files with appropriate security or authentication procedures. These digital files or documents may contain one or more of image, text, graphics, sound and video. The files may be saved in various file formats (e.g., MS Word, Excel, PowerPoint, PDF, Postscript, JPEG, GIF, MPEG, etc.). A user may need to have appropriate application on his/her information apparatus 100 to access, view and edit these files.

It should be noted that in FIG. 1 content server 114 and application server 110 are shown as distinct server nodes. However, it is possible that application server 110 and content server 114 belong to the same domain, or the functionalities of these two servers may be implemented with different applications executed in a single network node or server.

Further description of the functionalities and feature sets of different devices and applications illustrated in FIG. 1 is provided below in reference to a pervasive output process shown in FIG. 4.

Figure 2A:
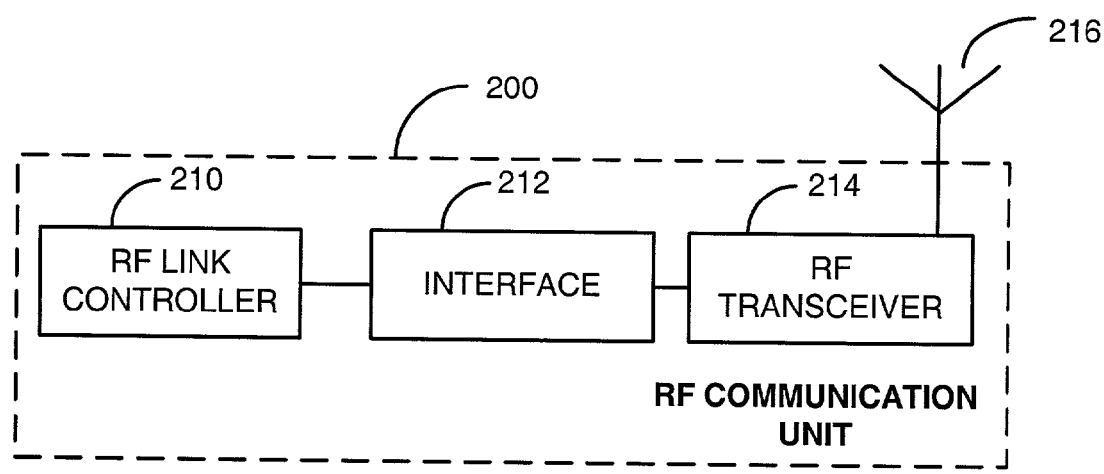
FIGS. 2A and 2B are block diagrams illustrating exemplary configurations of hardware components of wireless communication units.
Figure 2B:
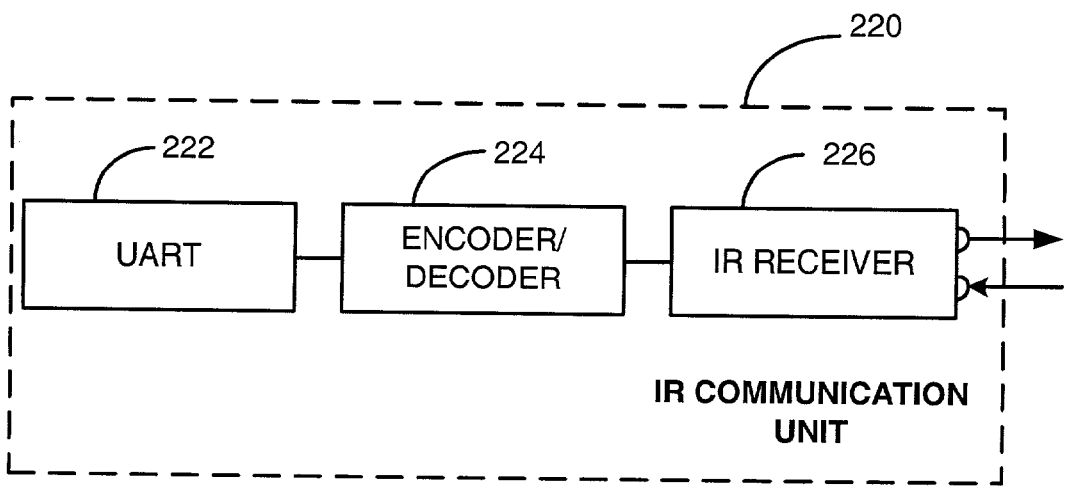

FIGS. 2A and 2B are block diagrams illustrating two exemplary configurations of hardware components of wireless communication units. Referring to FIG. 2A, a radio adapter 200 may be implemented to enable data/voice transmission among devices (e.g., information apparatus 100 and output device 106) through radio links. A RF transceiver 214 coupled with antenna 216 is used to receive and transmit radio frequency signals. The RF transceiver 214 also converts radio signals into and from electronic signals. The RF transceiver 214 is connected to a RF link controller 210 by an interface 212. The interface 212 may perform functions such as analog-to-digital conversion, digital-to-analog conversion, modulation, demodulation, compression, decompression, encoding, decoding, and other data or format conversation functions.

RF link controller 210 implements real-time lower layer (e.g., physical layer) protocol processing that enables the hosts (e.g., information apparatus 100, output controller 104, output device 106, etc.) to communicate over a radio link. Functions performed by the link controller 210 may include, without limitation, error detection/correction, power control, data packet processing, data encryption/decryption and other data processing functions.

A variety of radio links may be utilized. A group of competing technologies operating in the 2.4 GHz unlicensed frequency band is of particular interest. This group currently includes Bluetooth, Home radio frequency (Home RF) and implementations based on IEEE 802.11 standard. Each of these technologies has a different set of protocols and they all provide solutions for wireless local area networks (LANs). Interference among these technologies could limit deployment of these protocols simultaneously. It is anticipated that new local area wireless technologies may emerge or that the existing ones may converge. Nevertheless, all theses existing and future wireless technologies may be implemented in the present invention without limitation, and therefore, in no way depart from the scope of present invention.

Among the current available wireless technologies, Bluetooth may require relatively lower power consumption. Bluetooth has its own protocol stack and is designed for short range (10 meters), point-to-multipoint voice and data transfer. It is based on a frequency-hopping version of spread spectrum. Seventy-nine hop frequencies are utilized beginning at the lowest frequency of 2402 MHz and each of the 79 hop frequencies is 1 MHz above the next lower frequency. Bluetooth-enabled devices operate in piconets, in which several devices, using the same hopping pattern or sequence, are connected in a point-to-multipoint system (piconet). There is one device (master) in each piconet that determines how the bandwidth is allocated to other devices (slaves). As many as 10 piconets of 8 devices each can operate simultaneously.

Referring to FIG. 2B, one or more infrared (IR) adapters 220 may be implemented to enable data transmission among devices through infrared transmission. The IR adapters 220 may be conveniently implemented in accordance with the Infrared Data Association (IrDA) standards and specifications. In general, the IrDA standard is used to provide wireless connectivity technologies for devices that would normally use cables for connection. The IrDA standard is a point-to-point (vs. point-to-multipoint as in Bluetooth), narrow angle, ad-hoc data transmission standard designed to operate over a distance of 0 to 1 meter and at speeds up to 4 Mbps.

Configuration of infrared adapters 220 may vary depending on the intended rate of data transfer. FIG. 2B illustrates one embodiment of infrared adapter 220. Transceiver 226 receives/emits IR signals and converts IR signals to/from electrical signals. A UART (universal asynchronous receiver/transmitter) 222 performs the function of serialization/deserialization, converting serial data stream to/from data bytes. The UART 222 is connected to the IR transceiver 226 by encoder/decoder (ENDEC) 224. This configuration is generally suitable for transferring data at relatively low rate, for example 115.2 kbps or below. Other components (e.g., packet framer, phase-locked loop) may be needed for higher data transfer rates.

FIGS. 2A and 2B illustrate exemplary hardware configurations of wireless communication units. Such hardware components may be included in devices (e.g., information apparatus 100, output controller 104, output device 106, etc.) to support various wireless communications standards. Wired links, however, such as parallel interface, USB, Firewire interface, Ethernet and token ring networks may also be implemented in the present invention by using appropriate adapters and configurations.

FIGS. 3A-3C illustrate various configurations and implementations of output controller 104.

Figure 10:
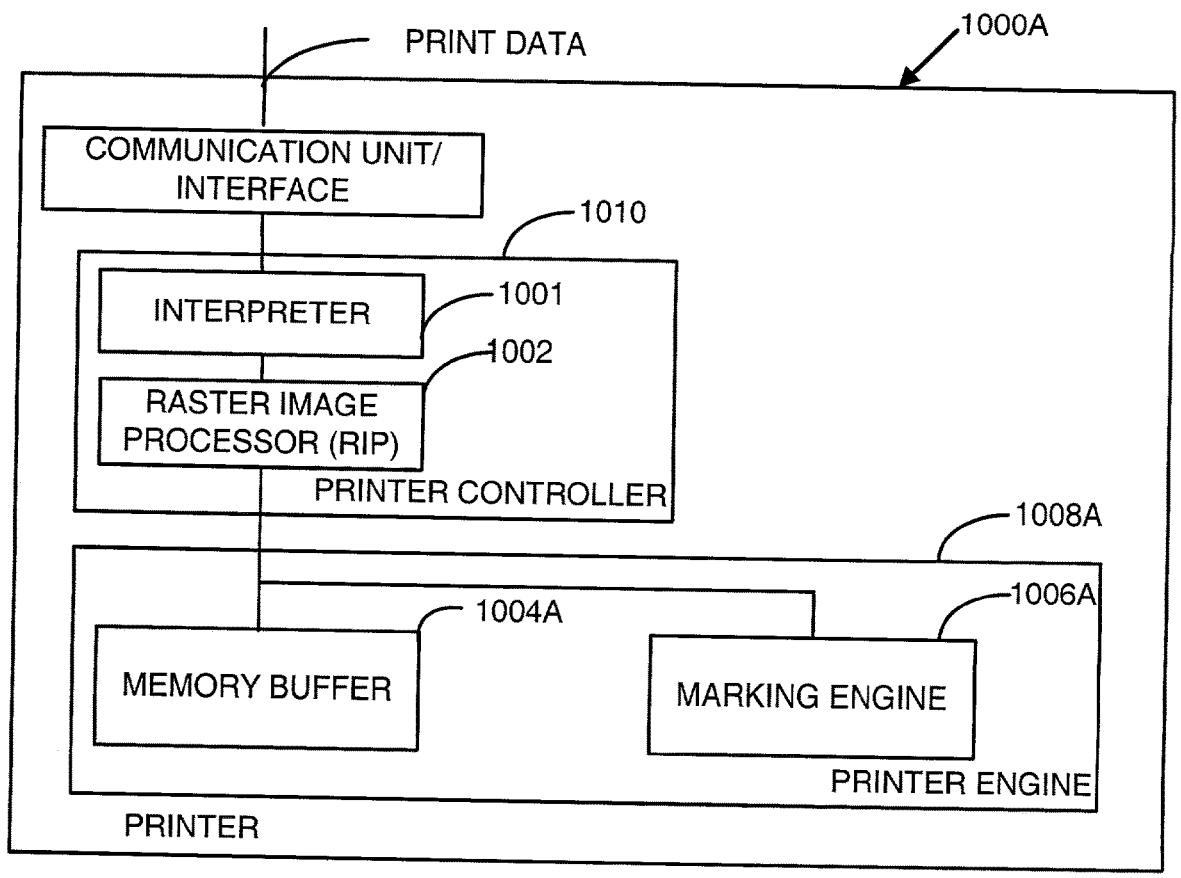
FIG. 10A is an exemplary block diagram of a conventional printing system or printer with a printer controller.
FIG. 10B is an exemplary block diagram of a conventional output system or an output device such as a printing system or printer that does not include a printer controller.
Figure 10:
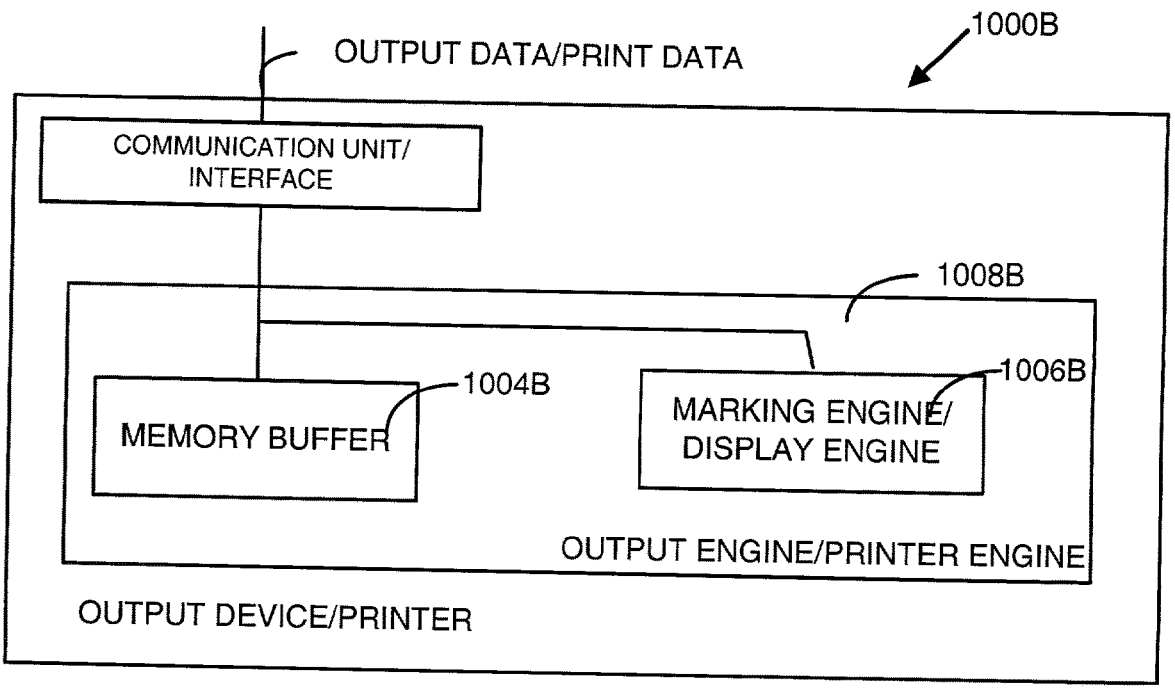

In the configuration illustrated by FIG. 3A, output controller 104A may be installed, for example as one or more boards or cards containing both hardware and software, inside output device 106(A). The output device 106(A) may or may not have inside it a printer controller 1010 (FIG. 10). In the case that output device 106(A) includes a printer controller 1010 (not shown), the output controller 104 may co-exist with the printer controller 1010 and other components of the output device 106(A). One example of this implementation is to connect or cascade output controller 104A sequentially or serially with the printer controller 1010.

In another implementation shown by FIG. 3B, the functionalities of output controller 104 and printer controller 1010 (FIG. 10) may be combined into a single controller, sometimes referred to as combined controller 104(B). The combined controller 104(B) may be implemented, for example, as one or more boards or cards containing both hardware and software, inside output device 106(B). This implementation may help to reduce the cost of material when compared to implementing two separate controllers. As an example, the combined controller 104(B) may share common processors, memories, and storage units to run the applications and functionalities of the two types of controllers and, therefore, may have lower component cost. The combined controller can also be implemented as an external box or station (not showed) connected to the output device 106. This connection could be wired or wireless.

In the third implementation shown in FIG. 3C, the output controller 104C may be implemented in a separate box or server or station connected externally to output device 106C. The communication link between output controller 104C and output device 106C may be a wired or wireless link. The output device 106C may or may not have inside it a printer controller 1010 (FIG. 10). If the output device 106C does not contain a printer controller 1010 inside, the externally connected output controller 104C may optionally contain the functionalities of printer controller 1010 and therefore, provide raster image processing capability as an additional feature.

The above are exemplary implementations and configurations of output controller 104. Other implementations are also possible. For example, partial functionalities of output controller 104 may be implemented in an external box or station while the remaining functionalities may reside inside an output device 106 as a separate board or integrated with a printer controller 1010. As another example, the functionalities of output controller 104 may be implemented into a plurality of external boxes or stations connected to the same output device 106. As a further example, the same output controller 104 may be connected to service a plurality of output devices 106. Variously implemented output controllers 104 should not depart from the spirit and scope of the present invention provided that they all support the functionalities and feature sets described herein.

FIG. 4 is a flow diagram of a pervasive output process 401 of the present invention. Pervasive output process 401 allows an information apparatus 100 to output digital content or document in its original form to an output device 106 regardless of processing power, display screen size, or memory space of information apparatus 100. Pervasive output process 401 may include or utilize:

- A client application 102, in an information apparatus 100, obtaining objects; with at least one object including a document object and another object including an output device object (or printer object in the case of a printer);
- A client application 102 transmitting objects to a server application 112;
- A server application 112 obtaining and processing the document object and converting it into output data, reflecting at least in part a relationship to said output device object;
- A server application 112 transmitting output data to the information apparatus 100 including a client application 102;
- The information apparatus 100 including a client application 102 transmitting output data to an output device 106;
- An output device 106 generating output with the output data.

Pervasive output process 401 may be initiated by a user in step 400. Typically, a user initiates output process 401 by invoking a client application 102 in his/her information apparatus 100. The client application 102 may be launched as an independent application or it may be launched from other applications 103 (such as from a document browsing, creating or editing application) or as part of or component of or a feature of another application 103 residing in the same information apparatus 100. When launched from another application 103, the client application 102 may obtain information, such as a partial or an entire document object, from that another application 103. This can be accomplished, for example, by one or combinations of messages or facilitated through an operating system or a particular object or component model etc. The client application maybe a device driver in this example.

During output process 401, a user may need to select one or more output devices 106 for output service. An optional discovery process step 404 may be implemented to help the user select an output device 106. During the discovery process step 404, a user's information apparatus 100 may (1) search for available output devices 106; (2) provide the user with a list of available output devices 106; and (3) provide means for the user to choose one or more output devices 106 to take the output job. An exemplary discovery process 404 is described below in greater detail with reference to FIG. 5.

The discovery process 404 may sometimes be unnecessary. For example, a user may skip the discovery process 404 if he or she already knows the output device (e.g., printer) 106 to which the output is to be directed. In this case, the user may simply connect the information apparatus 100 to that output device 106 by wired connections or directly point to that output device 106 in a close proximity such as in the case of infrared connectivity. As another example, a user may pre-select or set the output device or devices 106 that are used frequently as preferred defaults. As a result, the discovery process 404 may be partially or completely skipped if the default output device 106 or printer is found to be available.

In stage 406, the client application 102 may interact with output device 106, the user, and or other applications residing in the same information apparatus 100, to obtain (1) a document object, (2) an output device object and (3) any other optional objects such as a job object. These objects may be obtained sequentially, concurrently, or in any order.

It should be noted that some of the objects or partial objects might have been acquired in prior steps. For example, the client application 102 may have obtained partially or entirely document objects or related information when the client application 102 was launched from or by another application. As another example, a partial output device object may have been uploaded to the information apparatus 100 during the optional discovery process 404. The client application 102 may create a composite message including these objects (document object, output device object and other optional objects) and transmit the composite message to server application 112 for processing, as described below in greater detail with reference to FIG. 6.

The server application 112, after receiving such a composite message from the client application 102, may in step 408 processes the document object or objects contained in the composite message and convert it or them into output data. Additional helper applications may be needed to help in this processing task. The processing and generation of output data may reflect at least in part a relationship to the output device object and or job object contained in the composite message received from client application 102. The output data generated may be transmitted back to the information apparatus 100, requesting output service or process 401 via network 108. An exemplary implementation of a server application process is described below with reference to FIG. 7.

In step 410, information apparatus 100 transmits output data, with or without further processing, to the selected output device 106 through a local communication link 116. Preferably, the output data is in a format or language acceptable to or compatible with the output device 106 selected by the user. When receiving output data from information apparatus 100, an output device 106 may simply buffer the output data before sending it to output engine (or printer engine) 1008 for final output. In cases where an output device 106 includes or is connected to a printer controller 1010, output controller 104 or a combined controller, such controllers may further process the output data received from information apparatus 100 before sending the output data to printer engine 1008 for final output. Further processing, if it exists, may include at least partially conversion operations and or raster image processing operations on the output data. The output controller 104 may also provide queuing or spooling or other job management features. An exemplary implementation of such an output process is described below with reference to FIG. 8.

The steps included in pervasive output process 401 may proceed automatically when a user requests output service. Alternatively, a user may be provided with options to proceed, cancel, or input information at each and every step. For example, after the client application process step 406 is finished, the user may be asked whether or not he or she wishes to continue to communicate with a remote application server. As another example, a user may cancel the output service at any time by, for example, indicating a cancellation signal or command or by terminating the client application or by shutting down the information apparatus 100 etc.

A printer is used as a primary output device 106 in this example. It should be recognized, however, that pervasive output process 401 described above can be similarly applied to other output devices such as fax machines, digital copiers, display screens, monitors, televisions, projectors, voice output devices, among others.

FIG. 5 is a flow diagram of an exemplary implementation of a discovery process 520, which may be an optional step to help a user locate one or more output devices 106 for an output job. The discovery process 520 may, however, be skipped partially or entirely. Implementation of discovery process 520 may require compatible hardware and software components residing in both the information apparatus 100 and the output device 106.

The discovery process 520 may include or utilize:

A client application 102 in an information apparatus 100 communicating with available output devices 106 to obtain information such as partial or complete output device object or objects.

A client application 102 that provides to the user information on each available and or compatible output device 106.

User selection or determination by a client application 102 (automatically or not) of one or more devices 106 for output service from the available or compatible output devices 106.

Various protocols and or standards may be used during discovery process 520. Wireless communication protocols are preferred. Wired communication, on the other hand, may also be implemented. Examples of applicable protocols or standards may include, without limitation, Bluetooth, HAVi, Jini, Salutation, Service Location Protocol, and Universal Plug-and-play among others. Other proprietary protocols or combination may also be implemented in the discovery process 520. However, these different protocols, standards, or combination shall not depart from the spirit and scope of present invention.

In one implementation an application (referred here for simplicity of discussion as a "communication manager," not shown) residing in the information apparatus 100 helps communicate with output device 106, manage service requests and discovery process 520. The communication manager may be a part of or a feature of the client application 102. Alternatively or in combination, the communication manager may also be a separate application. When the communication manager is a separate application, the client application 102 may have the ability to communicate, manage or access functionalities of the communication manager.

The discovery process 520 may be initiated manually by a user or automatically by a communication manager when the user requests an output service with information apparatus 100.

In the optional step 500, a user may specify searching or matching criteria. For example, a user may indicate to search for color printers and or printers that provide free service. The user may manually specify such criteria each time for the discovery process 520. Alternatively or in combination, a user may set default preferences that can be applied to a plurality of discovery processes 520. Sometimes, however, no searching criteria are required—the information apparatus 100 may simply search for all available output devices 106 that can provide output service.

In step 501, information apparatus 100 searches for available output devices 106. The searching process may be implemented by, for example, an information apparatus 100 multi-casting or broadcasting or advertising its service requests and waiting for available output devices 106 to respond. Alternatively or in combination, an information apparatus 100 may "listen to" service broadcasts from one or more output devices 106 and then identify the one or more output devices 106 that are needed or acceptable. It is also possible that multiple output devices 106 of the same network (e.g., LAN) register their services with a control point (not shown). A control point is a computing system (e.g., a server) that maintains records on all service devices within the same network. An information apparatus 100 may contact the control point and search or query for the needed services.

In step 502, if no available output device 106 is found, the communication manager may provide the user with alternatives 504. Such alternatives may include, for example, aborting the discovery process 520, trying discovery process 520 again, temporarily halting the discovery process 520, or being notified when available output device 106 is found. As an example, the discovery process 520 may not detect any available output device 106 in the current wired/wireless network. The specified searching criteria (if any) is then saved or registered in the communication manager. When the user enters a new network having available output devices 106, or when new compatible output devices 106 are added to the current network, or when an output device 106 becomes available for any reason, the communication manager may notify the user of such availability.

In step 506, if available output devices 106 are discovered, the communication manager may obtain some basic information, or part of or the entire output device object, from each discovered output device 106. Examples of such information may include, but not limited to, device identity, service charge, subscription, service feature, device capability, operating instructions, etc. Such information is preferably provided to the user through the user interface (e.g., display screen, speaker, etc.) of the information apparatus 100.

In step 508, the user may select one or more output devices 106 to take the output job. If the user is not satisfied with any of the available output device 106, the user may decline the service. In this case, the user may choose to try again in step 510 with some changes made to the searching criteria. Alternatively, the user may choose to terminate the service request.

In step 512, with one or more output devices 106 selected or determined, the communication link between information apparatus 100 and the selected output device or devices 106 may be "locked". Other output devices 106 that are not selected may be dropped. The output process 520 may then proceed to a client application process 601 referenced in step 406 of FIG. 4.

Figure 6:
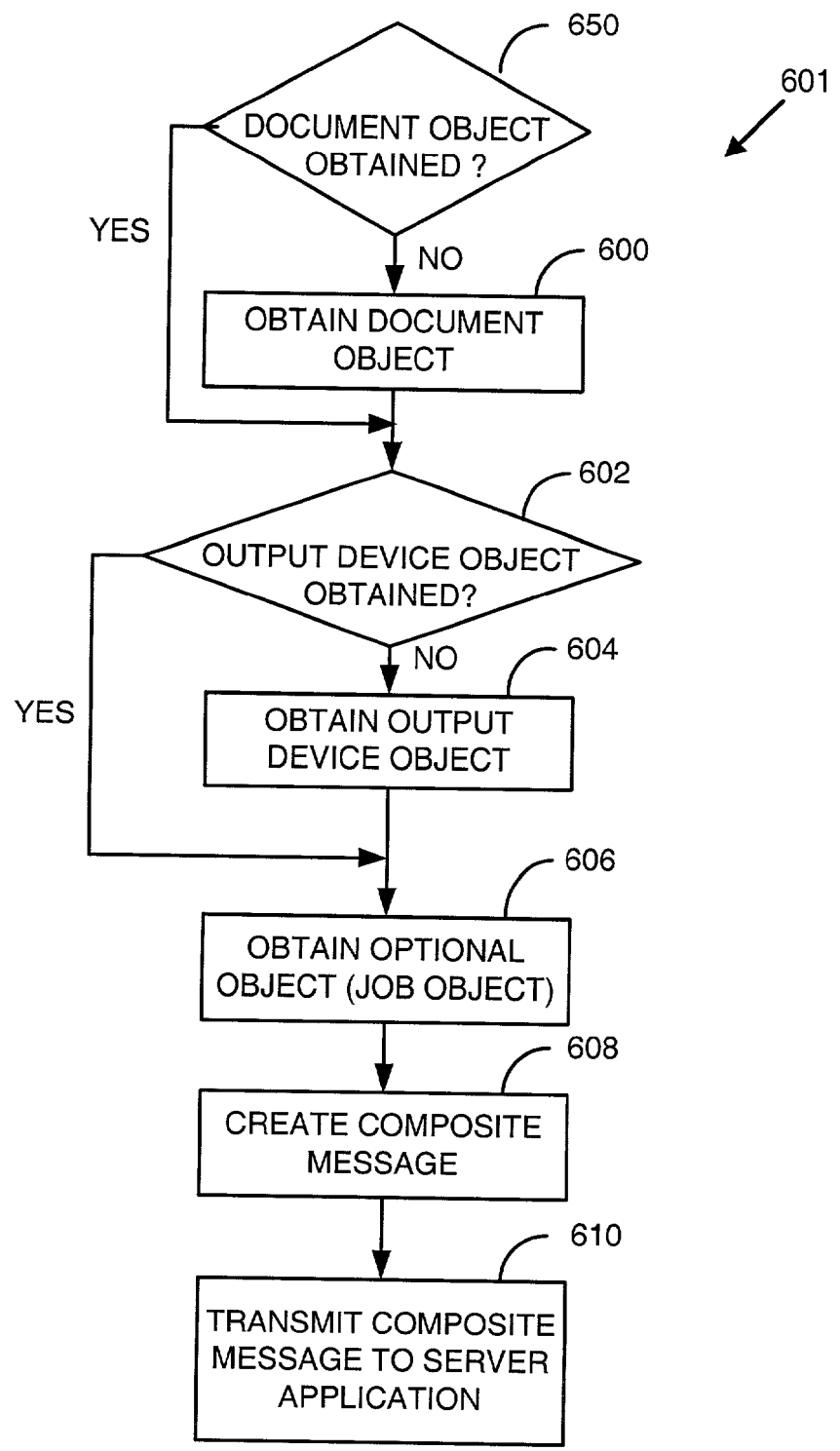
FIG. 6 is a flow diagram of an exemplary client application process included in the output process of FIG. 4.

FIG. 6 is a flow diagram of an exemplary client application process 601 that may include or utilize:

A client application 102 that obtains an output object or objects as a result of communication and or negotiation with an output device 106.

A client application 102 that obtains a document object (1) from user input or selection, or (2) from other applications (e.g., document browsing application) residing in the same information apparatus 100.

A client application 102 that coordinates with server application 112 to manage the process of communication and transmission of a composite message (including at least a printer object and a document object) to the server application 112 for further processing.

Step 600 indicates that client application 102 obtains a document object. To assemble or create a document object, the client application 102 may need to obtain output content (or a digital document) or pointers to the output content, or both. In cases where the output content is downloaded or partially downloaded to a user's information apparatus 100, the client application 102 may include both the output content and pointers to the output content in its document object. In cases where the output content is not downloaded to the information apparatus 100, the client application 102 may include only pointers to the output content in the document object.

There are various ways that a client application 102 may obtain a digital document or a pointer or reference to the digital document. In one embodiment, the client application 102 may provide a GUI with which a user can directly input the pointer or reference (e.g., URL, IP address, filename, path, etc.) of a digital document stored locally or in a network node. This manual process may be facilitated by, for example, providing a GUI with which users may select one or more pointers from a list of pointers or references of digital documents stored locally or in a remote network node. For instance, through a GUI provided by the client application 102, a user may see and select pointers of digital documents stored in a remote file server. In this case, the document object created by the client application 102 may contain only pointers or references to the output content.

In another embodiment, the client application 102 may obtain output content or pointer to output content from another application in the same information apparatus 100. As an example, a user may (1) launch the client application 102, and (2) invoke another application 103 (e.g., document editing and or browsing application) residing in the same information apparatus 100 to view or download the digital document. As another example, a user may (1) run another application 103 (e.g., document editing and or browsing application) residing in the same information apparatus 100 to view or download the digital document; and (2) launch or invoke the client application 102. In these cases, the client application 102 may communicate with another application 103 (e.g., document browsing application) to obtain pointers to the digital document and or the digital document itself (if it has been downloaded locally for viewing) to be included in document object.

It should be noted that the document object may have been partially or entirely obtained by the client application 102 in previous steps such as in step 400 of FIG. 4 in which the client application 102 is initiated. As an example, a user may (1) view or download a digital document (stored locally or in a network node) by using a document browsing application on the information apparatus 100, and (2) request output service by launching the client application 102 (as in step 400). The client application 102 may then communicate with the document browsing application to obtain the document object (including digital document and or pointers to the digital document). In this case, step 600 may be partially or entirely skipped.

In some instance such as in document browsing applications, a user may be limited to viewing or downloading only part of, or a reduced version of, the original digital document stored in a network node. This may be due to small screen size, limited bandwidth, memory size, and lack of application support, among other issues. In these cases, the client application 102 may allow the user to choose to output the original digital document or the reduced sized document. In the case of the original document, the document object created by the client application 102 may, for example, contain only references or pointers to the original output content stored in a server or network node. In the case where user wants to output the reduced version document that has been downloaded locally, the client application 102 may include in the document object one or more of (1) the obtained reduced output content (2) the reference to the reduced content in the server or network node, and (3) pointer or pointers to the original output content.

In another instance, for example, with a document browsing application, a user may see only the name or path to output content without being able to download or open it due to, for example, no compatible applications residing on the information apparatus 100, small display screen etc. According to the present invention, however, a user may still be able to output the original digital document by indicating to the client application 102 the pointer or reference of the output content. For example, the user may select or highlight the name or path of the output content through a GUI provided by the document browsing application. In this case, the document object created by the client application 102 may contain only pointers to the output content.

A document object may also contain instructions. Instructions in an object may provide description, operation, and status information of the content or data of the document object, etc. For example, instructions may provide information about the changes or differences between an output content included in a document object relative to the original output content (stored in a network node) that is pointed to by the reference field in the document object. The output content included in a document object may be an edited or altered version while the output content referred to by the pointers may be the original version.

It should be noted that some output content may be publicly available to all users (e.g., generic web pages) while other output content may be restricted to one or a group of users (e.g., secure documents stored in a corporate network). In the latter case, authentication information such as a password, user name, id number, biometric information, digital certificate or security key, among others, may need to be provided to the server application 112 for accessing and or fetching the digital document with reference to a pointer or reference. In one example, such authentication information may be included in document object, printer object, or job object. In another example, server application 112 may prompt the user to enter authentication information through a GUI in information apparatus 100 when necessary.

Step 602 indicates whether an output device object is obtained. In the case where an output device object is not obtained, then in step 604, with one or more output devices 106 selected, the client application 102 may communicate with the selected output device or devices 106 to upload output device objects or related information stored in memory or storage components of the output device or devices 106. It should be noted that a partial or entire output device object or related information might have been already obtained by the client application 102 during the prior optional discovery process (520 and step 402 in FIG. 4). In this case, step 604 may be partially or entirely skipped.

To successfully obtain the output device object or objects from the selected output device or devices 106, several additional optional processes may be involved. As an example, authentication may be necessary when the selected output device 106 provides service to a restricted group of users. A simple authentication may be implemented by, for example, comparing the identity for the information apparatus 100 with an approved control list of identities or elements stored in the output device 106. Other more complex authentication and encryption schemes may also be used. Information such as user name, password, ID number, signatures, security keys (physical or digital), biometrics, fingerprints, voice, among others, may be used separately or in combination as authentication means. Such identification and or authentication information may be manually provided by the user or automatically detected by the selected output device or devices 106. With successful authentication, a user may gain access to all or part of the services provided by an output device 106. The output device object that the client application 102 obtains may vary according to the type or quality of service requested or determined. If authentication fails, it is possible that a user may be refused partially or completely all access to the service. In this case, the user may be provided with alternatives such as selecting another output device 106 or alternative services.

Another optional process is that a user may be asked to provide payment or deposit or escrow before, during or after output service. Examples of payment or deposit may include cash, credit card, bankcard, charge card, smart card, electronic cash, among others. The output controller 104 may provide payment calculation or transaction processing as optional feature sets.

It should be noted that a plurality of information apparatuses 100 may request to obtain output device object or objects from the same output device 106 at the same time or at least during overlapping periods. The output device 106 may have components or systems to manage multiple communication links and provide the output device object or objects concurrently or in an alternating manner to multiple information apparatuses 100. Alternatively, an output device 106 may provide components or systems to queue the requests from different information apparatuses 100 and serve them in a sequential fashion according to a scheme such as first come first serve, quality of service, etc. Multi-user communication and service management capability with or without queuing or spooling functions may be implemented by, for example, the output controller 104 as optional feature sets.

Step 606 indicates that the client application 102 may optionally obtain a job object. A job object may include a user's preferences and parameters relating to the output job or process. The client application 102 may obtain a job object by, for example, capturing a user's output preferences through a GUI. In one instance, the client application 102 may provide a universal GUI to a user regardless of what output device 106 is selected. Through such an interface, the user may specify some device-independent parameters such as page range, number of cards per page, number of copies, etc. Alternatively or in combination, the client application 102 may incorporate device-dependent features and preferences into the GUI provided to user. The device dependent portion of the GUI may be supported partially or entirely by some information contained in or provided by the output device object obtained from the selected output device 106. Examples of such device dependent features may include quality of service, service fee, print quality, color or grayscale, duplex or single sided, output page size, among others.

It is possible that some or all components, attributes or fields of a job object have default values. The client application 102 may have certain defaults such as those hard-coded in software or hardware or pre-configured by the user or a manufacturer. In addition, the client application 102 may access a file to obtain default values or by other means such as communicating with the output device 106, the server application 112 or other applications in the information apparatus 100 or in a network node. The client application 102 may also create or calculate certain default values based on the information it has or obtained during the output process. These default values may be related, at least in part, to the output device object and or the server application 112 involved in the output process. In some instances, a user may or may not have an opportunity to change or overwrite some or all defaults. The client application 102 may obtain and use some or all defaults with or without user intervention or knowledge.

In step 608, the client application 102 may create or assemble a composite message. A composite message may be any type of data transferred across network 108 that may include one or more transmissions. A composite message typically includes partially or entirely the objects (with some default values) obtained by the client application 102 in previous steps.

In step 610, the client application 102 transmits the composite message to server application 112. The client application 102 may communicate with the server application 112 using one or more or a combination of standard network protocols such as WAP, Web Clipping, I-Mode, TCP/IP, SPX/IPX, PPP, NetBEUI, Apple Talk, among others. Proprietary network protocols or a combination that includes them may also be used. The communication link between information apparatus 100 and application server 112 may be implemented with one or a combination of standard network connections and communication links such as telephone lines, LAN or WAN links (T1, T3, 56 kb, X.25, etc.), broadband connections (ISDN, Frame Relay, ATM etc), wireless connection (radio link, inferred, microwave, etc.) as well as the Internet or corporate Intranets.

In addition to the composite message, the client application 102 and server application 112 may also exchange various types of messages back and forth to, for example, request service, confirm service availability, configure protocol stack, or confirm or acknowledge receipt of the previous message, among other messages. The server application 112 may also prompt the client application 102 to send or resend some components or objects of the composite message if such components or objects are incomplete, missing or corrupted. The server application 112, however, may also try to fill in default values (if available) for some or all of the information missing in the composite message. Encode/decode, compression/decompression and/or encryption techniques may be used to facilitate the transmission of the composite message.

There is a possibility that the application server 112 only provides services to users who have subscribed to such services. In this case, a user may be prompted to log in or sign up when he or she requests service from the server application 112.

The server application 112 may receive composite messages or service requests from a plurality of client applications 102 at the same time or at least during overlapping periods. It is therefore, beneficial that the server application 112 runs on a multi-user operating system that enables multiple concurrent users to run applications in separate, protected sessions.

It should be recognized that FIG. 6 illustrates only one example of the client application process 406 described with reference to FIG. 4. Other implementations are also possible. As an example, the client application 102 may obtain document objects, output device objects and optional job objects in any combination of order or sequence, or may obtain them concurrently. As another example, step 610 (transmitting composite message) may proceed before step 608 (creating composite message) is finished. In other words, during the process when client application 102 is obtaining objects from the user, output device 106, or other applications in the same information apparatus 100, the client application 102 may also communicate with the server application 112 concurrently or in alternating times to transmit partially or completely the objects it has obtained.

Figure 7:
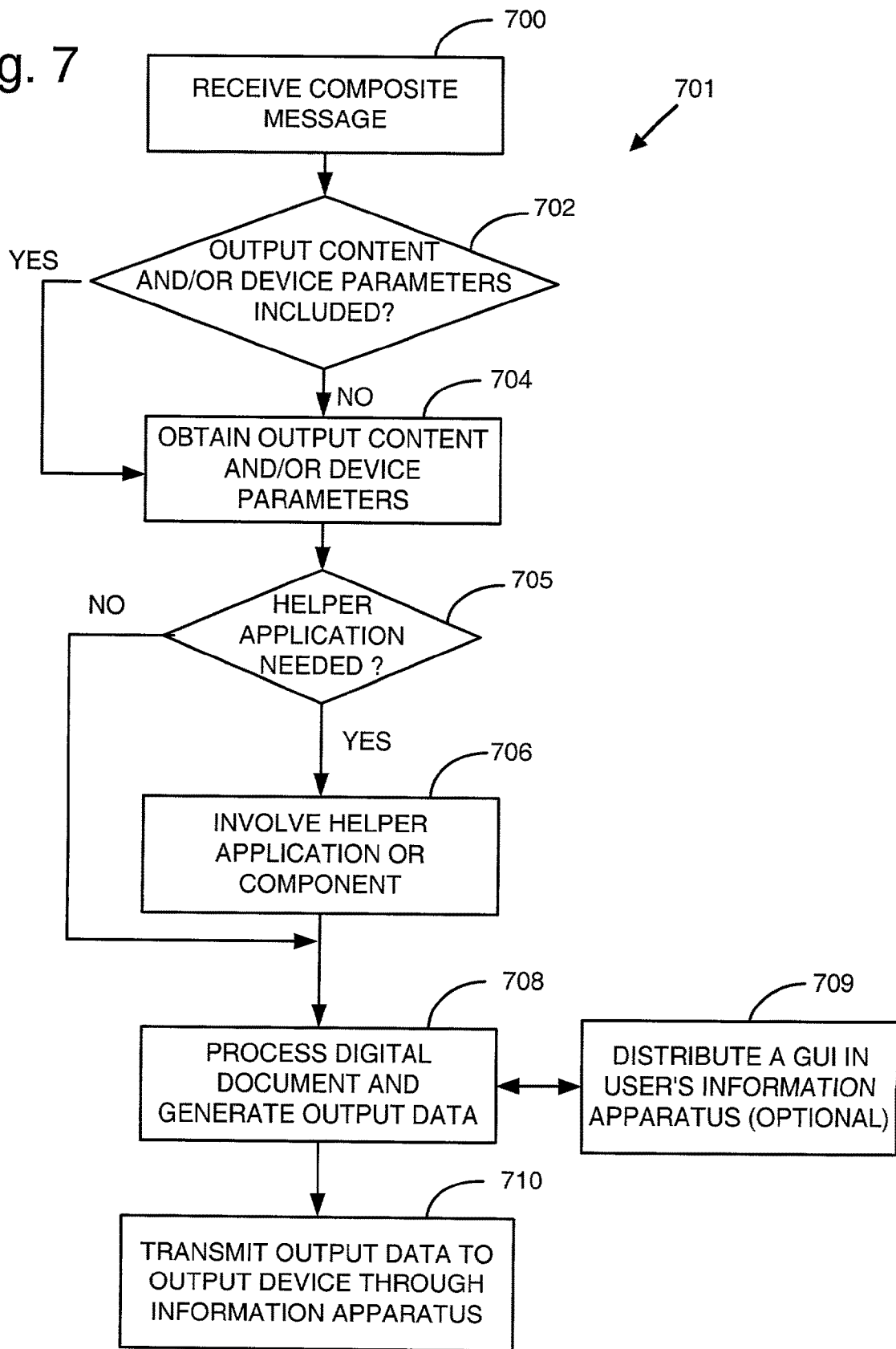
FIG. 7 is a flow diagram of an exemplary server application process utilized in the output process of FIG. 4.

FIG. 7 is a flow diagram of an exemplary server application process 701. Typically, an application server 110 is a much more powerful computing device than a mobile information apparatus 100. The server 110 may contain a plurality of applications to interpret, process, or rasterize digital documents into output data. Therefore, in one implementation the core computation of an output process is executed in the application server 110. The server application process 701 may include or utilize:

A server application 112 that receives a composite message (including an output device object and a document object) from client application 102.

A server application 112 that processes the objects received to generate device-dependent output data acceptable to one or more output devices 106 selected by a user. The server application 112 may perform the processing function independently or in combination with other applications.

A server application 112 that transmits output data back to the information apparatus 100 requesting output service or services.

In step 700, server application 112 receives a composite message from client application 102. As mentioned earlier, the composite message may include one or more of a document object, an output device object and an optional job object.

After receiving the composite message from client application 102, the server application 112 may process the document object and convert it into output data. The output data generated is preferred to be in a format or language acceptable or compatible to the output device or devices 106 selected by the user.

In some cases, the document object or output device object in a composite message may include only references, pointers and or instructions. Such a configuration may, for example, reduce the size of the composite message and therefore make it easier to transmit through a network. In another case, the document object or output device object in a composite message may include missing or incomplete information. Digital document (e.g., output content) or output device parameters may not be available or completely available in the document object or the output device object, respectively. In these cases, as shown in step 704, the server application 112 may need to find or fetch partially or entirely the output content or device parameters from network nodes or otherwise obtain the content or parameters according to the pointers, references or instructions provided by the objects. For example, an output device object received in a composite message may contain insufficient output device parameters—only the brand name and model number of a selected output device 106 may be provided. In this case, the server application 112 may either find or fetch the missing output device parameters according to pointers or references provided in the output device object, or the server application 112 may consult a translation service or application in order to obtain the complete output device parameters based on the partial or limited device information that is available. If no further information or data can be found or obtained, predefined defaults may be used to fill in missing information about the output device 106 or alternatively a warning or an error message may be provided to the user for either continuation or cancellation of the process.

Step 704 (obtaining output content and or device parameters) may be entirely or partially skipped if the output content and output device parameters are already included in the document object and output device object, respectively.

In order to process a digital document into device dependent output data, step 706 shows that the server application 112 may need to involve one or more helper applications. A helper application is any application in the server 110 or other network node that participates, helps or assists in the output process of the present invention. Examples of helper applications may include, software components, software applications, device drivers, printer drivers, etc. The helper application or applications may perform one or more of the following tasks among others:

Open, parse, or interpret a particular digital document format or language.

Convert a digital document into an intermediate format, language or data.

Process an input digital document into a raster format including, as an example, one or more raster image processing operations such rasterization, scaling, color correction, color matching, segmentation, halftoning, compression, decompression etc.

Convert or encode rasterized data into a device specific output data.

The helper applications may participate in the output process in various ways. As an example, a server application 112 may involve one or more helper applications to decode, parse, interpret, and or process a digital document into an intermediate file, format, language or data. And then the server application 112 may involve one or more helper applications to further convert the intermediate result into output data. In another example, the server application 112 may involve two or more groups of helper applications. The first group of helper applications may decode, interpret, and process a digital document into intermediate file, format, language or data. The second group of helper applications may convert the intermediate results into output data. A group may consist of one or more applications.

The server application 112 may identify, locate, invoke, launch, and or integrate the appropriate helper applications or its components based on the information (e.g., output device parameters) provided in an output device object. A translation service (e.g., database application, directory service) may provide information to the server application 112 as to where to find, obtain, or use the helper applications. The helper applications may reside locally in the application server 110 or remotely in another network node. If a helper application is located in another network node, the server application 112 may acquire or download the helper application to the application server 110. Alternatively, the server application 112, considering application availability or load balancing, may direct the digital document to be processed in another server node where the helper application or applications are run.

In some cases, however, the server application 112 may have the ability to process and generate the correct output data without involving additional helper applications and step 706 may be skipped. As an example, the server application 112 may already contain software components and feature sets capable of supporting and generating, different print data or output data formats or language such as PostScript or PCL or XML etc. Therefore, if the output device object indicates that the output device 106 is a PostScript printer or any other that it supports, the server application 112 may not need to invoke, or download or incorporate a helper application or a helper application component such as a PostScript driver. The server application 112 may just proceed and convert the digital document into a PostScript file as print data. PostScript is used here as an example, other formats, languages, data used for other types of print data or output data follows the same fashion.

When fetching output content or device parameters or software components or drivers from other network nodes, the server application 112 may need authentication information in order to gain access. Such authentication information may be already stored in the server application 112 (e.g., in a user profile), in the received objects (e.g., job object, output device object or document object), or the user may input authentication information as needed.

While processing digital content in step 708, the server application 112 may also distribute or send a presentation or GUI to a client device (e.g., information apparatus 100) to inform the user of the processing status (shown in step 709). The presentation or GUI in the client device may also capture user's preferences and inputs such as login information, security information among other preferences or inputs. This client/server implementation described here may provide an efficient computing environment. For example, logic for the server application 112 may run in the application server 110 and its distributed user interface may run in the client device (e.g., information apparatus 100). Therefore, only data relating to keystrokes, mouse clicks and screen updates may, as an example, travels through the network. This client/server implementation may reduce bandwidth requirements. Such a GUI may be implemented by, for example, instructing the client application 102 to launch on the display screen of the client information apparatus 100 a plurality of windows emulating the user interface of the server application 112. The presentation of the server application interface may be displayed efficiently through these windows in the client application 102.

If the server application 112 receives no job object or an incomplete job object in a composite message, the server application 112 may assume default values for the job object or optionally, as shown in step 709, it may also launch a GUI in the information apparatus 100 as described above to obtain partially or entirely the job object fields (job preference) from the user. Information provided in the job object may be used in the process of generating output data (step 708).

It is noted that the output data (or print data in the case of a printer) generated by the server application 112 may or may not be the final output data or the final print data that can feed directly into an output engine or a printer engine 1008. The output data sent to output device 106 through information apparatus 100 may in some cases need further processing by an application in the information apparatus 100 or by the output controller 104 or printer controller 1010 or combination before finally being sent to output engine or printer engine 1008. All these different combinations of processes and tasks or load distributions are possible implementations that shall fall within the scope and spirit of the present invention.

In step 710, the server application 112 transmits output data to the information apparatus 100 through network 108. Encryption techniques may be applied to the output data to ensure security. Compression/decompression, encode/decode may also be implemented to facilitate the transmission of output data over network 108.

Figure 8:
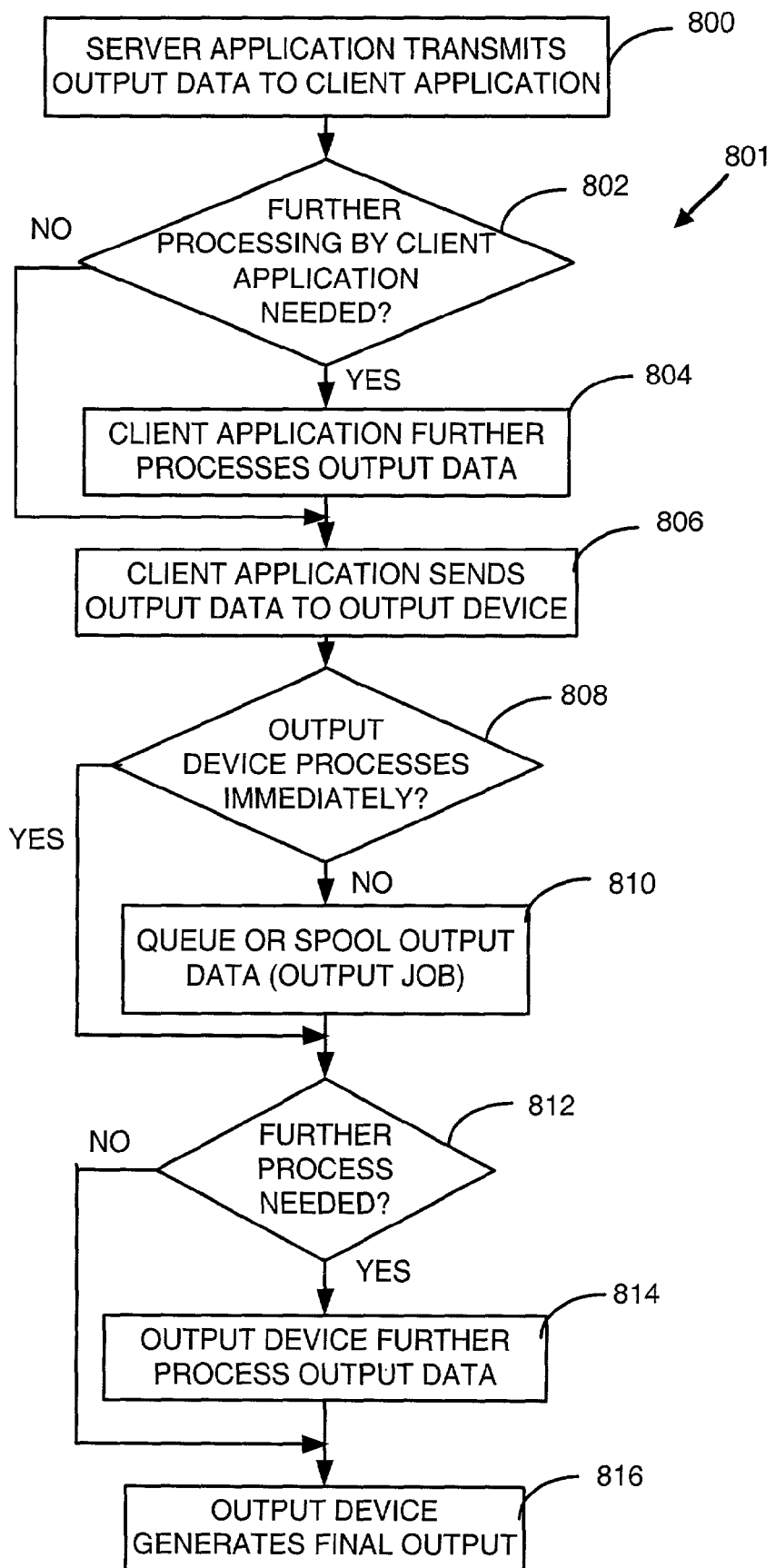
FIG. 8 is a flow diagram of an exemplary final output process for pervasive output.

FIG. 8 is a flow diagram of an exemplary final output process 801 for pervasive output, which may include or utilize:

A server application 112 transmits output data to information apparatus 100.

An information apparatus 100 transmits output data, with or without further processing, to the output device 106 selected by the user.

An output device 106 generates final output based on the input output data with or without further processing.

After receiving output data from server application 112, the information apparatus 100 may then transmit the output data to the output device 106 selected by the user in step 806. In some cases, the client application 102 may further process the output data (as shown in step 804). This further processing in the information apparatus 100 may include one or more operations such as encoding, decoding, compression, decompression, rasterization, scaling, color correction, halftoning, watermarking, adding templates, name, time stamps, etc., as shown in step 804, before sending the output data to the output device 106 through communication link 116 in step 806. The client application 102 may involve other applications 103 for part or all of the processing in step 804.

During the time when server application 112 processes a composite message, the communication link 116 between information apparatus 100 and output device 106 selected by the user may be constantly maintained or it may be temporarily dropped and then resumed for transmitting output data. Encryption techniques may be applied to the output data to ensure security. Compression/decompression, encode/decode may also be implemented to facilitate the transmission of output data over communication link 116.

After receiving output data from information apparatus 100, an output device 106 may simply buffer the output data, as shown in step 810, before sending the data to output engine (or printer engine in the case of a printer) 1008 for final output. In cases where an output device 106 includes a printer controller 1010, output controller 104 or combined controller, such controller may, jointly or individually, further process the output data (shown in step 814) before sending the data to output engine or printer engine 1008 for final output.

It is possible that a plurality of information apparatuses 100 may transmit output data to an output device 106 at the same time or at least during overlapping periods. It may then become necessary to implement queuing or spooling functionality in the output device 106. Preferably, the output device 106 stores output data it receives in a queue until the output data can be processed. Such queuing and spooling capability may be implemented partially or entirely by the output controller 104 as an optional feature set. A user may be notified when the output device 106 is ready to process a particular output job or the status of the output job in the queue. Once the output device 106 completes the output service, the user may terminate the output process by indicating such an intention through an interface on information apparatus 100 or by moving the information apparatus 100 out of the communication range of the output device 106.

FIGS. 9A-9F show a series of graphical user interfaces (GUIs) rendered at different times on a display screen 901 of an information apparatus 100 to illustrate one implementation of the output process 401 described with reference to FIG. 4. The illustrated example of user interface can be implemented in an information apparatus 100 with or without an operating system. The user interface is illustrated here only as an example, other user interfaces may also be implemented and in no way restrict the scope and claims of the present invention.

Referring to FIG. 9A, screen 901 may be a part of an information apparatus 100 such as, without limitation, palmtop, PDA, mobile phone, pager, Internet appliance, web pads, e-book etc. In this particular example, as shown in screen 901, a user is reading a news article published on the Internet using a document browsing application in information apparatus 100. Part of the article (e.g., photo 900) cannot be fully displayed and so is indicated by a link or tag. The inability to fully display photo 900 may arise from a variety of reasons including limitations in display capacity, memory, processing power, or lack of support by a service provider, application, communication protocols, or software protocols, among other reasons.

As shown in FIG. 9A, a document browsing application in the information apparatus 100 may have a plurality of functions and feature sets available to the user through the GUI. A printing function control 902 may be one of these features. The output or printing functionality may be provided by accessing a client application 102 with or without an operating system. In this illustrated example, the user may invoke the output function by selecting the print function control or icon 902. The user can make the selection by using, for example, any of a keyboard, keypad, mouse, stylus, soft keys, push buttons, software command, touch sensitive screen, voice-activated command, among others. Other display methods or functionalities or feature sets such as a drop down list, a pull down menu, among others, are also possible.

When the user selects Print function control 902, the client application 102 may be invoked or launched. The output process 401 described with reference to FIG. 4 may then proceed. The client application 102 may obtain a document object (e.g., the news article and or the pointer of the new article) from the document browsing application. As described earlier, the user may be able to choose to output the reduced digital document (e.g., without photo 900) as displayed in the information apparatus 100 or to output the full digital document in its original form (e.g., with photo 900). We assume for this example that the user has preset the default to always output the full digital document in its original form.

Since the user does not have a pre-selected or default output device 106, a discovery process 520 may automatically proceed in this example. A communication manager may coordinate the discovery process 520. As described earlier, the communication manager may be part of the client application 102 or may be a separate application that can communicate with the client application 102.

Assuming in this example that he or she did not specify any searching criteria for the discovery process 520, the user may be presented with all the printers 106, if any, that are available to take the print job. In the case where no available printers are found (not shown here), the user may also be notified and provided with alternatives as described earlier in the discovery process 520.

Assume in this example that three printers 106 are found. Their identities and service charges are listed on the GUI illustrated in FIG. 9B. The user may select a "more information" control or icon 904 to get more detailed information on each available output device 106. The user may select a printer 106 from the list, for example, by moving a cursor to highlight the name of the selected printer 106 and then selecting a "select" control or icon 906. The user may also withdraw the service request from any of the three printers by selecting a "cancel" control or icon 907.

Assume in this example that the user has selected the PH inkjet 260 printer. The next GUI, as illustrated in FIG. 9C, provides the user with a confirmation. Information included in the confirmation may include (1) address (pointers) of the digital document intended for output, (2) printer selected, (3) service fee that will be charged. Various payment types and methods may be used. The user may also choose to provide payment, deposit or escrow in various forms. However, for simplicity of illustration, only two are shown in this particular example. If payment by credit card is selected, the user may be prompted to provide credit card information. In one example, the user may then provide such information through a GUI (not shown) on the information apparatus 100, which then transmits the information to the selected output device 106. In another example, the user may provide credit card information directly to the selected output device 106 through an interface provide by the output device 106. If the user has selected the cash payment option, cash may be physically deposited into a cash collector installed or connected to the selected output device 106. Or the user may transfer cash in electronic form from the information apparatus 100 to the output device 106. The user may or may not need to manually input payment information such as a credit card number. A user profile and or a variety of payment information may have already been saved in the user's information apparatus 100. The client application 102 may automatically fetch necessary payment information and process the transaction with the output device 106 or with a remote transaction server. If the output service is free, no payment information will need to be collected. If the output service is a subscription, then membership, login, authorization, or security information may be collected instead or in addition.

After the user confirms all the information and provides payment or deposit as requested, the user may be prompted to describe the job object as illustrated in FIG. 9D. Some of the selections for the job object input illustrated here may be device-dependent while others may be device-independent. The user can make selections by using, for example, radio buttons among other controls. Some default values, such as items 908 and 909, may have been preset by the user or automatically calculated by the client application 102 after negotiation with the output device 106. The user may also change all or some default values. After describing the job object, the user may select the "Next" control or icon 910 to move to the next step. It should be noted that only some exemplary or commonly used selections are displayed in the exemplary GUI of FIG. 9D. The user may make further selections by, for example, selecting the "more option" control or icon 911 or by simply scrolling down the display.

After the user submits the job object, the client application 102 sends a composite message 430 to an application server 110. The composite message 430 may include a document object, a printer object, and a job object. The application server 110 may contain server application 112. In this example, the server application 112 may need to fetch the output content (in its original format) based on the pointers provided in the document object. The server application 112 may obtain or invoke helper applications to process the output content (e.g., the news article) into print data that can be accepted by the printer 106 selected by the user (e.g., PH Inkjet 260). The server application 112 and or the helper application may perform one or more raster image processing operations on the output content. During this server application process 701, the sever application 112 may optionally launch a GUI in a window 912 as shown in FIG. 9E to provide the user with estimated processing time and or status. The user may choose to hide this window by selecting the "hide" control or icon 914. The user may also choose to abort the process by selecting the "cancel" control or icon 913.

After it has finished processing the output content and has generated the necessary print data, the server application 112 transmits the print data to the selected output device 106 through the user's information apparatus 100. Transmission may be wired or wireless. The client application 102 in the information apparatus 100 may or may not further process the print data before passing it to the output device 106. The output device 106, after receiving the print data, may queue the print job in its memory or storage component until it is ready to process this particular print job. As shown in FIG. 9F, the user may be notified when the original document is being printed or has been printed out. The user may also be notified of the service fee that has been, for example, charged to a credit card or deducted from a cash deposit. The user may be provided with a "more option" control or icon 916. For example, the user may choose this printer as a preferred default printer so that for the next output or print operation a discovery process 520 may be skipped or shortened if this printer 106 is found to be available.

FIGS. 9A-9F provides only one example of output process 401 described with reference to FIG. 4. While the above descriptions contain many specificities, these should not be construed as limitations on the scope of the invention, but rather as exemplary embodiment thereof. Other user interfaces and embodiments may also be implemented. The process may also be implemented with more or fewer steps. As an example, security verification and authentication may be added to the steps illustrated in FIGS. 9A-9F. As another example, the step illustrated by FIG. 9B may be skipped as the user may have pre-selected or preferred a default printer. These and other possible variations do not however depart from the scope and spirit of present invention.

Having described and illustrated the principles of our invention with reference to an illustrated embodiment, it will be recognized that the illustrated embodiment can be modified in arrangement and detail without departing from such principles. In view of the many possible embodiments to which the principles of our invention may be applied, it should be recognized that the detailed embodiments are illustrative only and should not be taken as limiting the scope of our invention. Rather, I claim as my invention all such embodiments as may come within the scope and spirit of the following claims and equivalents thereto.

What is claimed is:

1. A method for pervasively outputting data using pervasive computing devices, the method comprising:
   (i) wirelessly coupling an information apparatus to a wireless local area network using wireless communication circuitry included in the information apparatus, the wireless communication circuitry includes one or more wireless communication chips or chipsets that are compliant, at least in part, with at least one protocol within IEEE 802.11 wireless standards for wireless communication;
   (ii) establishing, via the wireless communication circuitry included in the information apparatus and over the wireless local area network wirelessly coupled in (i), a wireless communication connection with one or more servers over a network, the one or more servers being separate devices from the information apparatus;
   (iii) transmitting, from the information apparatus, via the wireless communication circuitry included in the information apparatus, over the wireless communication connection established in (ii), and to the one or more servers, a device object that includes device information related to the information apparatus;
   (iv) capturing digital content using a digital capturing device associated with the information apparatus; and
   (v) providing, from the information apparatus, via the wireless communication circuitry of the information apparatus, over the wireless communication connection established in (ii) and to the one or more servers, the digital content that is captured using the digital capturing device associated with the information apparatus, the providing of the digital content from the information apparatus to the one or more servers being subsequent to the information apparatus having transmitted the device object to the one or more servers in (iii); and
   wherein the one or more servers include memory or storage and server software executable at the one or more servers; and wherein upon execution of the server software at the one or more servers, the method further comprises:
   (vi) receiving, by the server software, at the one or more servers, and over the wireless communication connection established in (ii), the device object transmitted by the information apparatus in (iii);
   (vii) receiving, by the server software at the one or more servers and over the wireless communication connection established in (ii), at least part of the digital content provided by the information apparatus to the one or more servers in (v);
   (viii) storing, by the server software at the one or more servers, the at least part of the digital content received by the server software from the information apparatus in (vii), in the memory or storage of the one or more servers;
   (ix) receiving, by the server software at the one or more servers, security information or authentication information from a client device for enabling the client device to access the at least part of the digital content that is stored by the server software in the memory or storage of the one or more servers in (viii), the security information or the authentication information being related, at least in part, to a user of the client device, and the client device being a distinct device from the information apparatus and from the one or more servers;
   (x) generating, by the server software at the one or more servers, output data that is related to the at least part of the digital content received by the one or more servers from the information apparatus in (vii), and the generating of the output data being related, at least in part, to at least a portion of the device information included in the device object received by the one or more servers from the information apparatus in (vi), and the generating of the output data being based on the one or more servers having received the security information or the authentication information from the client device in (ix) for enabling the client device to access the at least part of the digital content stored in the memory or storage of the one or more servers in (viii); and
   (xi) providing, by the server software executable at the one or more servers, at least part of the output data generated in (x) from the one or more servers to the client device for outputting the at least part of the digital content, which was received from the information apparatus in (vii), at an output device associated with the client device, the providing of the at least part of the output data is based on the one or more servers having received the security information or the authentication information from the client device in (ix); and wherein the client device includes client software executable at the client device; and wherein upon execution of the client software at the client device, the method further comprises:
- (xii) receiving, by the client software executable at the client device and from the one or more servers, at least part of the output data generated in (x), the at least part of the output data is related, at least partly, to the device information included in the device object received by the one or more servers from the information apparatus in (vi), and the receiving of the at least part of the output data is based, at least in part, on the client device having provided the security information or the authentication information to the one or more servers over the network; and
- (xiii) processing, by the client software at the client device, the at least part of the output data received from the one or more servers in (xii) into device dependent output data that is acceptable for rendering or outputting at an output device associated with the client device, the processing, by the client software, includes at least one of a decoding operation, an encoding operation, a conversion operation, a color correction operation, or an image processing operation, individually or in any combination; and wherein at least the client device is a mobile pervasive computing device that is not a stationary device, a workstation, or a generic computer, and wherein the client device is enabled to pervasively output the digital content at the output device without a need for the client device to use a stationary computing device, a workstation, or a desktop computer for output of the digital content.

2. The method of claim 1 wherein the client device is at least a smart phone, and the output device associated with the client device includes a touch sensitive screen display or a sound output device, individually or in any combination; and wherein the one or more servers include at least one server of the one or more servers or include any combination of the one or more servers.

3. The method of claim 2 wherein the information apparatus includes the digital capturing device and the wireless communication circuitry; and wherein the wireless communication circuitry, which is included in the information apparatus for establishing the wireless communication connection is (ii), is compliant, at least in part, with at least one protocol within IEEE 802.11 wireless standards.

4. The method of claim 3 wherein the processing of the at least part of the output data, received from the one or more servers at the client device in (xiii) includes conforming, decoding, or converting, individually or in any combination, the at least part of the output data into one or more of data formats, languages, or instructions, individually or in any combination, which is acceptable for rendering or outputting at the client device or at the output device associated with the client device.

5. The method of claim 1, wherein the client device includes a user interface for interacting with the user and for obtaining the security information or the authentication information from the user, and wherein the method further comprises:
providing, by the client software executable at the client device, at least part of the security information or the authentication information obtained from the user via the user interface, to at least one server of the one or more servers; and the receiving of the at least part of the output data by the client software in (xii) is based, at least in part, on the at least one server of the one or more servers having received the security information or the authentication information from the client device in (ix); and the user interface includes hardware or software, individually or in any combination; and wherein the information apparatus further includes at least one of: a microphone, a speaker, a mouse, a keyboard, a touch-sensitive screen or a non-touch sensitive screen, push buttons, soft keys, or a stylus, individually or in any combination; and wherein the one or more servers for receiving and storing the digital content in (viii) include at least one content server for receiving and storing the digital content.

6. The method of claim 1, wherein the output device is a distinct device from the client device and is wirelessly or wire connected to the client device, and wherein the method further comprises:
- (xiv) outputting at least part of the device dependent output data, processed at the client device in (xiii), at the output device associated with the client device, and wherein the outputting of the at least part of the device dependent output data includes delivering, by the client software over a wireless connection or a wired connection, the at least part of the device dependent output data from the client device to the output device for rendering or outputting of at least part of the device dependent output data at the output device.

7. The method of claim 1, wherein the generation of at least part of the output data includes one or more of an interpretation operation, a conversion operation, a rasterization operation, a scaling operation, a segmentation operation, a color space transform operation, an image enhancement operation, a color correction operation, a compression operation, an encryption operation, or a decryption operation, individually or in any combination; and wherein the generation of the at least part of the output data is based, at least in part, on the device information included in the device object received from the information apparatus by the one or more servers in (vi).

8. The method of claim 1, wherein the method further comprises transmitting, to the one or more servers, via the wireless communication circuitry of the information apparatus, and over the wireless communication connection established in (ii), a content object including, at least in part, a reference or a pointer to the digital content, the digital content being captured using the digital capturing device associated with the information apparatus in (iv).

9. A system for pervasive computing devices for pervasively outputting output data, comprising:
server software executable at one or more servers;
client software executing, at least partly, at a client device;
an information apparatus for obtaining data using a digital capturing device associated with the information apparatus, the information apparatus including wireless communication circuitry that further includes one or more wireless communication chips or chipsets for wireless communication, and at least one processor, the at least one processor directing the wireless communication circuitry to:
- (1) wirelessly connect, using the wireless communication circuitry of the information apparatus, the information apparatus to a wireless local area network;
- (2) wirelessly establish, using the wireless communication circuitry of the information apparatus and over the wireless local area network wirelessly connected in (1), a wireless communication connection between the information apparatus and the one or more servers, the one or more servers being distinct devices from the information apparatus;

(3) wirelessly transmit, using the wireless communication circuitry of the information apparatus and over the wireless communication connection wirelessly established in (2), a device object that includes device information related to the information apparatus, from the information apparatus to the one or more servers; and (4) wirelessly provide, from the information apparatus, using the wireless communication circuitry of the information apparatus and over the wireless communication connection wirelessly established in (2), and to the one or more servers, a content object that includes at least part of the data obtained by the information apparatus using the digital capturing device, the wireless providing of the content object from the information apparatus to the one or more servers being subsequent to the information apparatus having wirelessly transmitted the device object to the one or more servers in (3);

wherein the server software is executable, at least partly, at the one or more servers, the one or more servers including at least one network communication interface for network communication, and memory or storage for storing at least part of the content object wirelessly provided by the information apparatus to the one or more servers in (4) and that includes at least part of the data obtained by the information apparatus using the digital capturing device; and wherein the client software is executable, at least partly, at the client device, the client device being a distinct device from the information apparatus and from the one or more servers, the client device receives output data from the one or more servers, and the output data being related to at least part of the data included in the content object that is wirelessly provided by the information apparatus to the one or more servers in (4);

wherein execution of at least part of the server software at the one or more servers, causes the one or more servers to:

(5) receive, via the at least one network communication interface of the one or more servers and over the wireless communication connection wirelessly established in (2), the device object from the information apparatus;

(6) receive, from the information apparatus, via the at least one network communication interface of the one or more servers, and over the wireless communication connection wirelessly established in (2), the content object that includes at least part of the data obtained by the information apparatus using the digital capturing device;

(7) store, in the memory or storage of the one or more servers, the content object received from the information apparatus in (6);

(8) receive, via the at least one network communication interface, over the wireless communication connection wirelessly established in (2), and by at least one server of the one or more servers, one or more job objects from the client software executing, at least partly, at the client device, the one or more job objects including at least one of security information or identification information related to a user of the client device or the client device, individually or in any combination, the security information or the identification information enables the user of the client device to access at least part of the content object stored at the one or more servers in (7);

subsequent to the at least one server of the one or more servers having successfully received the security information or the identification information from the client device in (8), (9) retrieve, by the one or more servers, at least part of the data, which is obtained by the information apparatus from the content object, and which is received from the information apparatus in (6) and stored in the memory or storage of the one or more servers in (7);

(10) generate, at the one or more servers, output data from at least part of the data retrieved in (9), at least part of the output data being related to at least part of the content object received by the one or more servers from the information apparatus in (6), and the generated output data being related, at least partly, to at least a portion of the device information included in the device object received by the one or more servers from the information apparatus in (5), and the generating of the output data being based, at least in part, on the at least one server of the one or more servers having received the one or more job objects including the security information or the identification information from the client software in (8); and

(11) provide, from the one or more servers, by the server software executable at the one or more servers, via the at least one network communication interface of the one or more servers, over the wireless communication connection wirelessly established in (2), and to the client device, at least part of the output data generated at the one or more servers in (10), the providing of the at least part of the output data from the one or more servers to the client device is for outputting, at an output device associated with the client device, at least part of the output data, the output data being related, at least in part, to the data retrieved from the content object in (9) that is received from the information apparatus in (6), and the providing of the at least part of the output data being subsequent to the at least one server of the one or more servers having received the one or more job objects from the client software executing, at least partly, at the client device in (8); and wherein the client software executing, at least partly, at the client device, causes the client device to:

(12) receive, by the client software and via one or more wireless communication units included in the client device, at least part of the output data generated in (10) from the one or more servers, the output data is related, at least partly, to at least a portion of the device object received by the one or more servers from the information apparatus in (5), and the receiving of the at least part of the output data by the client software is subsequent to the client device having provided the one or more job objects to the least one server of the one or more servers; and

(13) process, by the client software using one or more processors included in the client device, at least part of the output data received from the one or more servers in (12) into device dependent output data that is acceptable for rendering or outputting at an output device associated with the client device, the processing, by the client software at the client device, includes at least one of a decoding operation, an encoding operation, a conversion operation, a color correction operation, or an image processing operation, individually or in any combination; and wherein the one or more pervasive computing devices have limited memory space, processing capacity, and power; and wherein the client device is at least a pervasive computing device and wherein the client device is enabled to pervasively output the data at the output device without depending on synchronizing the data with a stationary computing device for output of the data.

10. The system of claim 9, wherein the information apparatus includes the digital capturing device for capturing digital data, the digital data including, at least in part, image data or video data, and wherein the data obtained by the information apparatus includes, at least in part, the digital data having the image data or the video data captured by the digital capturing device of the information apparatus.

11. The system of claim 10, wherein the client device is at least a smart phone, and the output device associated with the client device is either internally included in the client device or externally connected with the client device, and wherein the output device outputs at least part of the device dependent output data that is processed by the client software at the client device in (13), the device dependent output data being related, at least in part, to the data obtained by the information apparatus that includes the image data or the video data, the image data or the video data being captured by the digital capturing device.

12. The system of claim 9, wherein the client device includes
a user interface for interacting with the user,
the one or more wireless communication units for wireless communication,
the output device for outputting at least part of the output data, and
the one or more processors for executing at least part of the client software, and wherein
the processing of at least part of the output data, by the client software at the client device in (13) includes conforming, decoding, or converting, individually or in any combination, the output data into one or more of data formats, languages, or instructions, individually or in any combination, which is acceptable for rendering or outputting at the client device or at the output device associated with the client device.

13. The system of claim 9, wherein the information apparatus includes a user interface for interacting with a user of the information apparatus for obtaining the data, and the user interface further includes hardware or software, individually or in any combination, and wherein the user interface further includes at least one of a microphone, a speaker, a mouse, a keyboard, a touch-sensitive screen or a non-touch sensitive screen, push buttons, soft keys, or a stylus, individually or in any combination; and wherein the one or more servers include at least one server of the one or more servers or include any combination of the one or more servers.

14. The system of claim 11, wherein the output device is connected to the client device via a wired connection or a wireless connection, and the client device delivers the device dependent output data, over the wired connection or the wireless connection, to the output device for rendering or outputting the device dependent output data at the output device.

15. The system of claim 9, wherein at least one wireless communication chip or chipset from among the one or more wireless communication chips or chipsets included in the wireless communication circuitry of the information apparatus is compliant, at least in part, with at least one protocol within IEEE 802.11 wireless standards standard.

16. The system of claim 9, wherein the generation of at least part of the output data in (10) includes one or more of an interpretation operation, a conversion operation, a rasterization operation, a scaling operation, a segmentation operation, a color space transform operation, an image enhancement operation, a color correction operation, a compression operation, an encryption operation, or a decryption operation, individually or in any combination; and wherein the generation of at least part of the output data in (10) is based, at least in part, on the device information included in the device object received from the information apparatus by the one or more servers in (5).

17. In a non-transitory computer readable medium, containing one or more server applications, executable by one or more processors at one or more servers, for receiving digital content from an information apparatus over a network and for transmitting output data, related, at least in part, to the digital content, to one or more client devices over the network;

wherein the information apparatus obtains digital data using a digital capturing device associated with the information apparatus, and the information apparatus includes wireless communication circuitry that includes one or more wireless chips or chipsets for wirelessly connecting to a wireless local area network and for wirelessly establishing, over the wireless local area network, a wireless communication connection with the one or more servers over the network, the wireless communication circuitry of the information apparatus being compatible, at least partly, with at least part of a protocol within IEEE 802.11 wireless standards for wireless communication; and wherein the one or more servers are accessible, over the network, by client software, executable, at least partly, at the one or more client devices, the one or more servers being distinct devices from the one or more client devices and the information apparatus, the one or more servers include at least one network communication interface for communication over the network, and the one or more server applications being stored, at least partly, in memory or storage included in the one or more servers, and wherein execution of at least part of the one or more server applications by the one or more processors included in the one or more servers, configure the one or more servers to:

(a) establish, via the at least one network communication interface of the one or more servers, the wireless communication connection between the one or more servers and the information apparatus over the wireless local area network;

(b) receive, via the at least one network communication interface of the one or more servers and over the established wireless communication connection established in (a), a device object from the information apparatus, the device object includes device information related to the information apparatus;

(c) receive, via the at least one network communication interface of the one or more servers and over the wireless communication connection established in (a), at least part of the digital content from the information apparatus, the digital content includes at least part of the digital data obtained using the digital capturing device associated with the information apparatus;

(d) store, by the one or more server applications executing at the one or more servers, the at least part of the digital content received from the information apparatus in (c), at one or more content servers, the one or more content servers being accessible by the one or more server applications for storing the at least part of the digital content;

(e) receive, via the at least one network communication interface of the one or more servers and over the network, one or more job objects from the client software executing, at least partly, at the one or more client devices, the one or more job objects include at least one of authentication information or identification information related to a user of the one or more client devices or the one or more client devices, individually or in combination, for accessing the one or more servers, the one or more client devices being distinct devices from the information apparatus and from the one or more servers;

(f) provide, via the at least one network communication interface of the one or more servers, over the wireless communication connection established in (a), and to the client software executing, at least partly, at the one or more client devices, access of the at least part of the digital content stored at the one or more content servers, the providing of the access of the at least part of the digital content to the client software is based, at least in part, on the one or more servers having successfully received the authentication information or the identification information from the client software in (e), the providing of the access of the at least part of the digital content to the client software includes providing at least a list of one or more pointers or references to the digital content stored at the one or more content servers in (d);

(g) receive, from the client software executing, at least partly, at the one or more client devices, via the at least one network communication interface of the one or more servers, and over the network, at least an indication of a selected pointer or a selected reference to the digital content from among the list of one or more pointers or references to the digital content provided to the client software in (f);

(h) retrieve, by the one or more server applications executing at the one or more servers, at least part of the digital content stored at the one or more content servers subsequent to the one or more servers having successfully received the one or more job objects from the client software in (e), and the digital content retrieved from the one or more content servers being associated with the selected pointer or the selected reference to the digital content that is received in (g);

(i) generate, by the one or more server applications executing at the one or more servers, output data from the at least part of the digital content retrieved in (h) for output at the one or more client devices, the output data being related to the at least part of the digital content, which is received by the one or more servers and from the information apparatus in (c), and the generated output data being related, at least partly, to at least a portion of the device object received by the one or more servers from the information apparatus in (b), and wherein the generating of the output data is subsequent to the one or more servers having received the one or more job objects from the client software in (e); and (j) provide, by the one or more server applications and over the network, at least part of the output data generated in (i) from the one or more servers to the client software executing, at least partly, at the one or more client devices, for pervasively outputting at least part of the output data; and wherein at least part of the output data is related, at least in part, to the digital content received by the one or more servers from the information apparatus in (c), and wherein the one or more client devices are at least pervasive computing devices, and the pervasive computing devices, which have limited memory space, processing capacity, and power, are operable to pervasively output the digital content without a need for the client device to use a stationary computing device, a workstation, or a desktop computer for output of the digital content.

18. The non-transitory computer readable medium of claim 17, wherein execution of at least part of the client software, at the one or more client devices, causes the one or more client devices to:
receive, via one or more wireless communication units included in the one or more client devices and over the network, at least part of the output data generated in (i) from the one or more servers, the receiving of the at least part of the output data being subsequent to the one or more servers having received the one or more job objects from the one or more client devices in (e) over the network; and
output, at an output device associated with the one or more client devices, at least part of the output data, the output data is received at the one or more client devices from the one or more servers.

19. The non-transitory computer readable medium of claim 17, wherein the wireless communication circuitry of the information apparatus is compliant, at least in part, with at least one protocol within IEEE 802.11 wireless standards.

20. The non-transitory computer readable medium of claim 17, wherein the one or more server applications are further configured to: generate the output data related to the at least part of the digital content received by the one or more servers from the information apparatus in (c), and wherein the generation of at least part of the output data includes one or more of an interpretation operation, a conversion operation, a rasterization operation, a scaling operation, a segmentation operation, a color space transform operation, an image enhancement operation, a color correction operation, a compression operation, an encryption operation, or a decryption operation, individually or in any combination; and
wherein the generation of the output data being subsequent to at least one server of the one or more servers having received subscription information from the client software, executing at the one or more client devices, and the receiving of the subscription information is for enabling the one or more client devices to access the at least part of the digital content stored at the one or more content servers, and the at least part of the digital content is received from the information apparatus by the one or more servers in (c), and the at least part of the digital content includes, at least partly, the digital data obtained by the information apparatus using the digital capturing device associated with the information apparatus, and wherein the one or more servers include at least one server of the one or more servers or include any combination of the one or more servers.

21. The method of claim 1, wherein the method includes step (x) the generating, by the server software at the one or more servers, output data that is related to the at least part of the digital content, and wherein the method excludes generating of the output data at the information apparatus, the output data being related, at least in part, to the digital content and to the device object, and wherein reducing consumption of processing power and memory at the information apparatus.

22. The method of claim 21, wherein the information apparatus excludes using device specific device drivers or software for generating the output data, which is dependent on the device object related to the information apparatus.

23. The method of claim 2, further comprising wirelessly connecting the client device, by the client software executable at the client device and using one or more wireless communication units included in the client device, to the wireless local area network wirelessly coupled in (i), the one or more wireless communication units of the client device being compliant, at least in part, with at least one protocol within IEEE 802.11 wireless standards for wireless communication.

24. The method of claim 5, wherein the information apparatus includes a user interface for interacting with a user, and the user interface includes hardware or software, individually or in any combination; and wherein the method further comprises:
 providing, by the server software executable at the one or more servers, from the one or more servers, and to the information apparatus, at least part of the output data generated in (x) for outputting at least part of the digital content, which was received from the information apparatus in (vii), the providing of the at least part of the output data is based, at least in part, on the one or more servers having received the device object in (vi) and the at least part of the digital content in (vii).

25. The system of claim 12, wherein the client software executing, at least partly, at the client device, further causes the client device to:
 wirelessly connect, by the client software executable at the client device and using the one or more wireless communication units included in the client device, the client device to the wireless local area network wirelessly connected in (1), the one or more wireless communication units included in the client device being compliant, at least in part, with at least one protocol within IEEE 802.11 wireless standards for wireless communication.

26. The system of claim 9, wherein execution of at least part of the server software at the one or more servers further causes the one or more servers to wirelessly receive, at the one or more servers, via the at least one network communication interface of the one or more servers, and over the wireless communication connection wirelessly established in (2), an object from the information apparatus, the object includes user information related to the content object that includes at least part of the data obtained by the information apparatus using the digital capturing device, the user information including at least one of user identification, security information, authentication information, payment information, or subscription information, individually or in any combination, the wireless receiving of the object being subsequent to the information apparatus having wirelessly provided the content object to the one or more servers in (4); and
 wherein the output data generated at the one or more servers in (10) is further related, at least in part, to the object, including the user information, that is wirelessly transmitted from the information apparatus to the one or more servers.

27. The system of claim 9, wherein execution of at least part of the server software at the one or more servers further causes the one or more servers to wirelessly receive, at the one or more servers and from the information apparatus, via the at least one network communication interface of the one or more servers, and over the wireless communication connection established in (2), an object including, at least in part, a reference or a pointer to the data obtained by the information apparatus using the digital capturing device, the wireless receiving of the object from the information apparatus at the one or more servers being subsequent to the information apparatus having wirelessly provided the content object to the one or more servers in (4).

28. The non-transitory computer readable medium of claim 18, wherein the one or more server applications is software that is executable at the one or more servers, the software specifically configured for receiving digital content from an information apparatus over a network and for transmitting data to one or more client devices over the network for output at the one or more client devices, the data for output being related, at least in part, to the digital content.

29. The non-transitory computer readable medium of claim 28, wherein the software executable at the one or more servers is specifically configured to generate, by the one or more server applications executing at the one or more servers, output data from the at least part of the digital content retrieved in (h) for output at the one or more client devices, the output data being related to the at least part of the digital content, which is received by the one or more servers and from the information apparatus in (c), the generated output data being related, at least partly, to at least a portion of the device object received by the one or more servers from the information apparatus in (b), and wherein the generating of the output data is subsequent to the one or more servers having received the one or more job objects from the client software in (e), and wherein the information apparatus is not required to generate the output data, which reduces consumption of processing power and usage of memory of the information apparatus.

* * * * *